(12) United States Patent
Nakahara et al.

(10) Patent No.: US 7,451,202 B2
(45) Date of Patent: Nov. 11, 2008

(54) INFORMATION MANAGEMENT SYSTEM HAVING A COMMON MANAGEMENT SERVER FOR ESTABLISHING SECURE COMMUNICATION AMONG GROUPS FORMED OUT OF A PLURALITY OF TERMINALS

(75) Inventors: Tohru Nakahara, Osaka (JP); Takuji Hiramoto, Moriguchi (JP); Kouji Miura, Matsubara (JP); Masaya Yamamoto, Hirakata (JP); Mitsuhiro Inoue, Osaka (JP)

(73) Assignee: Panasonic Corporation, Osaka (JP)

( * ) Notice: Subject to any disclaimer, the term of this patent is extended or adjusted under 35 U.S.C. 154(b) by 1147 days.

(21) Appl. No.: 10/738,302

(22) Filed: Dec. 18, 2003

(65) Prior Publication Data

US 2004/0215735 A1 Oct. 28, 2004

(30) Foreign Application Priority Data

Dec. 20, 2002 (JP) ............................. 2002-370330

(51) Int. Cl.
*G06F 15/173* (2006.01)
*G06F 15/16* (2006.01)
*G06Q 20/00* (2006.01)
*H04K 1/00* (2006.01)
*H04J 15/00* (2006.01)

(52) U.S. Cl. .................... 709/223; 709/227; 705/16; 705/51; 370/312

(58) Field of Classification Search .................. None
See application file for complete search history.

(56) References Cited

U.S. PATENT DOCUMENTS

| 6,898,423 | B2* | 5/2005 | Motegi et al. ............. 455/414.2 |
| 7,231,206 | B2* | 6/2007 | Cudak et al. .............. 455/414.2 |
| 2002/0107806 | A1* | 8/2002 | Higashi et al. ................. 705/51 |
| 2003/0105720 | A1 | 6/2003 | Ishibashi |
| 2008/0015953 | A1* | 1/2008 | Harper et al. .................. 705/27 |

FOREIGN PATENT DOCUMENTS

| JP | 2001-168861 | 6/2001 |
| JP | 2001-256413 | 9/2001 |
| JP | 2002-229447 | 8/2002 |
| JP | 2002-342518 | 11/2002 |

* cited by examiner

*Primary Examiner*—Wen-Tai Lin
(74) *Attorney, Agent, or Firm*—Wenderoth, Lind & Ponack, L.L.P.

(57) ABSTRACT

A group management server in a group information management system includes: a group member terminal list storage unit for storing a group member terminal list; and a secure communication unit for establishing a secure communication channel with a plurality of terminal apparatuses and communicating with each of the terminal apparatuses via the communication channel. Each terminal apparatus includes a tamper-resistant module. The tamper-resistant module includes: a group information storage unit for storing group information securely; a deletion unit for securely executing deletion, which is processing that affects the group member terminal list, of the group information stored in the group information storage unit; and a secure communication unit for establishing a secure communication channel with the secure communication unit and transmitting a complete deletion notification message via the communication channel.

19 Claims, 33 Drawing Sheets

FIG. 3

Group member terminal list 251

| Group identifier | Terminal list |
|---|---|
| 0xF001 | 0x0001 |
| | — |
| | — |
| | — |
| | — |

FIG. 4

Group information 281

| Group identifier | Group key |
|---|---|
| 0xF001 | ○×△···□ |

FIG. 11

Temporary deletion flag list 351(451)

| Group identifier | Terminal list | Temporary deletion flag list (Temporary deletion flag 1 / Temporary deletion flag 2) 3513(4513) |
|---|---|---|
| 0xF001 | 0x0001 | 0 |
| | 0x0002 | 0 |
| | 0x0003 | 0 |
| | 0x0004 | 0 |
| | 0x0005 | 1 |

3511 — Group identifier
3512 — Terminal list

Group information terminal list 1601

Group information terminal list 1602

Group information terminal list 1603

Group information terminal list 1604

Group information updated terminal list 1901

Group information updated terminal list 1902

Group information updated terminal list 1903

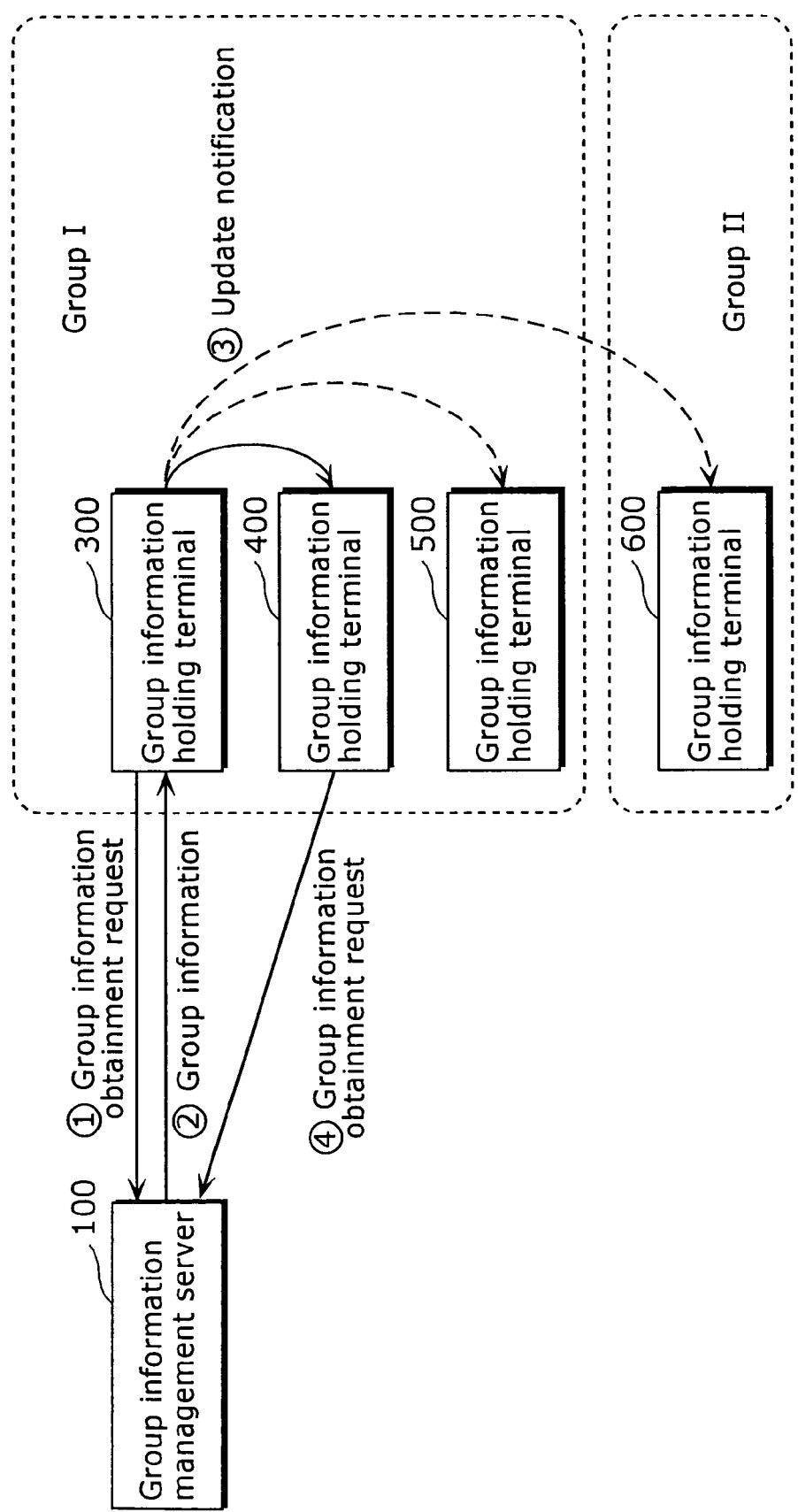

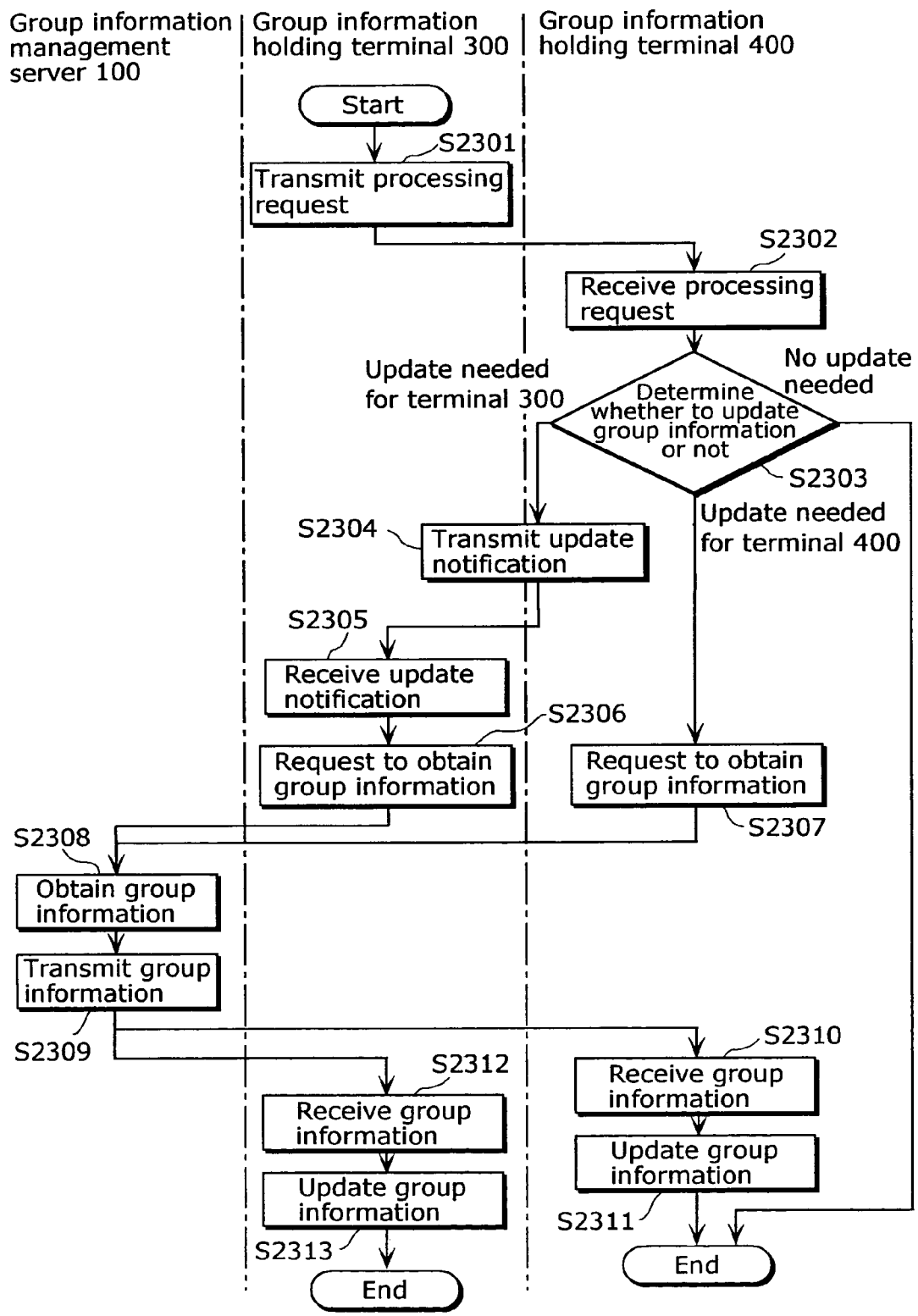

Update is needed for terminal 400

Update is needed for terminal 300

FIG. 40A1

Group information
common information c701

| 0xF001 |
|--------|
| 2 |
| 0xAAAA |

FIG. 40A2

Group information
common information c702

| 0xF001 |
|--------|
| 3 |
| 0xAAAA |

FIG. 40A3

Group information
common information c703

| 0xF001 |
|--------|
| 4 |
| 0xAAAA |

FIG. 40B1

Common information
terminal list 1701

| 0xF001 |
|--------|
| 0x0001 |
| 0x0003 |
| 0x0004 |

FIG. 40B2

Common information
terminal list 1702

| 0xF001 |
|--------|
| 0x0001 |
| 0x0003 |
| 0x0004 |
| 0x0005 |

FIG. 40B3

Common information
terminal list 1703

| 0xF001 |
|--------|
| 0x0001 |
| 0x0003 |

INFORMATION MANAGEMENT SYSTEM HAVING A COMMON MANAGEMENT SERVER FOR ESTABLISHING SECURE COMMUNICATION AMONG GROUPS FORMED OUT OF A PLURALITY OF TERMINALS

BACKGROUND OF THE INVENTION

1. Field of the Invention

The present invention relates to an information management system in which a plurality of terminal apparatuses for storing data and an information management server for managing management information concerning the data are connected to each other via a network. Particularly the present invention relates to a technology of confirming, through the information management server, that each of the terminal apparatuses has executed the processing that affects the management information on that data in a case where such processing was executed.

2. Description of the Related Art

In recent years, it has become possible to obtain digital works (hereinafter also referred to as "contents") such as music, videos and games easily via distribution thereof recorded on package media as well as via the Internet and digital broadcasting. From the viewpoint of copyright protection or the like, various arrangements have been studied for restricting the number of reproductions, moving, copying and the like of these digital works in using them, namely, for managing the rights of these digital works and the licenses indicating the rights to use them and controlling the usage thereof (Digital Rights Management (DRM)).

When copying and moving these digital works and the licenses thereof between a plurality of terminals, such copying and moving within an unlimited range are not permitted, but copying and moving only within a certain limited range are permitted. It is considered in general that such copying and moving are permitted only between a plurality of terminal apparatuses owned by one user or various users.

In order to achieve such copying and moving within a certain limited range, it is necessary to form a group of terminals which are permitted to perform the processing such as copying and moving of contents between them. Such a group is managed based on group information used for determining whether or not a terminal belongs to the group, a terminal list indicating a list of terminals which belong to the group, and others.

To be more specific, in a case where terminal apparatuses within a predetermined range of numbers (5 or less, for example) with permission of the server forms a group, upon receipt of a request to register a new terminal apparatus into the group, the server judges whether or not the terminal apparatus can be registered in the terminal list, namely, whether or not a predetermined number of terminal apparatuses have already been registered. If the number of registered terminal apparatuses has not yet reached the predetermined upper limit, the server registers the new terminal apparatus in the terminal list and transmits, to that terminal apparatus registered in the terminal list, information (group information) that is unique to the group for determining whether or not the terminal apparatus belongs to the group. On the other hand, in a case where a terminal apparatus leaves the group, the server is notified that this terminal apparatus has deleted the group information after the deletion of the group information. Upon receipt of the notification of deletion, the server deletes that terminal apparatus from the terminal list. A system has been considered for permitting the processing (such as moving and copying) of digital works and the licenses thereof only between the group member terminal apparatuses which hold the group information, according to the above-mentioned arrangements.

The above-mentioned system allows restriction of the processing such as copying and moving of digital works, their licenses and the like within a permissible range, using simple arrangements.

In the above-mentioned system, however, a terminal apparatus does not always perform proper processing. If the terminal apparatus fraudulently notifies the information management server that it has deleted its own group information in spite of its failure of deletion, a problem arises that the group consists of more than a predetermined number of (5 or 10, for example) terminal apparatuses in an unauthorized manner, regardless of the limitation on the number of terminal apparatuses.

Such a problem is not limited to the case where each of the terminal apparatuses holds the group information, the server manages the terminal list concerning the group information, and any one of the terminal apparatuses notifies the server that it has deleted the group information when it deleted the information. But the same holds true, in general, for the information management system in which each of the terminal apparatuses holds some kind of data, the server manages the management information concerning that data, and any one of the terminal apparatuses notifies the server that it has executed the processing that affects the management information when it executed such processing.

Consequently, the object of the present invention is to solve the above-mentioned problem and to provide an information management system for preventing fraudulent acts conducted by a terminal apparatus, such as hiding of unauthorized execution of the processing that affects the management information.

BRIEF DESCRIPTION OF THE INVENTION

In order to achieve the above object, the information management system according to the present invention is an information management system comprising: a plurality of terminal apparatuses for storing data; and an information management server for managing management information concerning the data, which is connected to the plurality of terminal apparatuses via a network, wherein the information management server includes: a management information storage unit operable to store the management information; and a first secure communication unit operable to establish a secure communication channel with each of the terminal apparatuses and communicate with said each terminal apparatus via the communication channel, and said each terminal apparatus includes a tamper-resistant module, wherein the tamper-resistant module includes: a data storage unit operable to store the data securely; an execution unit operable to securely execute processing that affects the management information on the data stored in the data storage unit; and a second secure communication unit operable to establish a secure communication channel with the first secure communication unit and transmit a completion notification via said communication channel, said completion notification indicating that the processing that affects the management information has been executed.

Accordingly, there is no room for existence of fraud in the tamper-resistant module of the terminal apparatus. Also, there is no room for existence of fraud in transmission of the completion notification because it is transmitted via the secure communication channel. Thus, the information management server can confirm securely that the processing that affects the management information has been executed.

In the information management system according to the present invention, the following is possible. The data is group information for determining whether or not a terminal apparatus belongs to a group that is formed of terminal apparatuses, the management information is a terminal list indicating a list of not more than a predetermined number of terminal apparatuses which belong to the group, and the processing that affects the management information is deletion of the group information, and the information management server further includes an updating unit operable to delete a terminal apparatus which has transmitted the completion notification, from the terminal list stored in the management information storage unit, upon receipt of said completion notification via the first secure communication unit.

Accordingly, it is possible to confirm securely that the group information has been deleted and to prevent reliably more than a limited number of terminal apparatuses from forming an unauthorized group.

Also, in the information management system according to the present invention, the following is possible. The information management server includes: a common management server; a plurality of individual management servers; and a terminal list management apparatus. Each terminal apparatus further includes a first communication unit operable to communicate with the common management server, the common management server includes a second communication unit operable to notify a terminal apparatus which has transmitted an advance notification of a destination address of an individual management server to which the completion notification should be transmitted, said advance notification indicating that the group information is about to be deleted. Each of the individual management servers includes: the first secure communication unit; a first temporary deletion flag list storage unit operable to store a temporary deletion flag list which is associated with the terminal list, said temporary deletion flag list being a list of one or more first temporary deletion flags indicating whether or not the completion notification has been received; and a first temporary deletion flag setting unit operable to set a first temporary deletion flag that corresponds to the terminal apparatus which has transmitted the completion notification, upon receipt of said completion notification via the first secure communication unit. The terminal list management apparatus includes: the management information storage unit; the updating unit; and a flag confirmation unit operable to confirm at an arbitrary timing whether a predetermined first temporary deletion flag included in the first temporary deletion flag list has been set or not, wherein the updating unit deletes the terminal apparatus that corresponds to the first temporary deletion flag from the terminal list, based on the confirmation by the flag confirmation unit that the predetermined first temporary deletion flag has been set.

Accordingly, it is possible to confirm securely that the group information has been deleted while distributing the load caused by concentration of completion notifications, and thus to prevent reliably more than a limited number of terminal apparatuses from forming an unauthorized group.

Also, in the information management system according to the present invention, the following is possible. The common management server further includes: a second temporary deletion flag list storage unit operable to store a second temporary deletion flag list which is associated with the terminal list, said second temporary deletion flag list being a list of one or more second deletion flags indicating whether or not the advance notification has been received; and a second temporary deletion flag setting unit operable to set a second temporary deletion flag that corresponds to the terminal apparatus which has transmitted the advance notification, upon receipt of said advance notification via the second secure communication unit, the flag confirmation unit searches for the second temporary deletion flag that corresponds to a predetermined terminal apparatus included in the second temporary deletion flag list, and then searches for the first temporary deletion flag that corresponds to said predetermined terminal apparatus included in the first temporary deletion flag list in sequence, and the updating unit deletes the predetermined terminal apparatus that corresponds to both the first temporary deletion flag and the second temporary deletion flag from the terminal list, in a case where the flag confirmation unit confirms that the second temporary deletion flag and the first temporary deletion flag have been set.

Accordingly, it is possible to improve significantly the accuracy of confirming the completion notification.

Also, in the information management system according to the present invention, the following is possible. The information management server includes: a common management server; and a plurality of individual management servers, said each of the terminal apparatuses further includes a first communication unit operable to communicate with the common management server. The common management server includes: a second communication unit operable to notify a terminal apparatus which has transmitted an advance notification of a destination address of an individual management server to which the completion notification should be transmitted, said advance notification indicating that the group information is about to be deleted; and a terminal list management apparatus. Each of the individual management servers includes: the first secure communication unit; a first temporary deletion flag list storage unit operable to store a temporary deletion flag list which is associated with the terminal list, said temporary deletion flag list being a list of one or more first temporary deletion flags indicating whether or not the completion notification has been received; and a first temporary deletion flag setting unit operable to set a first temporary deletion flag that corresponds to the terminal apparatus which has transmitted the completion notification, upon receipt of said completion notification via the first secure communication unit. The terminal list management apparatus includes: the management information storage unit; the updating unit; and a flag confirmation unit operable to confirm at an arbitrary timing whether or not a predetermined first temporary deletion flag included in the first temporary deletion flag list has been set, wherein the updating unit deletes the terminal apparatus that corresponds to the first temporary deletion flag from the terminal list, based on the confirmation by the flag confirmation unit that the predetermined first temporary deletion flag has been set.

Accordingly, it is possible not only to confirm securely that the group information has been deleted while distributing the load caused by concentration of completion notifications, and prevent reliably more than a limited number of terminal apparatuses from forming an unauthorized group, but also to put together the common management server and the terminal list management apparatus into one apparatus for simplification of these apparatuses.

Also, in the information management system according to the present invention, the following is possible. The terminal list corresponds to the terminal apparatuses which belong to the group, and includes a column of the second temporary deletion flags indicating whether or not the advance notification has been received, the common management server further includes a second temporary deletion flag setting unit operable to set a second temporary deletion flag that corresponds to the terminal apparatus which has transmitted the advance notification, upon receipt of said advance notification via the second communication unit, the flag confirmation unit searches for the second temporary deletion flag that corresponds to a predetermined terminal apparatus included in the terminal list, and then searches for the first temporary deletion flag that corresponds to said predetermined terminal apparatus included in the first temporary deletion flag list in sequence, and the updating unit deletes the predetermined terminal apparatus that corresponds to both the first temporary deletion flag and the second temporary deletion flag from the terminal list, in a case where the flag confirmation unit confirms that the second temporary deletion flag and the first temporary deletion flag have been set.

Accordingly, it is possible not only to improve significantly the accuracy of confirming the completion notification, but also to reduce the load of list management because the number of list types is reduced.

Also, in the information management system according to the present invention, the following is possible. The information management server further includes: a group information storage unit operable to store the group information; a registrability determination unit operable to determine whether or not a terminal apparatus which has transmitted a terminal registration request can be registered in the terminal list, upon receipt of the terminal registration request for registering the terminal apparatus in the terminal list from said terminal apparatus; and a group information readout unit operable to read out the group information stored in the group information storage unit, in a case where the registrability determination unit determines that the terminal apparatus can be registered. The tamper-resistant module further includes a group information storage unit operable to store the group information into the data storage unit, upon receipt of the group information read out by the group information readout unit via the second secure communication unit, and the updating unit registers the terminal apparatus which has transmitted the terminal registration request into the terminal list, in a case where the registrability determination unit determines that the terminal apparatus can be registered.

Accordingly, it is possible to reliably prevent the situation where a terminal apparatus joins a group by a fraudulent act.

Also, in the information management system according to the present invention, the following is possible. The information management server includes: a common management server; a plurality of individual management servers; and a terminal list management apparatus, said each of the terminal apparatuses further includes a first communication unit operable to communicate with the common management server, the common management server includes a second communication unit operable to notify the terminal apparatus which has transmitted the terminal registration request of a destination address of an individual management server to which an obtainment request for obtaining the group information should be transmitted, upon receipt of the terminal registration request from said terminal apparatus. Each of the individual management servers includes: the first secure communication unit; the group information storage unit; and the group information readout unit. The terminal list management apparatus includes: the management information storage unit; the updating unit; and the registrability determination unit, wherein the registrability determination unit determines whether or not the terminal apparatus which has transmitted the terminal registration request can be registered in the terminal list, upon receipt of the terminal registration request via the first communication unit, the second communication unit notifies the destination address of the obtainment request in a case where the registrability determination unit determines that the terminal apparatus can be registered, and the first secure communication unit transmits the group information read out by the group information readout unit to the terminal apparatus which has transmitted the obtainment request, upon receipt of the obtainment request.

Accordingly, it is possible to reliably determine whether or not to register a terminal apparatus into a group and to distribute the load caused by concentration of registration requests.

Also, in the information management system according to the present invention, the following is possible. Each individual management server further includes: a first temporary deletion flag list storage unit operable to store a temporary deletion flag list which is associated with the terminal list, said first temporary deletion flag list being a list of one or more first temporary deletion flags indicating whether or not the completion notification has been received; and a first temporary deletion flag setting unit operable to set a first temporary deletion flag that corresponds to the terminal apparatus which has transmitted the completion notification, upon receipt of said completion notification via the first secure communication unit, the terminal list management apparatus further includes a flag confirmation unit operable to confirm a predetermined first temporary deletion flag included in the first temporary deletion flag list at a timing of receipt of the terminal registration request, the second communication unit notifies a terminal apparatus which has transmitted an advance notification of a destination address of an individual management server to which the completion notification should be transmitted, upon receipt of the advance notification from the terminal apparatus, said advance notification indicating that the group information is about to be deleted, and the updating unit deletes the terminal apparatus that corresponds to the first temporary deletion flag from the terminal list prior to the determination by the registrability determination unit, based on the confirmation by the flag confirmation unit that the predetermined first temporary deletion flag has been set.

Accordingly, it is possible to confirm securely that the group information has been deleted while distributing the load caused by concentration of completion notices and registration requests. Therefore, it is possible not only to reliably prevent more than a limited number of terminal apparatuses from forming an unauthorized group, but also to delete and register terminals from and into the same group smoothly.

Also, in the information management system according to the present invention, the following is possible. The common management server further includes: a second temporary deletion flag list storage unit operable to store a second temporary deletion flag list which is associated with the terminal list, said second temporary deletion flag list being a list of one or more second temporary deletion flags indicating whether or not the advance notification has been received; and a second temporary deletion flag setting unit operable to set a second temporary deletion flag that corresponds to the terminal apparatus which has transmitted the advance notification, upon receipt of said advance notification via the second communication unit, the flag confirmation unit searches for the second temporary deletion flag that corresponds to a predetermined terminal apparatus included in the second temporary deletion flag list, and then searches for the first temporary deletion flag that corresponds to said predetermined terminal apparatus included in the first temporary deletion flag list in sequence, and the updating unit deletes the predetermined terminal apparatus that corresponds to both the first temporary deletion flag and the second temporary deletion flag from the terminal list prior to the determination by the registrability determination unit, in a case where the flag confirmation unit confirms that the second temporary deletion flag and the first temporary deletion flag have been set.

Accordingly, it is possible to improve the accuracy of confirming the completion notification significantly.

Also, in the information management system according to the present invention, the following is possible. The information management server includes: a common management server; and a plurality of individual management servers, said each of the terminal apparatuses further includes a first communication unit operable to communicate with the common management server. The common management server includes: a second communication unit operable to notify the terminal apparatus which has transmitted the terminal registration request of a destination address of an individual management server to which an obtainment request for obtaining the group information should be transmitted, upon receipt of the terminal registration request from said terminal apparatus; and a terminal list management apparatus. Each of the individual management servers includes: the first secure communication unit; the group information storage unit; and the group information readout unit. The terminal list management apparatus includes: the management information storage unit; the updating unit; and the registrability determination unit, wherein the registrability determination unit determines whether or not the terminal apparatus which has transmitted the terminal registration request can be registered in the terminal list, upon receipt of the terminal registration request via the first communication unit, the second communication unit notifies the destination address of the obtainment request in a case where the registrability determination unit determines that the terminal apparatus can be registered, and the first secure communication unit transmits the group information read out by the group information readout unit to the terminal apparatus which has transmitted the obtainment request, upon receipt of the obtainment request.

Accordingly, it is possible not only to distribute the load caused by concentration of registration requests as well as determine reliably whether or not to register a terminal apparatus into a group, but also to put together the common management server and the terminal list management apparatus into one apparatus and thus simplify these apparatuses.

Also, in the information management system according to the present invention, the following is possible. Each individual management server further includes: a first temporary deletion flag list storage unit operable to store a temporary deletion flag list which is associated with the terminal list, said temporary deletion flag list being a list of one or more first temporary deletion flags indicating whether or not the completion notification has been received; and a first temporary deletion flag setting unit operable to set a first temporary deletion flag that corresponds to the terminal apparatus which has transmitted the completion notification indicating that the group information has been deleted, upon receipt of said completion notification via the first secure communication unit, the terminal list management apparatus further includes a flag confirmation unit operable to confirm a predetermined first temporary deletion flag included in the first temporary deletion flag list at a timing of receipt of the terminal registration request, the second communication unit notifies a terminal apparatus which has transmitted an advance notification of a destination address of an individual management server to which the completion notification should be transmitted, upon receipt of an advance notification from the terminal apparatus, said advance notification indicating that the group information is about to be deleted, and the updating unit deletes the terminal apparatus that corresponds to the first temporary deletion flag from the terminal list prior to the determination by the registrability determination unit, based on the confirmation by the flag confirmation unit that the first temporary deletion flag has been set.

Accordingly, it is possible to confirm securely that the group information has been deleted while distributing the load caused by concentration of completion notices and registration requests. Therefore, it is possible not only to prevent reliably more than a limited number of terminal apparatuses from forming an authorized group, but also to delete and register terminals from and into the same group smoothly.

Also, in the information management system according to the present invention, the following is possible. The terminal list corresponds to the terminal apparatuses which belong to the group, and includes a column of the second temporary deletion flags indicating whether the advance notification has been received or not, the common management server further includes a second temporary deletion flag setting unit operable to set a second temporary deletion flag that corresponds to the terminal apparatus which has transmitted the advance notification, upon receipt of said advance notification via the second communication unit, the flag confirmation unit searches for the second temporary deletion flag that corresponds to a predetermined terminal apparatus included in the second temporary deletion flag list, and then searches for the first temporary deletion flag that corresponds to said predetermined terminal apparatus included in the first temporary deletion flag list in sequence, and the updating unit deletes the predetermined terminal apparatus that corresponds to both the first temporary deletion flag and the second temporary deletion flag from the terminal list prior to the determination by the registrability determination unit, in a case where the flag confirmation unit confirms that the second temporary deletion flag and the first temporary deletion flag have been set.

Accordingly, it is possible not only to improve accuracy of confirming the completion notification significantly, but also to reduce the load of list management because the number of list types is reduced.

Also, in the information management system according to the present invention, it is possible to assume that the data is group information for determining whether or not a terminal apparatus belongs to a group that is formed of not more than a predetermined number of terminal apparatuses, the management information is a terminal list indicating a list of the terminal apparatuses which belong to the group, and the processing that affects the management information is moving of the group information between the terminal apparatuses.

Also, in the information management system according to the present invention, it is possible to assume that the data is a license of a digital work, the management information is a historical log of the license, and the processing that affects the management information is a use of the license.

Also, in the information management system according to the present invention, it is possible to assume that the data is a license of a digital work, the management information is the number of licenses that said each terminal apparatus can hold, and the processing that affects the management information is deletion of the license.

Also, in the information management system according to the present invention, it is possible to assume that the data is a digital work, the management information is a limited number of distributions of the digital work, and the processing that affects the management information is moving of the license.

It should be noted that the present invention can be realized not only as the above-mentioned information management system, but also as a terminal apparatus or an information management server that makes up the information management system, as an information management method including the steps executed by the characteristic units included in the terminal apparatus or the information management server, or as a program for causing a computer to execute the steps. And it is needless to say that such a program can be distributed via a recording medium such as a CD-ROM or a transmission medium such as the Internet.

As is obvious from the above explanation, the information management system according to the present invention gives no room for existence of fraud in the tamper-resistant module of the terminal apparatus, and further no room for existence of fraud in transmission of a completion notification because it is transmitted via a secure communication channel. Therefore, the information management server can confirm more safely and reliably that the terminal apparatus has executed the processing that affects the management information.

Consequently, the present invention allows transparency of the processing executed by the terminal apparatus that affects the management information, and thus the practical value thereof is extremely high particularly in the present days when distribution of digital works via the Internet or the like and recording media such as a DVD has gained momentum.

BRIEF DESCRIPTION OF DRAWINGS

FIG. 3 is a diagram showing one example of a structure of a group member terminal list.

FIG. 4 is a diagram showing one example of a structure of group information.

FIG. 11 is a diagram showing one example of a structure of a temporary deletion flag list.

FIG. 31 is a block diagram showing a configuration of the group information management server and the group information holding terminals and a flow of their processing.

FIG. 35 is a flowchart showing processing in which after a group information holding terminal 300 transmits a processing request message to a group information holding terminal 400, the group information holding terminal 400 carries out the update determination and then obtains the group information from the group information management server 100.

FIGS. 40A1 to 40B3 are diagrams showing examples of the group information common information and the common information terminal lists according to the present embodiment of the present invention.

DETAILED DESCRIPTION OF THE INVENTION

The embodiments of the present invention, particularly applications thereof to a case where data which should be dealt with securely is group information and management information concerning that data is a terminal list, will be explained in detail with reference to the drawings.

First Embodiment

Figure 1:
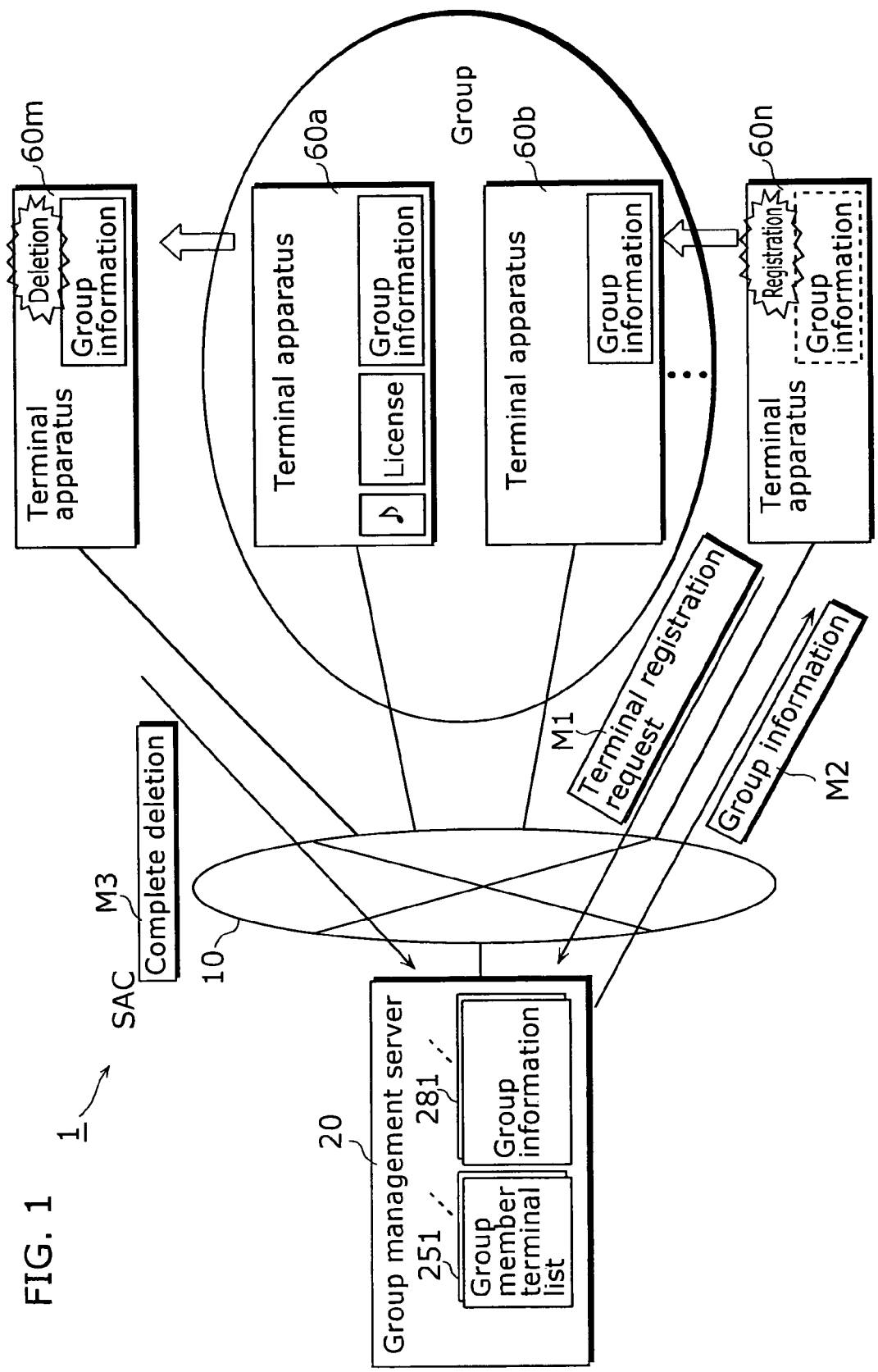
FIG. 1 is a diagram showing an overall configuration of a group information management system 1 according to a first embodiment.

FIG. 1 is a diagram showing an overall configuration of a group information management system according to the first embodiment.

The group information management system 1 is a system for allowing copying and moving of digital works (hereinafter also referred to as "contents") such as music and licenses indicating the rights to use such digital works between terminal apparatuses within a predetermined range of numbers (5 or less, for example) registered into a group, and reproducing the contents at their destinations. As shown in FIG. 1, the system 1 includes: a group management server 20 connected to a network 10 such as the Internet; and a plurality of terminal apparatuses 60a to 60n connected to the network 10.

The group management server 20 is a computer apparatus that holds: group information 281 that is group-specific information for determining whether or not a terminal apparatus belongs to a group; and a group member terminal list 251 for each group indicating a list of terminal apparatuses which belong to the group. And upon receipt of a complete deletion notification message M3 notifying that the group information held by a terminal apparatus (a terminal apparatus 60m in this example) which is to leave from the group has been completely deleted, the group management server 20 deletes this terminal apparatus from the group member terminal list 251. Upon receipt of a terminal registration request message M1 from a terminal apparatus (the terminal apparatus 60n in this example) which is to join the group, the group management server 20 determines whether or not this terminal apparatus can be registered into the group member terminal list 251. Namely, it judges whether or not the number of registered terminal apparatuses has reached the limited number thereof. If the terminal apparatus can be registered into the group member terminal list 251, the group management server 20 transmits the group information notification message M2 including the group information 281 to the terminal apparatus and registers this terminal apparatus into the group member terminal list 251.

Each of the terminal apparatuses 60a to 60n is a computer apparatus that holds the group information only during its membership to the group and executes the processing such as copying and moving of digital works and licenses thereof between the terminal apparatuses which belong to the group. When it leaves from the group, it transmits the complete deletion notification message M3 to the group management server 20 after deleting the group information, and when it joins the group, it transmits the terminal registration request message M1 to the group management server 20 and retains the group information included in the group information notification message M2 received from the group management server 20.

It should be noted that this group information management system 1 is structured so as to judge whether or not a group key included in the group information matches for executing the processing such as copying and moving of digital works and their licenses between the terminal apparatuses and to permit such processing as copying and moving between the terminal apparatuses if the key matches. Therefore, since the group information of the terminal apparatus which has left from the group has been deleted, the processing such as copying and moving of the digital works and their licenses cannot be permitted on that terminal apparatus.

The group information management system 1 may also be structured so as to encrypt the digital works and their licenses in advance and to decrypt the encrypted digital works and licenses with a group key which is specific to the group and included in the group information. According to this structure, since the group information of the terminal apparatus (the terminal apparatus 60m in this example) which has left from the group has been deleted, that terminal apparatus cannot use the encrypted digital works and licenses even if it holds them.

Figure 2:
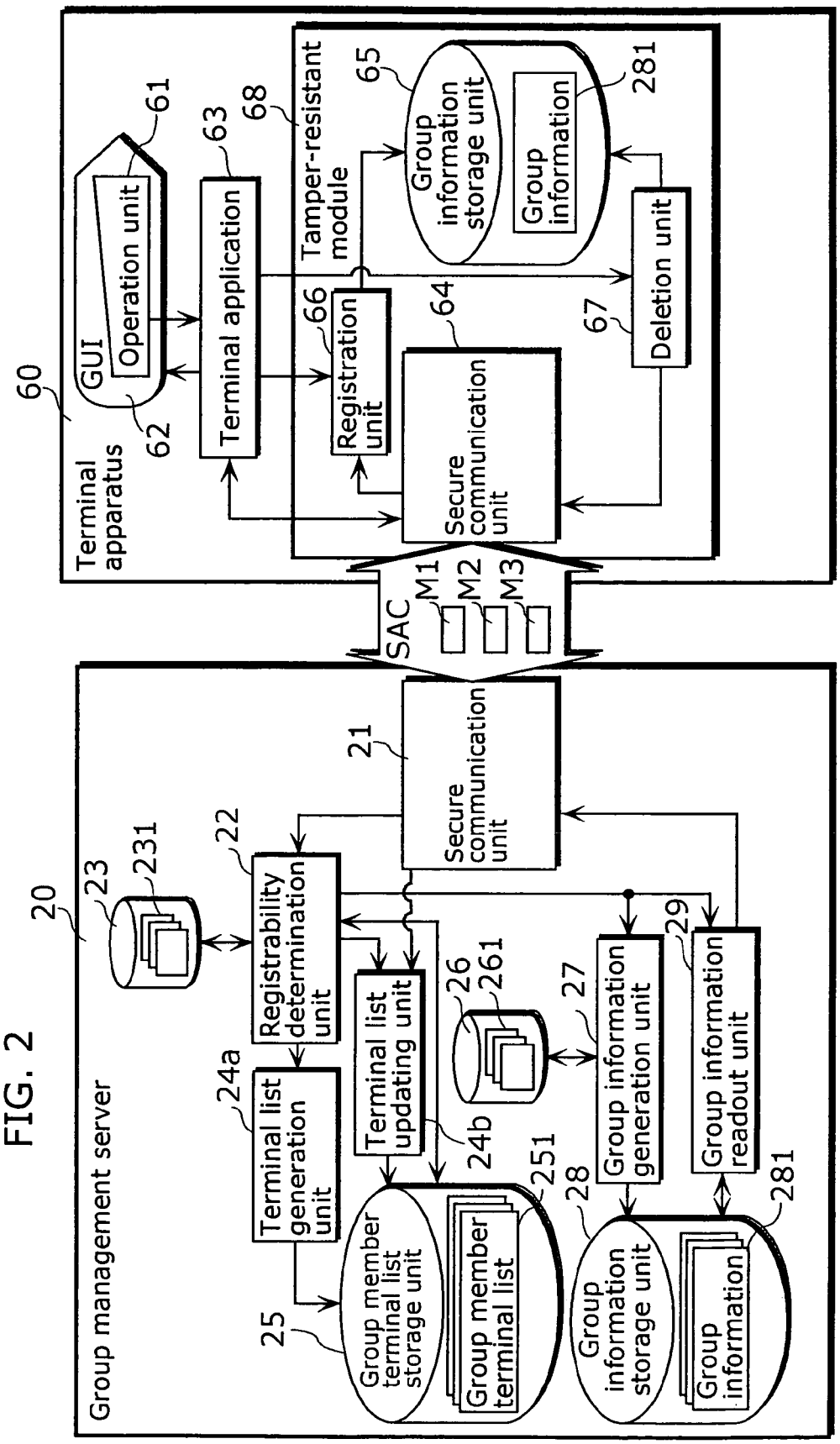
FIG. 2 is a block diagram showing a functional structure of a group management server 20 and terminal apparatuses 60a to 60n as shown in FIG. 1.

FIG. 2 is a block diagram showing the functional structure of the group management server 20 and the terminal apparatuses 60a to 60n as shown in FIG. 1. In FIG. 2, the network 10 is not shown. In addition, the structures of the terminal apparatuses 60a to 60n are all same, they are shown in this figure as a terminal apparatus 60 that is a representative thereof.

The group management server 20 is comprised of a secure communication unit 21, a registrability determination unit 22, a group identifier storage unit 23, a terminal list generation unit 24a, a group member terminal list storage unit 25, a terminal list updating unit 24b, a group key storage unit 26, a group information generation unit 27, a group information storage unit 28, a group information readout unit 29 and others.

The secure communication unit 21 establishes a secure authentication channel (hereinafter also referred to as "SAC") with the terminal apparatus 60, and transmits/receives securely various messages such as the terminal registration request message M1, the group information notification message M2 and the complete deletion notification message M3.

When receiving the terminal registration request message M1 from the terminal apparatus 60 via the secure communication unit 21, the registrability determination unit 22 determines whether or not the terminal apparatus 60 can be registered into the group member terminal list 251, and the like.

The group identifier storage unit 23 stores a plurality of group identifiers 231 which have not yet been used for established groups.

When the registrability determination unit 22 determines that the terminal apparatus 60 that has transmitted the terminal registration request message M1 has not yet joined a group, the terminal list generation unit 24a generates the group member terminal list 251 indicating a list of terminal apparatuses which belong to the group for each group using the unused group identifier.

The group member terminal list storage unit 25 stores the group member terminal list 251 generated by the terminal list generation unit 24a.

When the registrability determination unit 22 judges that the terminal apparatus 60 which has transmitted the terminal registration request message M1 can be stored in the group member terminal list 251, the terminal list updating unit 24b registers this terminal apparatus into the group member terminal list 251, and updates the group member terminal list 251 by adding the terminal apparatus to the list, or by deleting, from the group member terminal list 251, the terminal apparatus which has transmitted the complete deletion notification message M3.

Here, as shown in FIG. 3, the group member terminal list 251 consists of a group identifier 2511 ("0xF001", for example) and a terminal list 2512 storing a plurality of (5 in this example) terminal identifiers in a list form. Note that the mark"−" as shown in this figure indicates a blank, namely, that a terminal can be registered into a group.

The group key storage unit 26 stores a group key 261 which is necessary for moving contents and their licenses between terminal apparatuses.

When the registrability determination unit 22 determines that the terminal apparatus 60 which has transmitted the terminal registration request message M1 has not yet joined a group, the group information generation unit 27 generates group information using the group key 261.

The group information storage unit 28 stores the group information generated by the group information generation unit 27.

When the registrability determination unit 22 determines that the terminal apparatus which has transmitted the terminal registration request message M1 can be registered into the group member terminal list 251, the group information readout unit 29 reads out the group information.

Here, as shown in FIG. 4, the group information 281 consists of a group identifier 2811 and a group key 2812 ("○×Δ . . . □", for example).

The terminal apparatus 60 is comprised of an operation unit 61, a graphical user interface (hereinafter also referred to as "GUI") 62, a terminal application 63, a tamper-resistant module 68 and others. The tamper-resistant module 68 is comprised of an IC card, an IC chip or the like, and includes a secure communication unit 64, a group information storage unit 65, a registration unit 66 and a deletion unit 67.

The operation unit 61 accepts the operations by a user.

The GUI 62 provides a simple and easy-to-understand environment for the user using visually appealing graphic indications (icons).

The terminal application unit 63 gives the following instructions (based on the instructions from the user to register the terminal into the group, delete the terminal from the group and the like): instructions to the secure communication unit 64 to create the terminal registration request message M1 and the complete deletion notification message M3; instructions to the registration unit 66 to register the group information into the group information storage unit 65; and instructions to the deletion unit 67 to delete the group information 281 stored in the group information storage unit 65.

The secure communication unit 64 establishes a SAC with the group management server 20, and securely transmits and receives various messages such as the terminal registration request message M1, the group information notification message M2 and the complete deletion notification message M3.

The group information storage unit 65 stores the group information.

The registration unit 66 registers the group information, included in the group information notification message M2 transmitted from the group management server 20 via the secure communication unit 64, into the group information storage unit 65.

The deletion unit 67 deletes the group information registered in the group information storage unit 65.

Figure 5:
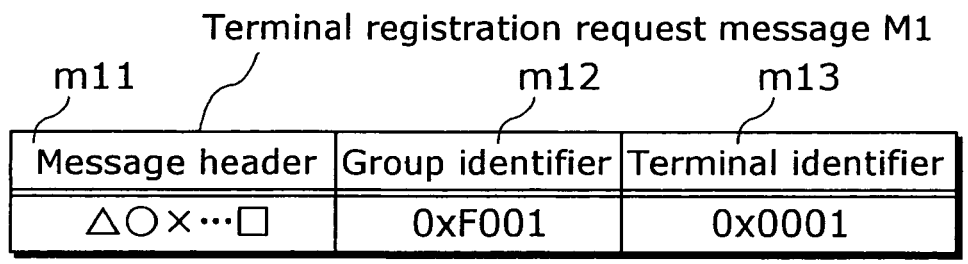
FIG. 5 is a diagram showing one example of a structure of a terminal registration request message.

Here, as shown in FIG. 5, the terminal registration request message M1 consists of a message header M11 ("Δ○× . . . □", for example), a group identifier m12 and a terminal identifier m13. Note that the group identifier selected and transmitted by the group management server 20 and the group identifier entered by the user are stored in the group identifier m12. Here, the group identifier is obtained from the group management server 20 at the membership registration for the services or obtained from the terminal which has already joined the domain. The obtained group identifier is held in the terminal apparatus or kept in the user's mind. In the former case, the group identifier is automatically set in the terminal registration request message M1, whereas in the latter case, the group identifier is set based on the user's entry.

Figure 6:
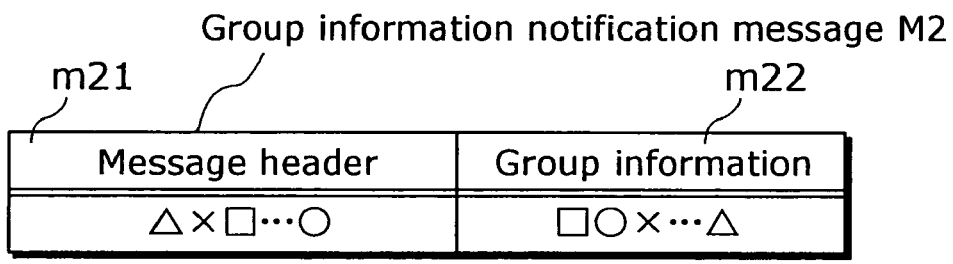
FIG. 6 is a diagram showing one example of a structure of a group information notification message.

Also, as shown in FIG. 6, the group information notification message M2 consists of a message header m21 and group information m22.

Figure 7:
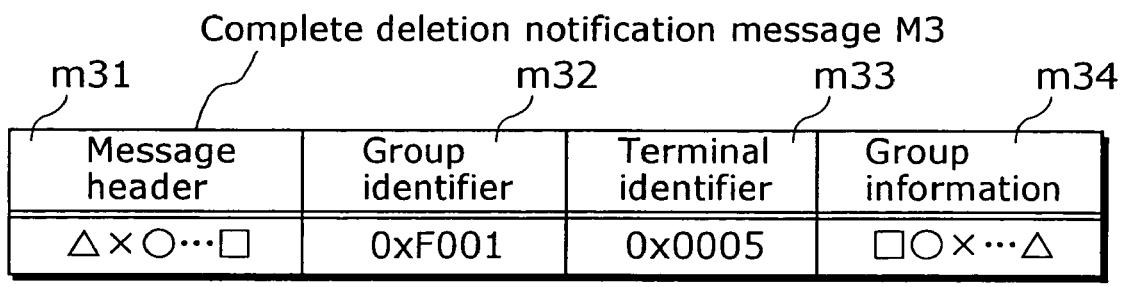
FIG. 7 is a diagram showing one example of a structure of a complete deletion notification message.

Furthermore, as shown in FIG. 7, the complete deletion notification message M3 consists of a message header m31, a group identifier m32, a terminal identifier m33 and group information m34.

It should be noted that the message headers m11 to m31 as shown in FIG. 5 to FIG. 7 are comprised of the transmitters of the messages M1 to M3, the addresses of the destinations, the message identifiers for identifying the messages, and others.

Next, the operation of the processing executed between the group management server 20 and the terminal apparatus 60 will be explained.

Figure 8:
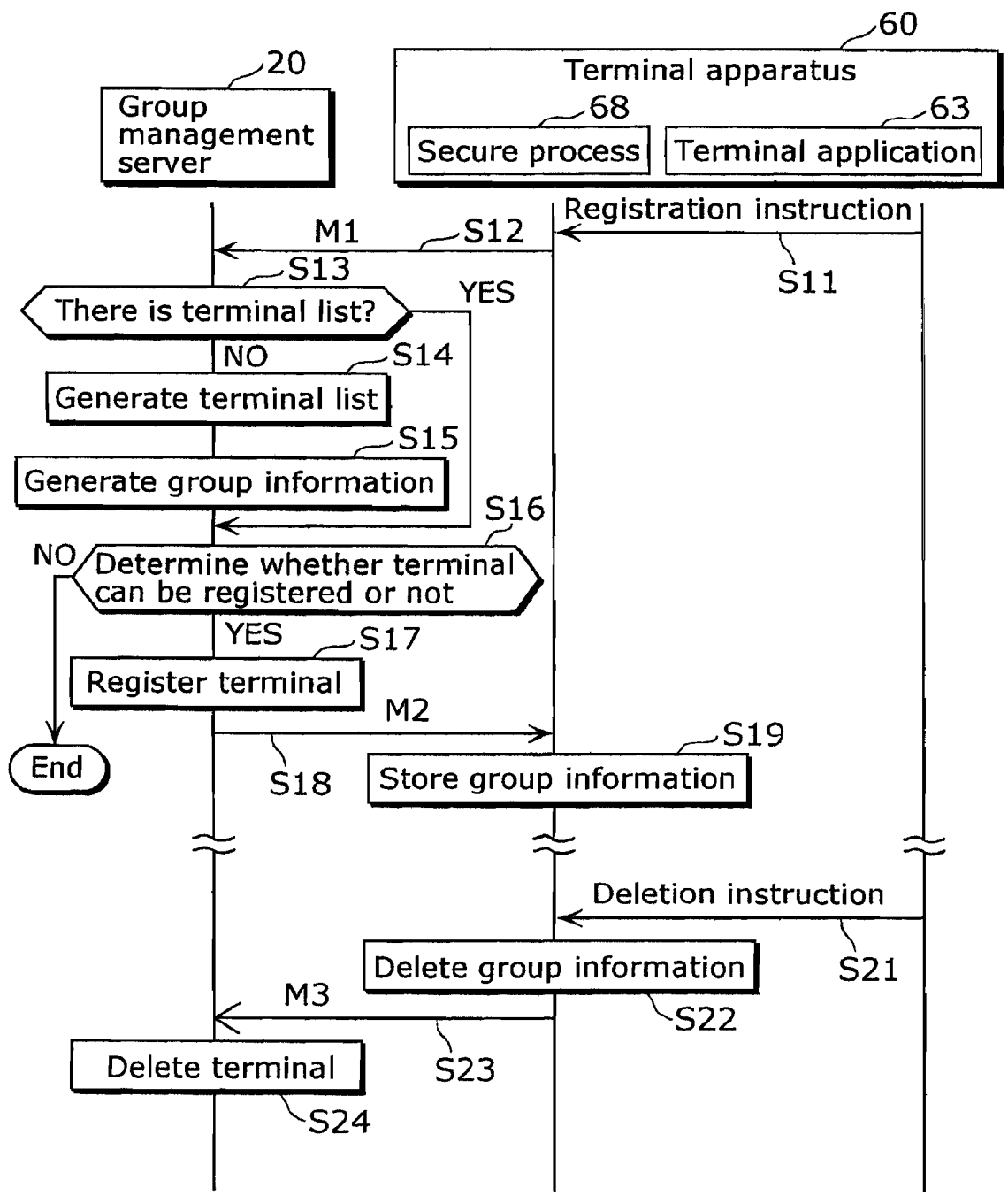
FIG. 8 is a sequence diagram showing processing executed between the group management server 20 and the terminal apparatus 60.

FIG. 8 is a sequence diagram showing the processing executed between the group management server 20 and the terminal apparatus 60. Note that the processing executed within the tamper-resistant module 68 is referred to as a secure process.

According to the instruction to register the terminal from the terminal application 63 (S11), the secure communication unit 64 transmits the terminal registration request message M1 to the group management server 20 (S12).

Upon receipt of the terminal registration request message M1 via the secure communication unit 21, the registrability determination unit 22 searches the group member terminal list storage unit 25 to judge whether or not there is the group member terminal list having the group identifier included in the terminal registration request message M1 (S13). If there is no such list, the terminal list generation unit 24a generates the group member terminal list (S14), stores the generated group member terminal list in the group member terminal list storage unit 25, while the group information generation unit 27 generates the group information (S15) and stores the generated group information in the group information storage unit 28. In a case where the terminal list and the group information are generated (S14 and S15) or there is the terminal list in Step S13, the registrability determination unit 22 determines whether or not the terminal can be registered into the group member terminal list (S16). This is determined based on whether or not the number of terminal apparatuses registered in the group member terminal list has reached the limited number thereof. If it has reached that number, the terminal is not registered and the processing for the terminal registration request is ended. If it has not yet reached that number, the terminal is registered in the group member terminal list (S17), and the group information notification message M2 is transmitted to the terminal apparatus 60 (S18).

Upon receipt of the group information notification message M2 via the secure communication unit 64, the registration unit 66 stores the group information included in the group information notification message M2 into the group information storage unit 65 (S19).

As a result, the terminal apparatus 60 can execute the processing such as copying and moving of digital works and their licenses with other terminal apparatuses which belong to the group.

On the other hand, according to the instruction from the terminal application 63 to delete the terminal (S21), the deletion unit 67 securely deletes the group information stored in the group information storage unit 65 (S22). After the secure deletion of the group information, the secure communication unit 64 transmits the complete deletion notification message M3 to the group management server 20 (S23).

Upon receipt of the complete deletion notification message M3 via the secure communication unit 21 and the registrability determination unit 22, the terminal list updating unit 24b searches the group member terminal list storage unit 25, and deletes the terminal from the group member terminal list having the group identifier included in the complete deletion notification message M3 (S24).

As a result, it is possible to avoid, without fail, fraud, such that a terminal apparatus notifies the information management server of the deletion of its own group information although it has not yet been deleted, and thus it is possible to prevent, without fail, more than a limited number of, 5 or 10, for example, terminal apparatuses from forming an unauthorized group in spite of such limitation of the number of terminal apparatuses. In summary, even if the processing that affects the management information is executed on a terminal apparatus, the invention according to the first embodiment makes it possible to prevent such fraud as hiding the unauthorized execution of such processing.

Next, another embodiment of the present invention will be explained. Particularly, an application thereof to a case where data which should be dealt with securely is group information and management information concerning that data is a terminal list will be explained in detail with reference to the drawings.

Second Embodiment

Figure 9:
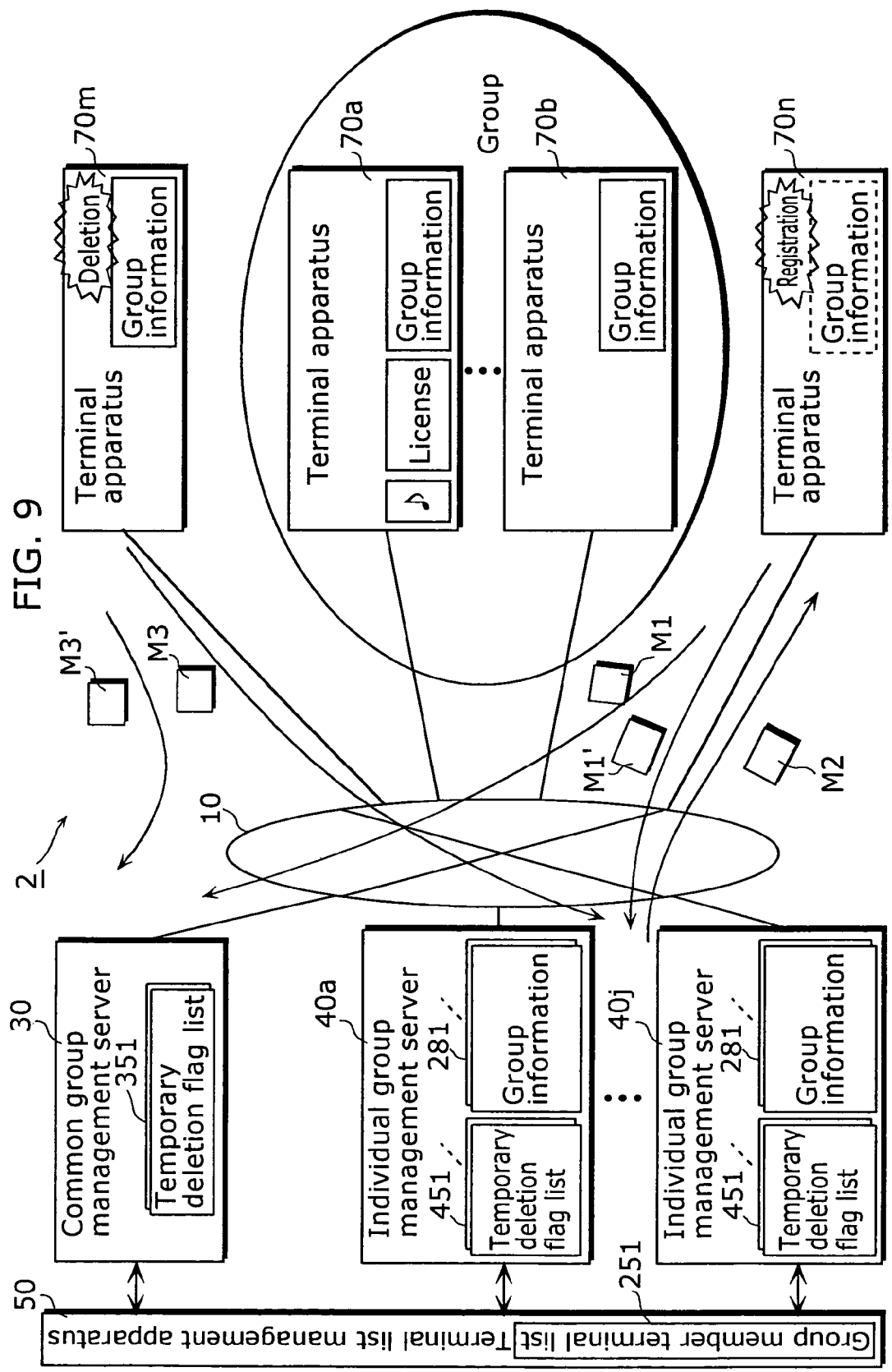
FIG. 9 is a diagram showing an overall configuration of a group information management system according to a second embodiment.

FIG. 9 is a diagram showing an overall configuration of a group information management system 2 according to the second embodiment. Note that the same reference numbers are assigned to the units corresponding to the constituent elements of the group information management system 1, and the detailed explanation thereof is not repeated.

The group information management system 2 is configured so as to divide the group management server 20 into a plurality of apparatuses for distributing the load on the group management server 20 of the first embodiment. As shown in FIG. 9, the group information management system 2 includes: the network 10; a common group management server 30 connected to the network 10; a plurality of individual group management servers 40a to 40j connected to the network 10; a terminal list management apparatus 50 for overall managing the common group management server 30 and the individual group management servers 40a to 40j; terminal apparatuses 70a to 70n connected to the network 10; and others.

The common group management server 30 is a computer apparatus which is unique to all the services provided in this group information management system 2, and holds a temporary deletion flag list 351 for each group including a temporary deletion flag for temporarily deleting a terminal apparatus which belongs to a group before actually deleting it. Upon receipt of a deletion request message M3' from a terminal apparatus (the terminal apparatus 70m in this example) which is to leave from the group, the common group management server 30 sets the temporary deletion flag corresponding to this terminal apparatus to "1" and notifies the terminal apparatus of the destination address of the complete deletion notification message M3. Also, upon receipt of the terminal registration request message M1 from a terminal apparatus (the terminal apparatus 7n in this example) which is to join the group, the common group management server 30 passes this message to the terminal list management apparatus 50 and notifies it of the destination address of an obtainment request message M1' for obtaining the group information 281.

Each of the individual group management servers 40a to 40j is a computer apparatus which is placed for each service in this group information management system 2, and holds the group information 281 as well as a temporary deletion flag list 451 having the same structure as the temporary deletion flag list 351, in the light of load distribution. Upon receipt of the complete deletion notification message M3 from the terminal apparatus (the terminal apparatus 70m in this example) which is to leave from the group, each of the individual group management servers 40a to 40j sets the temporary deletion flag corresponding to this terminal apparatus to "1". Also, upon receipt of the obtainment request message M1' from the terminal apparatus (the terminal apparatus 70n in this example) which is to join the group, each of the individual group management servers 40a to 40j distributes the group information notification message M2 including the group information 281 to this terminal apparatus.

The terminal list management apparatus 50 is a computer apparatus that holds the group member terminal list 251, and generates the group information 281 held in each of the individual group management servers 40a to 40j, and generates the temporary deletion flag list 351 held in the common group management server 30 and the temporary deletion flag list 451 held in each of the individual group management servers 40a to 40j. Upon receipt of the terminal registration request message M1 via the common group management server 30, the terminal list management apparatus 50 judges whether or not this terminal apparatus can be registered into the group member terminal list 251. If it can be registered into the group member terminal list 251, the terminal list management apparatus 50 registers this terminal apparatus into the group member terminal list 251. And the terminal list management apparatus 50 searches the temporary deletion flag lists 351 and 451 at a predetermined timing, and if the temporary deletion flags in both of them are set to "1", it deletes the terminal apparatus from the group member terminal list 251.

Each of the terminal apparatuses 70a to 70n is a computer apparatus that holds the group information only during its membership to a group like each of the terminal apparatuses

60a to 60n, and executes the processing such as copying and moving of digital works and licenses corresponding to the digital works between the terminal apparatuses that belong to this group. When each of the terminal apparatuses 70a to 70n leaves from the group, it transmits the deletion request message M3' to the common group management server 30 in advance, deletes the group information, and then transmits the complete deletion notification message M3 to one of the individual group management servers 40a to 40j having the address, namely, a uniform resource identifier (URI), notified from the common group management server 30.

When each of the terminal apparatuses 70a to 70n joins the group, it transmits the terminal registration request message M1 to the common group management server 30, transmits the obtainment request message M1' to one of the individual group management servers 40a to 40j having the URI notified from the common group management server 30, and holds the group information included in the group information notification message M2 received from said one of the individual group management servers 40a to 40j.

Figure 10:
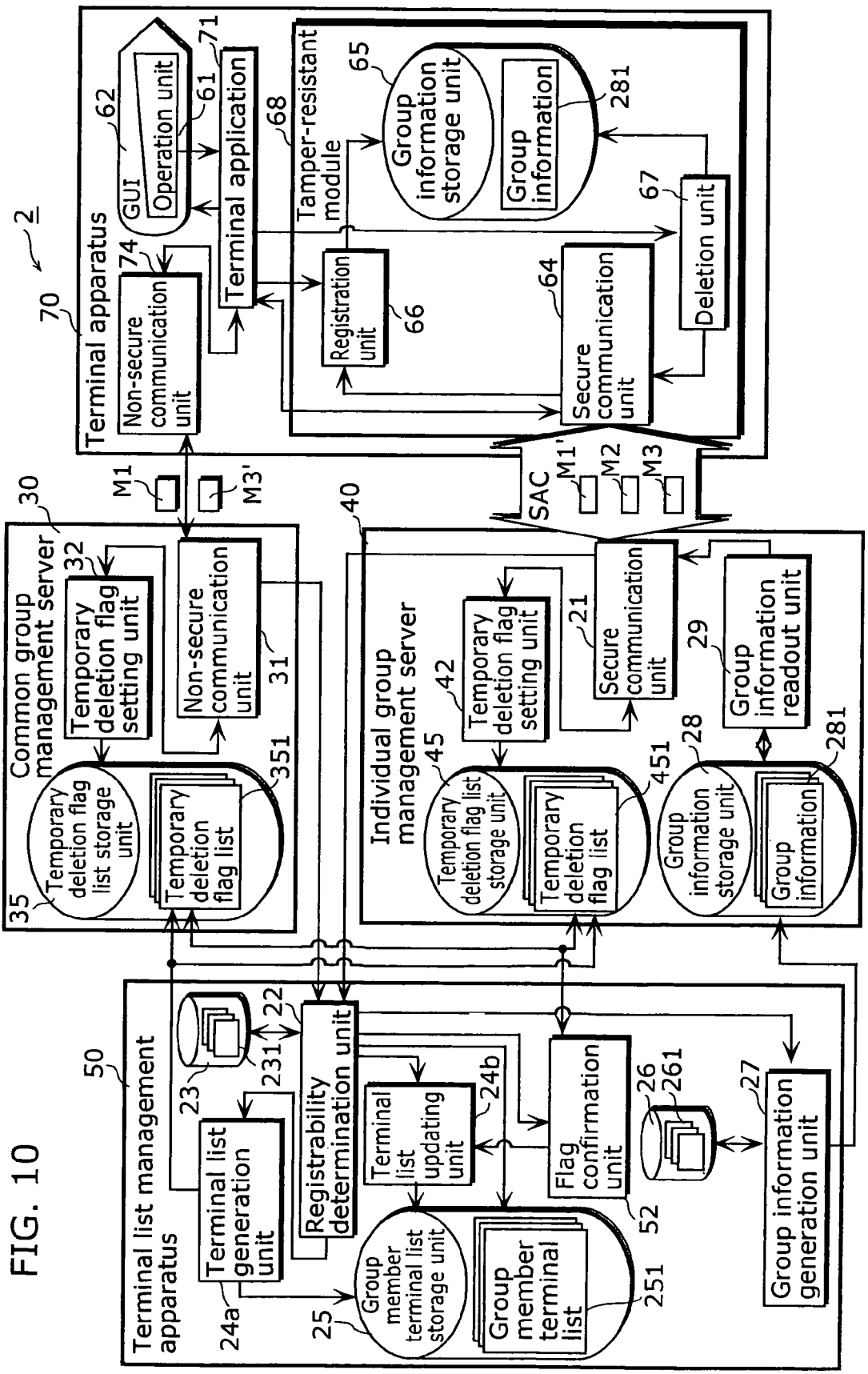
FIG. 10 is a block diagram showing functional structures of a terminal list management apparatus 50, a common group management server 30, individual group management servers 40a to 40j and terminal apparatuses 70a to 70n as shown in FIG. 9.

FIG. 10 is a block diagram showing the functional structures of the terminal list management apparatus 50, the common group management server 30, the individual group management servers 40a to 40j and the terminal apparatuses 70a to 70n as shown in FIG. 9. Note that the network 10 is not shown in FIG. 10. Also, since the structures of the individual group management servers 40a to 40j are all same, they are shown as an individual group management server 40 that is a representative thereof, and since the structures of the terminal apparatuses 70a to 70n are all same, they are shown as a terminal apparatus 70 that is a representative thereof.

The terminal list management apparatus 50 includes: the registrability determination unit 22; the group identifier storage unit 23; the terminal list generation unit 24a; the terminal list updating unit 24b; the group member terminal list storage unit 25; the group key storage unit 26; and the group information generation unit 27, as does the group management server 20, and further includes a flag confirmation unit 52 for confirming at a predetermined timing whether or not the temporary deletion flags of the temporary deletion flag lists 351 and 451 are set to "1".

The common group management server 30 includes: a non-secure communication unit 31 for communicating with the terminal apparatus 70; a temporary deletion flag list storage unit 35 for storing the temporary deletion flag list 351 generated by the terminal list generation unit 24a in the terminal list management apparatus 50; and a temporary deletion flag setting unit 32 for setting the temporary deletion flag in the temporary deletion flag list 351 to "1" when receiving the deletion request message M3' from the terminal apparatus 70 via the non-secure communication unit 31.

The individual group management server 40 includes the secure communication unit 21, the group information storage unit 28 and the group information readout unit 29, as does the group management server 20, and further includes: a temporary deletion flag list storage unit 45 for storing the temporary deletion flag list 451 generated by the terminal list generation unit 24a in the terminal list management apparatus 50; and a temporary deletion flag setting unit 42 for setting the temporary deletion flag in the temporary deletion flag list 451 to "1" when receiving the complete deletion notification message M3 from the terminal apparatus via the secure communication unit 21.

The terminal apparatus 70 includes the operation unit 61, the GUI 62 and the tamper-resistant module 68, as does the terminal apparatus 60, and further includes: a non-secure communication unit 74 for communicating with the common group management server 30; and a terminal application 71 for delivering instructions given from the operation unit 61, upon receipt thereof, to the non-secure communication unit 74, and the secure communication unit 64, the registration unit 66 and the deletion unit 67 in the tamper-resistant module 68, and delivering the URLs received via the non-secure communication unit 74 to the secure communication unit 64.

Here, as shown in FIG. 11, the temporary deletion flag list 351 is comprised of: a group identifier 3511 ("0xF001", for example); a terminal list 3512 for storing a plurality of (5 in this example) terminal identifiers in a list form; and a temporary deletion flag list 3513 for storing in a list form temporary deletion flags 1 which individually correspond to respective terminal identifiers. Like the temporary deletion flag list 351, the temporary deletion flag list 451 is also comprised of: the group identifier 3511; the terminal list 3512; and a temporary deletion flag list 4513 for storing in a list form temporary deletion flags 2 which individually correspond to respective terminal identifiers. These temporary deletion flag lists 351 and 451 can be structured easily only by associating the temporary deletion flags 1 and 2 with the group member terminal list 251, and thus deletion of a terminal can also be managed easily.

It should be noted that the structure of the obtainment request message M1' is not shown in this figure because it differs from the terminal registration request message M1 as shown in FIG. 5 only in the message ID in the message header. Also, the structure of the deletion request message M3' is not shown in this figure because it differs from the complete deletion notification message M3 as shown in FIG. 7 only in the deletion of the group information and the message ID in the message header.

Next, the operation for the processing executed between the terminal apparatus 70 and the common group management server 30, the individual group management server 40 and the terminal list management apparatus 50 will be explained.

First, the processing of registering a terminal into a group will be explained.

Figure 12:
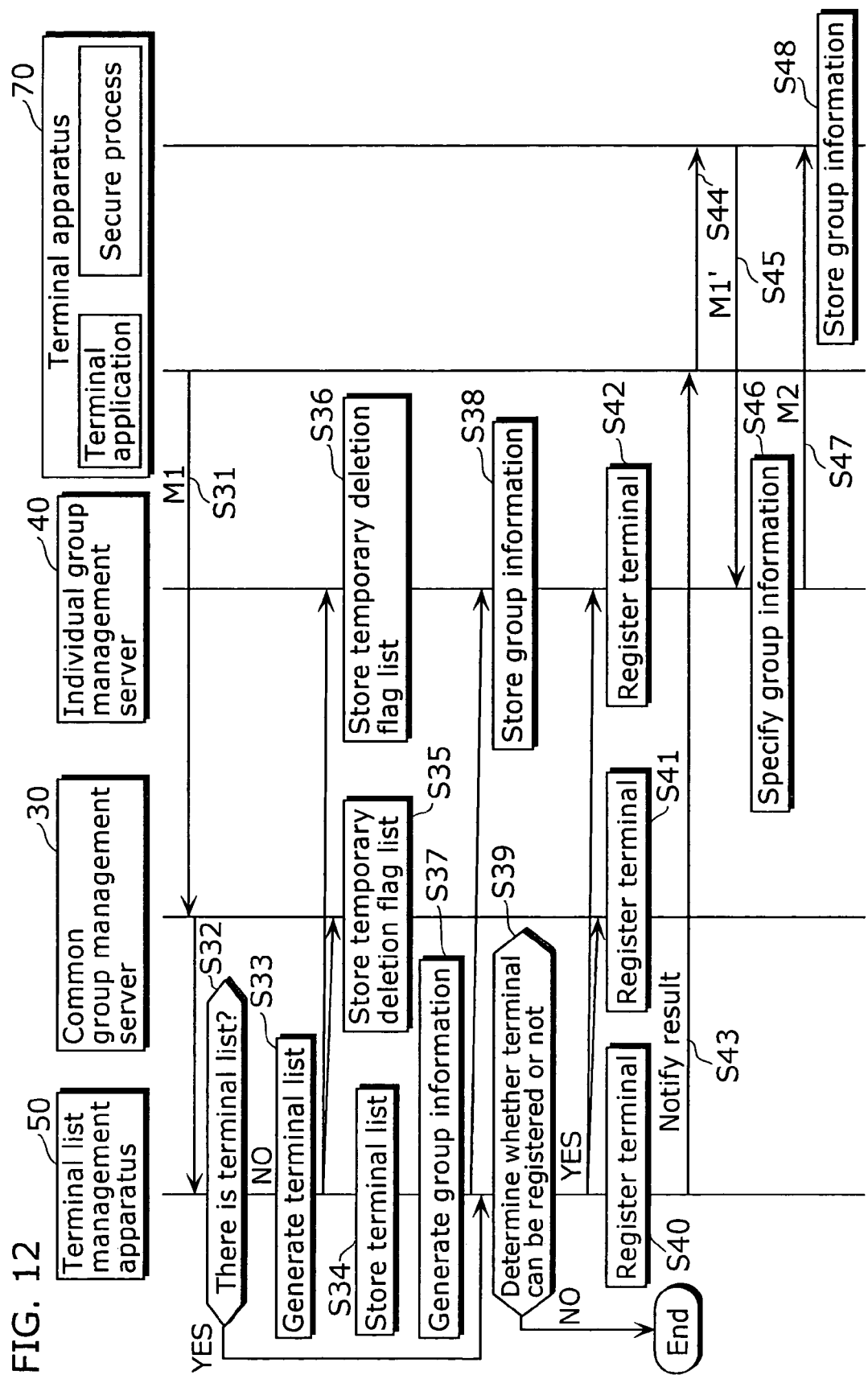
FIG. 12 is a sequence diagram showing processing of registering a terminal into a group.

FIG. 12 is a sequence diagram showing the processing of registering a terminal into a group.

According to the instruction to register a terminal from the terminal application 71 of the terminal apparatus 70, the non-secure communication unit 74 generates the terminal registration request message M1 including the group ID, terminal ID and service ID, and transmits the generated terminal registration request message M1 to the common group management server 30 (S31).

Upon receipt of the terminal registration request message M1, the non-secure communication unit 31 of the common group management server 30 transmits the received terminal registration request message M1 to the registrability determination unit 22 in the terminal list management apparatus 50.

Upon receipt of the terminal registration request message M1, the registrability determination unit 22 judges whether or not there is the group member terminal list 251 in the group member terminal list storage unit 25 using the group identifier m12 as a key (S32). If there is not the group member terminal list 251 for that group, the registrability determination unit 22 instructs the terminal list generation unit 24a to generate the group member terminal list 251 and the temporary deletion flag lists 351 and 451, as well as instructs the group information generation unit 27 to generate the group information. Note that if there is the group member terminal list 251 for that group, it goes to the registrability determination processing to be described later.

According to the instruction, the terminal list generation unit 24a generates the group member terminal list 251 (S33) and stores the generated group member terminal list 251 into the group member terminal list storage unit 25 (S34). Also, the terminal list generation unit 24a generates the temporary deletion flag list 351 and stores the generated temporary deletion flag list 351 into the temporary deletion flag list storage unit 35 in the common group management server 30 (S35), and generates the temporary deletion flag list 451 and stores the generated temporary deletion flag list 451 into the temporary deletion flag list storage unit 45 in the individual group management server 40 (S36).

On the other hand, according to the instruction, the group information generation unit 27 generates the group information 281 (S37) and stores the generated group information into the group information storage unit 28 in the individual group management server 40 (S38).

After these lists 251, 351 and 451 have been stored into the storage units 25, 35 and 45 respectively, or if these lists 251, 351 and 451 exist, the registrability determination unit 22 determines whether or not the terminal can be registered into each of the lists 251, 351 and 451 (S39). This is determined based on whether or not the number of terminal identifiers registered in the group member terminal list 251 has reached the limited number thereof. If the terminal cannot be registered, the processing for the terminal registration request is ended. On the other hand, if it can be registered, the terminal list updating unit 24b registers the terminal into each of the lists 251, 351 and 451 (S40, S41 and S42).

After the terminal has been registered, the registrability determination unit 22 notifies the terminal application 71, via the non-secure communication unit 31, of the result of the registration as well as the URI of the individual group management server corresponding to the service ID (S43).

Upon receipt of the notification of the result including the URI, the terminal application 71 instructs the secure communication unit 64 to transmit the obtainment request message M1' for obtaining the group information 281 to that URI (S44). According to the instruction from the terminal application 71, the secure communication unit 64 establishes the SAC with the individual group management server 40 having that URI, and then transmits the obtainment request message M1' including the group ID and the terminal ID to that individual group management server 40 (S45). Note that the obtainment request message M1' may be structured without including the terminal ID.

Upon receipt of the obtainment request message M1', the group information readout unit 29 in the individual group management server 40 identifies the group information corresponding to the group identifier (S46), confirms whether the terminal ID is included or not, and if it is included, instructs the secure communication unit 21 to transmit the group information. According to the instruction, the secure communication unit 21 transmits the group information notification message M2 to the terminal apparatus 70 (S47).

Upon receipt of the group information notification message M2, the registration unit 66 in the terminal apparatus 70 extracts the group information 281 from the group information notification message M2 and stores the extracted group information 281 into the group information storage unit 65 (S48). Note that the group ID may be included into the group information notification message M2 so as to determine whether or not that group ID matches the group ID included in the transmitted obtainment request.

Accordingly, it is possible to copy contents and their licenses on the terminal apparatuses 70 within the group for reproduction of the contents.

Next, pre-processing for deleting a terminal from a group will be explained.

Figure 13:
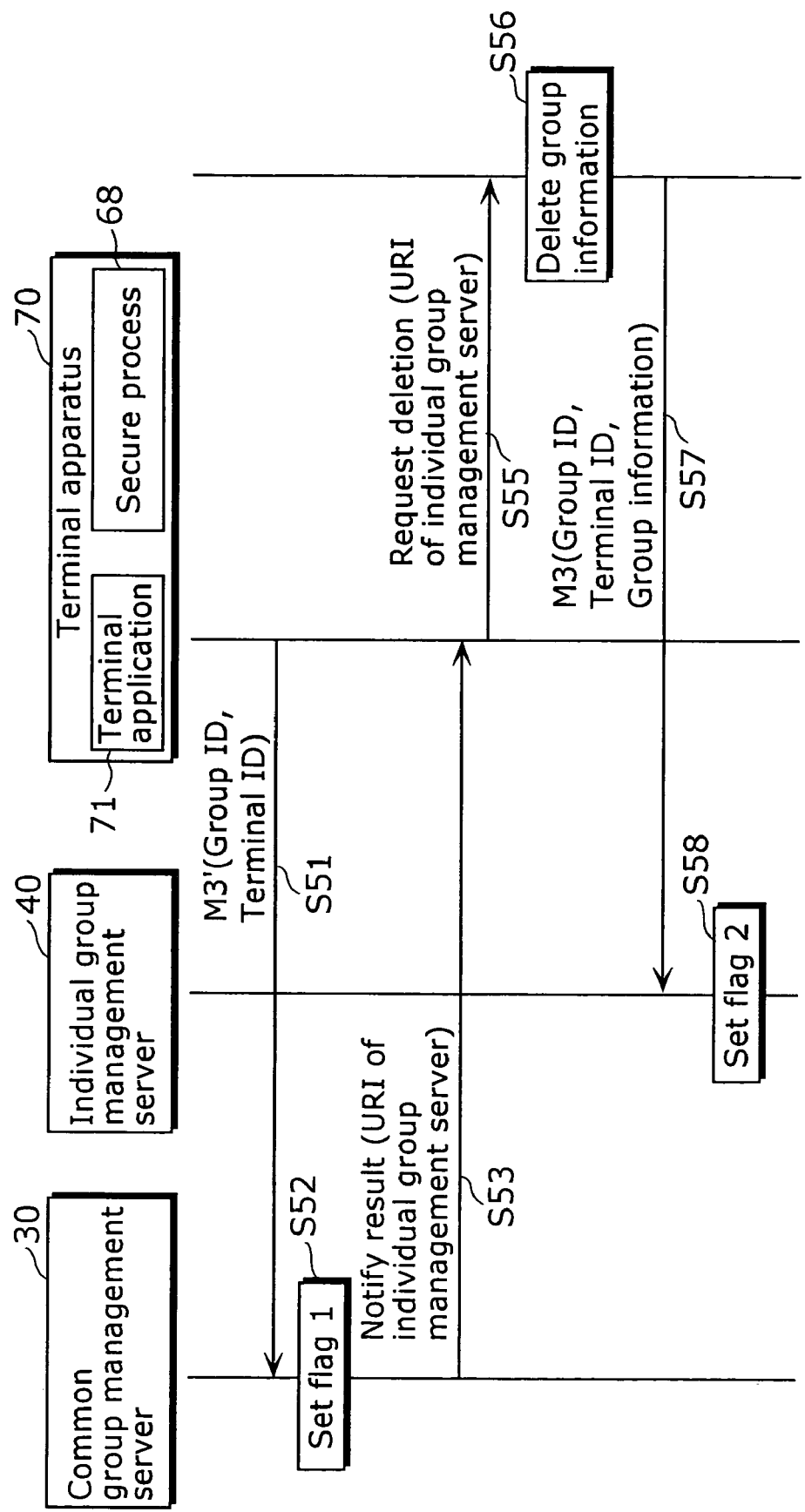
FIG. 13 is a sequence diagram showing pre-processing for deleting a terminal from a group.

FIG. 13 is a sequence diagram showing pre-processing for deleting a terminal from a group.

Upon receipt of the instruction to delete the terminal from the group from the user via the operation unit 61, the terminal application 71 in the terminal apparatus 70 transmits the deletion request message M3' for deleting the terminal to the common group management server 30 via the non-secure communication unit 74 (S51). Here, the deletion request message M3' is structured by including the group ID and the terminal ID as well as the message header.

Upon receipt of the deletion request message M3' from the terminal apparatus 70 via the non-secure communication unit 31, the temporary deletion flag setting unit 32 in the common group management server 30 searches the temporary deletion flag list storage unit 35 to identify the temporary deletion flag list 351 having the group ID included in the deletion request message M3'. Then, the temporary deletion flag setting unit 32 sets the temporary deletion flag 1 corresponding to the terminal ID included in the deletion request message M3' to "1" indicating the deletion (S52). The temporary deletion flag setting unit 32 further notifies the terminal application 71, via the non-secure communication unit 31, of the result of the deletion as well as the URI of the individual group management server included therein (S53).

Upon receipt of the result including the URI, the terminal application 71 transmits the deletion request for deleting the group information 281 as well as the URI of the individual group management server included therein to the deletion unit 67 (S55). Upon receipt of the deletion request from the terminal application 71, the deletion unit 67 deletes securely the group information stored in the group information storage unit 65 (S56). After deleting the group information, the deletion unit 67 has the secure communication unit 64 establish a SAC with the individual group management server 40 having the URI included in the deletion request, and then transmits the complete deletion notification message M3 including the group ID and the terminal ID to the individual group management server 40 having that URI (S57). It should be noted that although the complete deletion notification message M3 is comprised of the group ID, the terminal ID and the group information here, it may be comprised of the group ID and the terminal ID only, or the terminal ID and the group information only.

Upon receipt of the complete deletion notification message M3 via the secure communication unit 21, the temporary deletion flag setting unit 42 in the individual group management server 40 searches the temporary deletion flag list storage unit 45 to identify the temporary deletion flag list 451 having the group ID included in the complete deletion notification message M3. Then, the temporary deletion flag setting unit 42 sets the temporary deletion flag 2 corresponding to the terminal ID included in the complete deletion notification message M3 to "1" indicating the deletion (S58).

The processing as mentioned above of setting the temporary deletion flags 1 and 2 to "1" indicating the deletion makes preparation for deleting the terminal apparatus 70 having the terminal ID from the group.

Next, the processing of actually deleting the terminal from the group will be explained.

Figure 14:
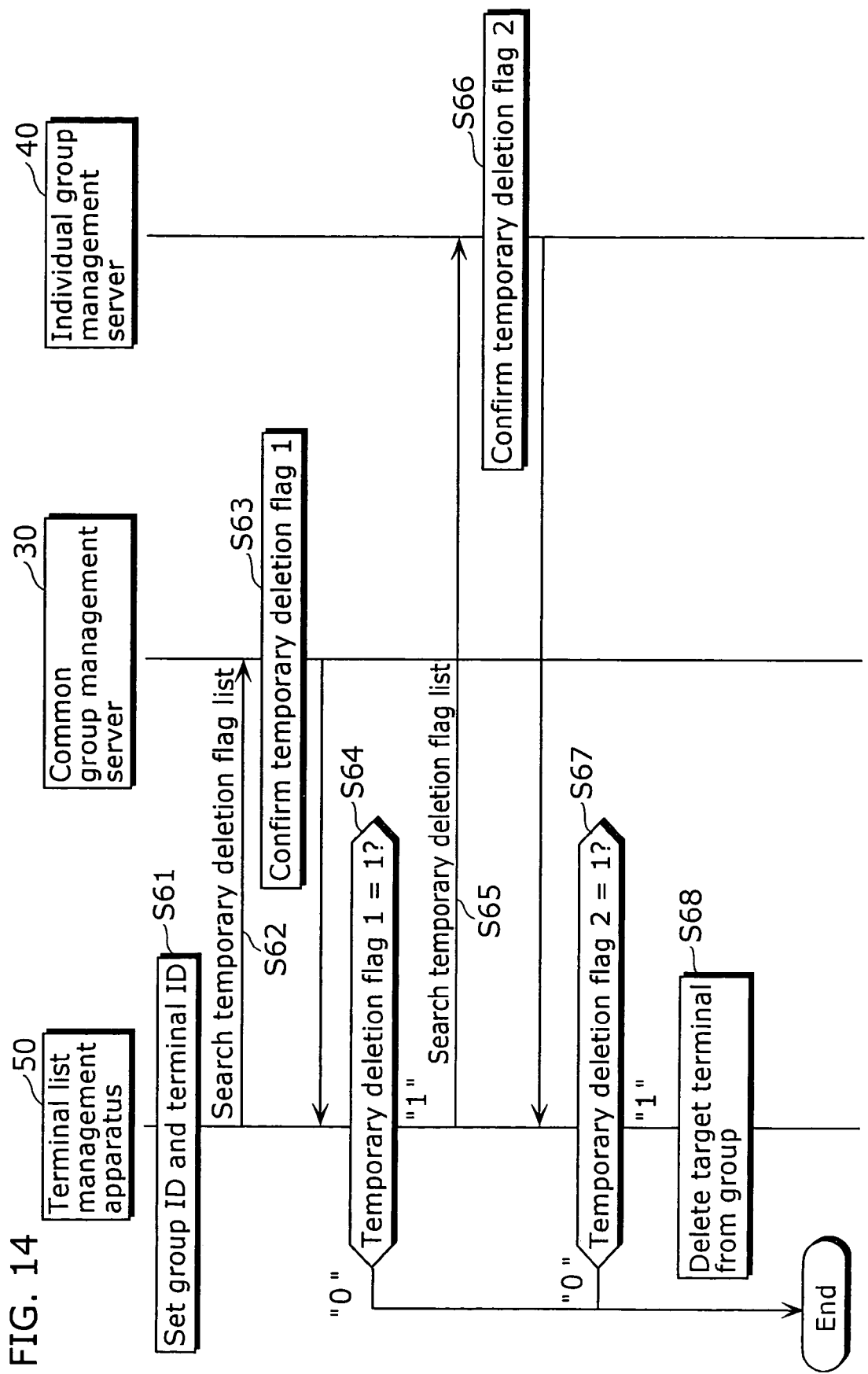
FIG. 14 is a sequence diagram showing processing for actually deleting a terminal from a group.

FIG. 14 is a sequence diagram showing the processing of actually deleting the terminal from the group. This diagram shows a sequence in which the flag confirmation unit 52 in the terminal list management apparatus 50 confirms the temporary deletion flags 1 and 2 at an arbitrary timing.

The flag confirmation unit 52 in the terminal list management apparatus 50 sets a predetermined group ID and terminal ID at an arbitrary timing (S61). Such a group ID and terminal ID are selected from the group member terminal list 251 stored in the group member terminal list storage unit 25.

After setting the group ID and the terminal ID, the flag confirmation unit 52 searches the temporary deletion flag list 351 stored in the temporary deletion flag list storage unit 35 in the common group management server 30 to identify the temporary deletion flag list having the set group ID and terminal ID (S62), confirms the temporary deletion flag 1 (S63), and judges whether "1" indicating the deletion of the terminal is set or not (S64).

When the temporary deletion flag 1 is set to "1", the flag confirmation unit 52 searches the temporary deletion flag list 451 stored in the temporary deletion flag list storage unit 45 in the individual group management server 40 to identify the temporary deletion flag list having the set group ID and terminal ID (S65), confirms the temporary flag 2 (S66), and judges whether "1" indicating the deletion of the terminal is set or not (S67).

If the temporary deletion flag 2 is also set to "1", the flag confirmation unit 52 deletes the terminal identifier from the group member terminal list 251 stored in the group member terminal list storage unit 25. In summary, it deletes the target terminal from the group (S68). It should be noted that after completing the deletion of the terminal from the group member terminal list 251, the item corresponding to the terminal identifier may be deleted from the temporary deletion flag list 351 and the temporary deletion flag list 451.

The processing as mentioned above allows the complete deletion of the terminal from the group based on the set group ID and terminal ID.

Next, another processing of actually deleting the terminal from the group will be explained.

Figure 15:
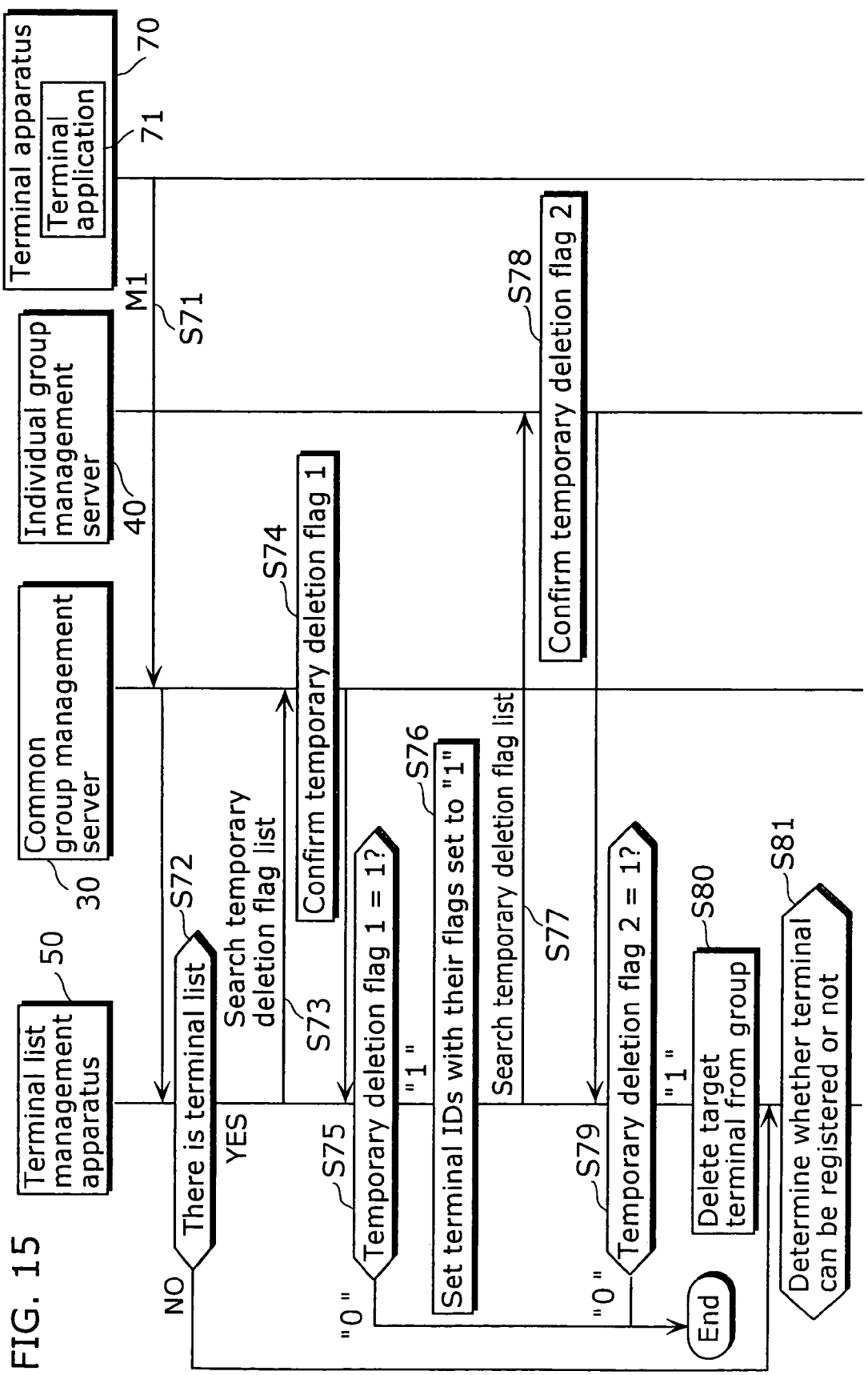
FIG. 15 is a sequence diagram showing another processing for actually deleting a terminal from a group.

FIG. 15 is a sequence diagram showing another processing of actually deleting the terminal from the group. Note that this figure shows a sequence in which in a case where the terminal application 71 in the terminal apparatus 70 transmits the terminal registration request message M1 to the common group management server 30, such transmission of the terminal registration request message M1 triggers the flag confirmation unit 52 in the terminal list management apparatus 50 to confirm the temporary deletion flags 1 and 2.

According to the instruction to register the terminal from the terminal application 71 in the terminal apparatus 70, the non-secure communication unit 74 generates the terminal registration request message M1 including the group ID, the terminal ID and the service ID, and transmits the generated terminal registration request message M1 to the common group management server 30 (S71).

Upon receipt of the terminal registration request message M1, the non-secure communication unit 31 in the common group management server 30 transmits the received terminal registration request message M1 to the registrability determination unit 22 in the terminal list management apparatus 50.

Upon receipt of the terminal registration request message M1, the registrability determination unit 22 judges whether or not there is the group member terminal list 251 in the group member terminal list storage unit 25 (S72). If there is the group member terminal list 251 for that group, the flag confirmation unit 52 searches the temporary deletion flag list 351 stored in the temporary deletion flag list storage unit 35 in the common group management server 30 to identify the temporary deletion flag list having the same group ID as the group member terminal list 251 (S73), confirms all the temporary deletion flags 1 (S74) and judges whether or not "1" indicating the deletion of the terminal is set (S75). Then, the flag confirmation unit 52 sets all the terminal IDs of the terminals whose temporary deletion flags 1 are set to "1" (S76). The flag confirmation unit 52 further searches the temporary deletion flag list 451 stored in the temporary deletion flag list storage unit 45 in the individual group management server 40 to identify the temporary deletion flag list having the same group ID as the group member terminal list 251 (S77), confirms all the temporary deletion flags 2 corresponding to all the terminal IDs set in Step S76 (S78), and judges whether or not "1" indicating the deletion of the terminal is set (S79).

If the corresponding temporary deletion flags 2 are also set to "1", the flag confirmation unit 52 deletes all the terminal identifiers from the corresponding group member terminal lists 251 stored in the group member terminal list storage unit 25 (S80). In other words, the flag confirmation unit 52 deletes, from the group, the terminals whose temporary deletion flags 1 and 2 are set to "1", from among the group member terminal list having the group ID included in the terminal registration request message M1.

The processing as mentioned above allows the complete deletion of the terminals whose temporary flags 1 and 2 are set to "1" from the group.

It should be noted that although in the second embodiment, the terminal is deleted from the group when both the temporary flags 1 and 2 are set to "1", namely, "AND" conditions are satisfied, the terminal may be deleted from the group when the temporary deletion flag 2 is set to "1". As a result, the structure of the common group management server 30 can be simplified significantly.

Also, although the temporary deletion flags 1 and 2 are set to "1" here, they may be set in the inverse logic, namely "0".

In addition, the above description has been made assuming that the group identifier and the group key are generated independently and associated with each other, but it is possible to generate the group identifier from the group key using a one-way function and transmit only the group key to the terminal apparatus. In this case, the terminal apparatus, which holds the algorithm of the same one-way function as does the server apparatus, can generate the group identifier.

Also, although the server is comprised of three apparatuses in the above description, it may be structured so that either the common group management server or the individual group management server includes the terminal list management apparatus. In other words, the server may be comprised of two apparatuses. In this case, the server including the terminal list management apparatus 50 does not hold the temporary deletion flag list but adds the column of the temporary deletion flag to the group member terminal list 251 and thus can fulfill its role.

In addition, the applications of the above first and second embodiments to a case where data which should be dealt with securely is group information and management information concerning that data is a terminal list have been explained, but it is needless to say that these embodiments can be applied to the common configuration in which a terminal apparatus holds data which should be dealt with securely and a server holds management information concerning that data. In the case of this common configuration, when the terminal apparatus executes the processing that affects the management information of the server, the secure communication unit 64 can notify the server of the execution result.

In this common configuration, the above embodiments can also be applied to a case where the above data is the group information for determining whether or not a terminal apparatus belongs to a group that is formed of terminal apparatuses within a predetermined range of numbers which are allowed to execute the processing such as moving and copying of digital works and their licenses, the above management information is a terminal list indicating a list of the terminal apparatuses belonging to the group and the above processing that affects the data is moving of group information between the terminal apparatuses.

Also, the above embodiments can be applied to a case where the above data is a license of a digital work, the above management information is the historical log of the license, and the above processing that affects that data is a use of the license.

Also, the above embodiments can be applied to a case where the above data is the license of the digital work, the above management information is the number of licenses that the terminal apparatus can hold, and the above processing that affects that data is deletion of the license.

Furthermore, the above embodiments can be applied to a case where the above data is a digital work, the above management information is the number of distribution destinations of the digital work, and the above processing that affects that data is moving of the digital work.

Third Embodiment

Next, still another embodiment of the present invention will be explained. Note that the following embodiment is one concrete example of the present invention and does not limit the technical scope of the present invention.

Prior to the explanation, a group and group information in the present embodiment are defined again.

(Definition of Group)

First, a group will be defined. In content distribution services in general, processing of copying contents distributed to a terminal and their rights and moving them between terminals is not allowed in an unlimited range but allowed only in a certain limited range.

A plurality of terminals which are allowed to execute the above processing between themselves are considered to belong to one set, and that set can be defined as follows. If two arbitrary elements which belong to the set are extracted, these two elements are allowed to execute the processing such as copying and moving of contents. A set defined as such is called a group. In other words, terminals have to belong to the same group for executing the processing such as moving of contents.

(Definition of Group Information)

Next, group information will be defined. Processing of moving and obtaining a content necessary for a first terminal from a second terminal will be explained. According to the above definition of a group, the content is allowed to be moved when the first and second terminals belong to the same group, while it is not allowed to be moved when they do not belong to the same group.

In the present embodiment, the first and second terminals make a group determination for determining whether the first and second terminals belong to the same group or not before moving the content. Information required for the group determination is defined as group information. The major element of the group information in the third embodiment is the terminal list in the first or second embodiment, and the details of the specific data included in the group information in the present embodiment will be explained later.

Figure 16:
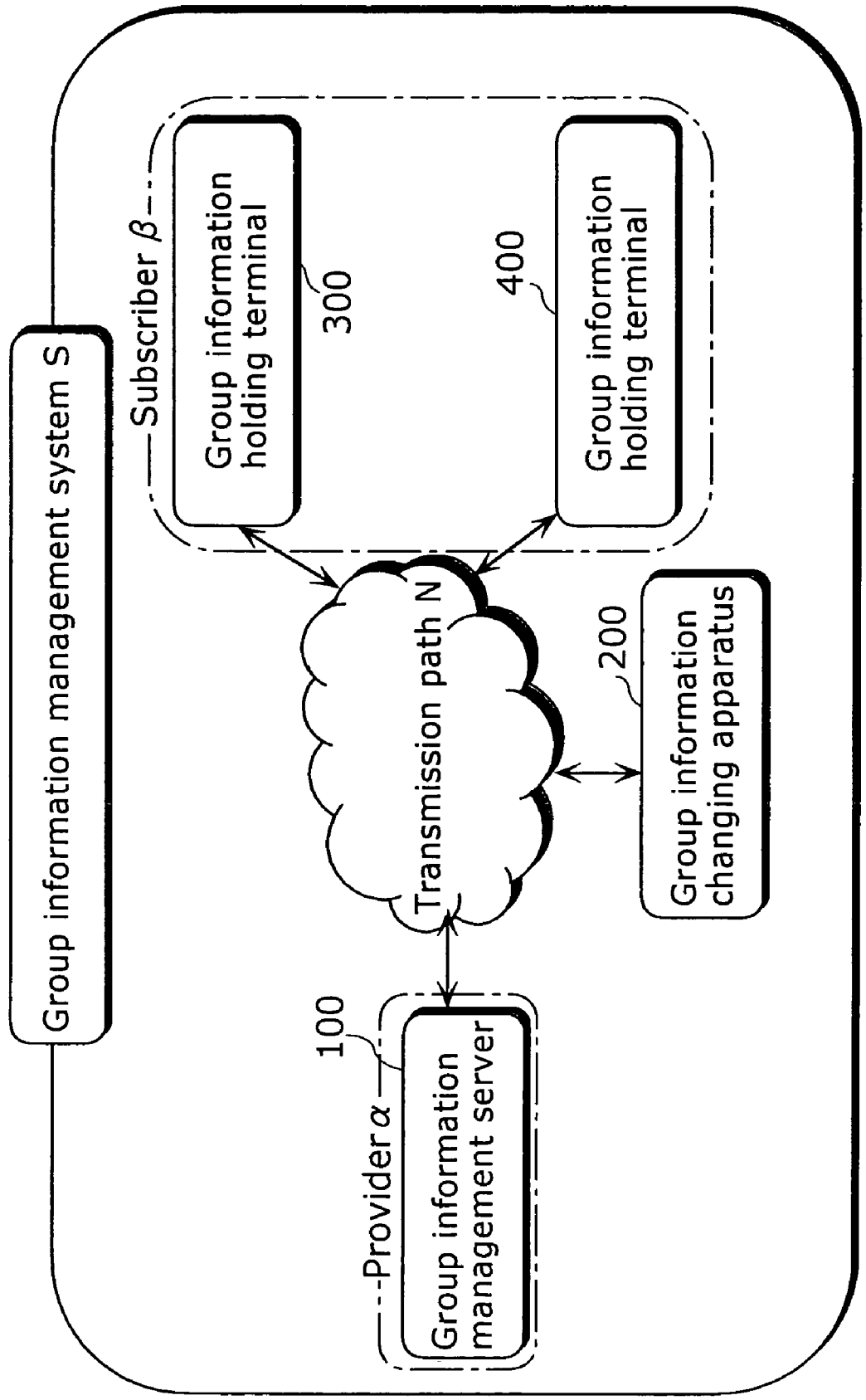
FIG. 16 is a diagram showing a group information management server, a group information changing apparatus and a group information holding terminals and their surrounding environment.

FIG. 16 is a block diagram showing a group information management server 100, a group information changing apparatus 200, group information holding terminals 300 and 400, and their surrounding environment according to the third embodiment of the present invention.

In FIG. 16, the group information management server 100, the group information changing apparatus 200 and the group information holding terminals 300 and 400 are connected via a cable or a wireless transmission path N so as to communicate data with each other. In the present group information management system S, at least one group information management server 100 and at least two group information holding terminals 300 and 400 are connected via the above-mentioned transmission path N so as to communicate data with each other.

Here, as an example of content distribution services, the group information management server 100 is placed on the side of a provider α who is involved in music distribution services, and the group information holding terminal 300 is placed on the side of a subscriber β who receives the music distribution services based on the contract with the provider α. The internal structures of the group information management server 100, the group information changing apparatus 200 and the group information holding terminal 300 respectively will be explained as follows with reference to FIG. 17 to FIG. 19.

Figure 17:
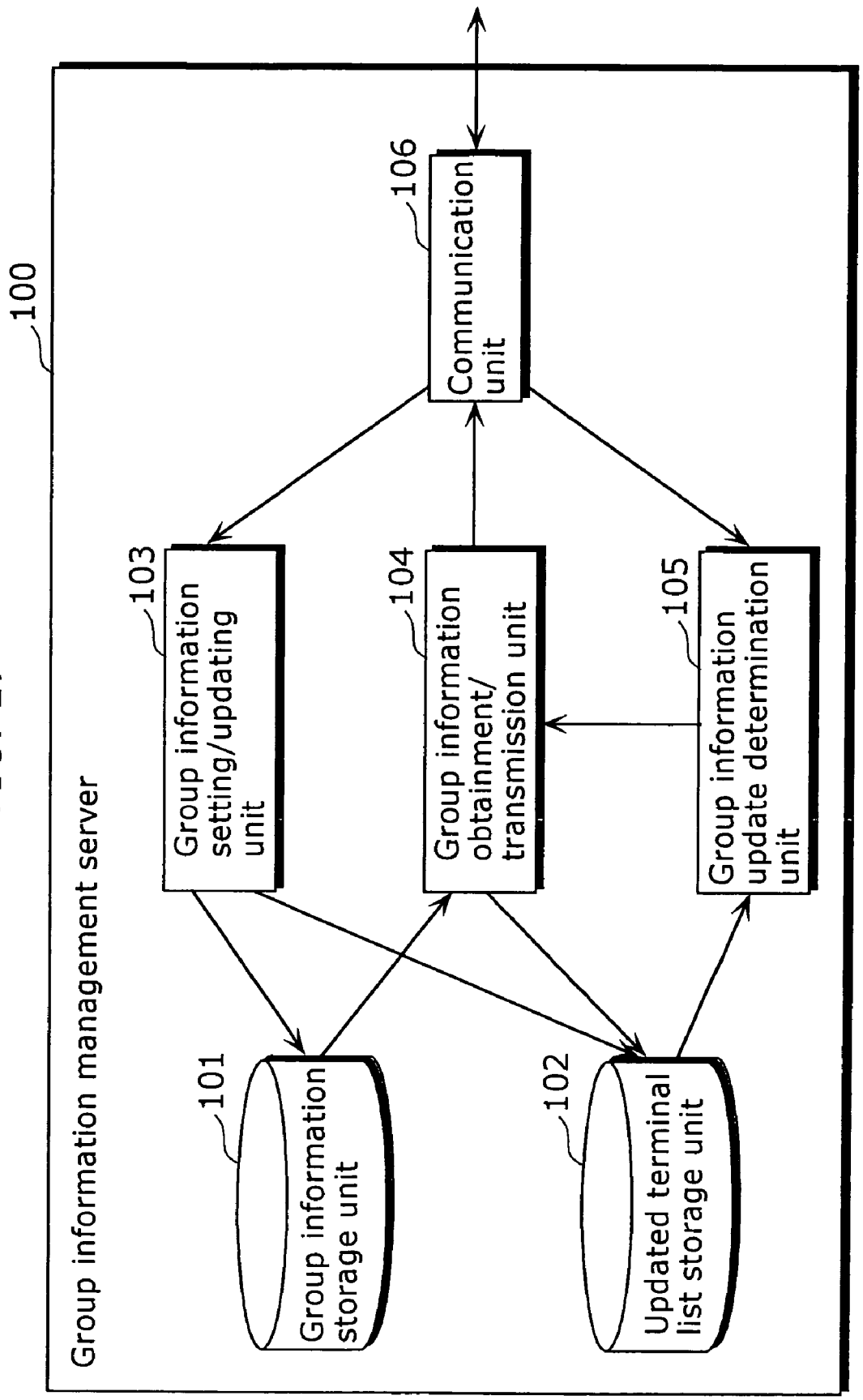
FIG. 17 is a block diagram showing a detailed structure of the group information management server.

FIG. 17 is a block diagram showing the internal structure of the group information management server 100 as shown in FIG. 16. In FIG. 17, the group information management server 100 includes: a group information storage unit 101 for storing group information; an updated terminal list storage unit 102 for storing a list of group information holding terminals which have already updated the group information; a group information setting/updating unit 103 for setting and updating the group information to be stored in the group information storage unit 101; a group information obtainment/transmission unit 104 for obtaining and transmitting the group information to be stored in the group information storage unit 101; a group information update determination unit 105 for determining whether or not to update the group information; and a communication unit 106 for communicating with the group information holding terminals.

Figure 18:
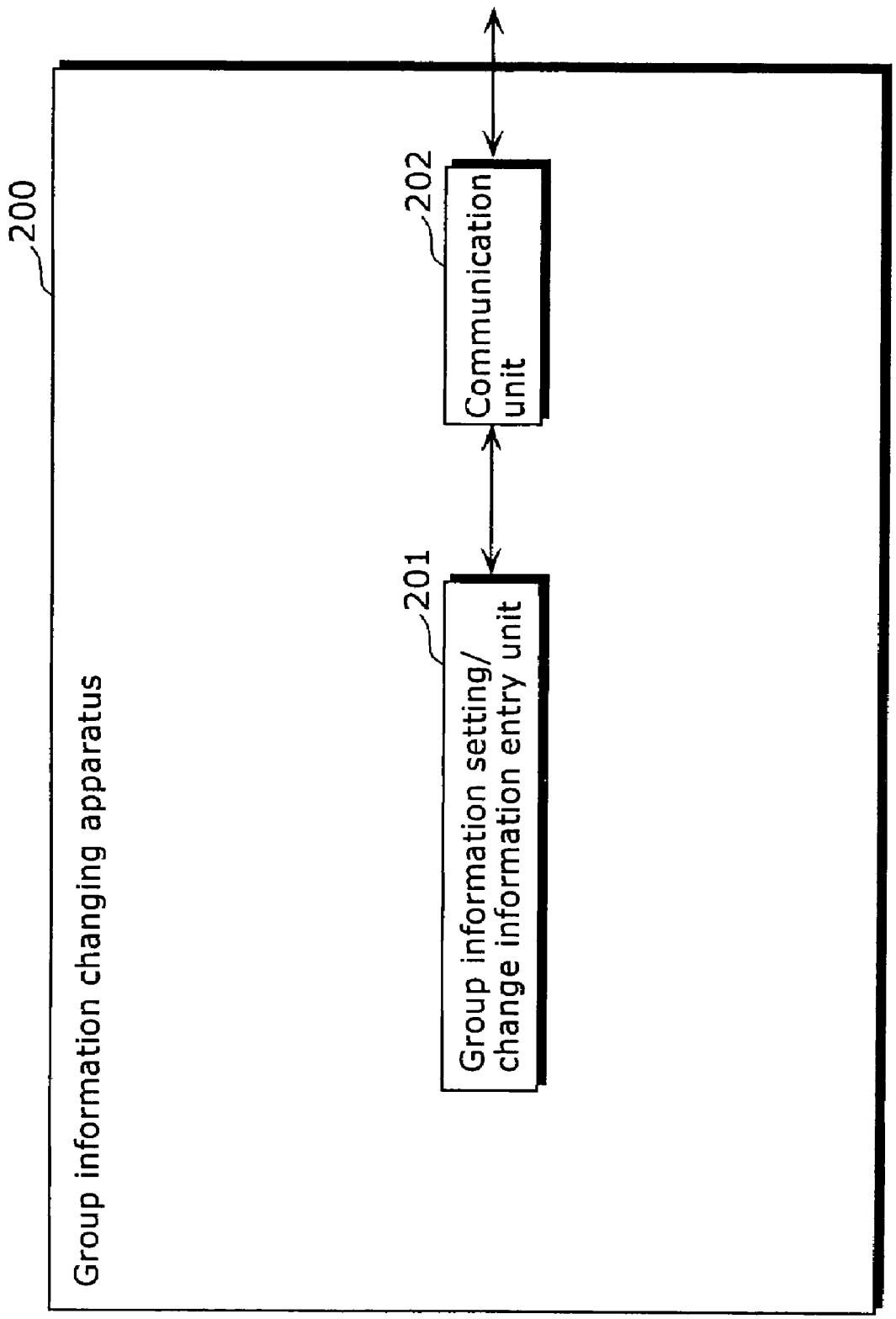
FIG. 18 is a block diagram showing a detailed structure of the group information changing apparatus.

FIG. 18 is a block diagram showing the internal structure of the group information changing apparatus 200 as shown in FIG. 16. In FIG. 18, the group information changing apparatus 200 includes: a group information setting/change information entry unit 201 for accepting entries of information for newly setting and updating the group information; and a communication unit 202 for communicating with the group information management server 100.

Figure 19:
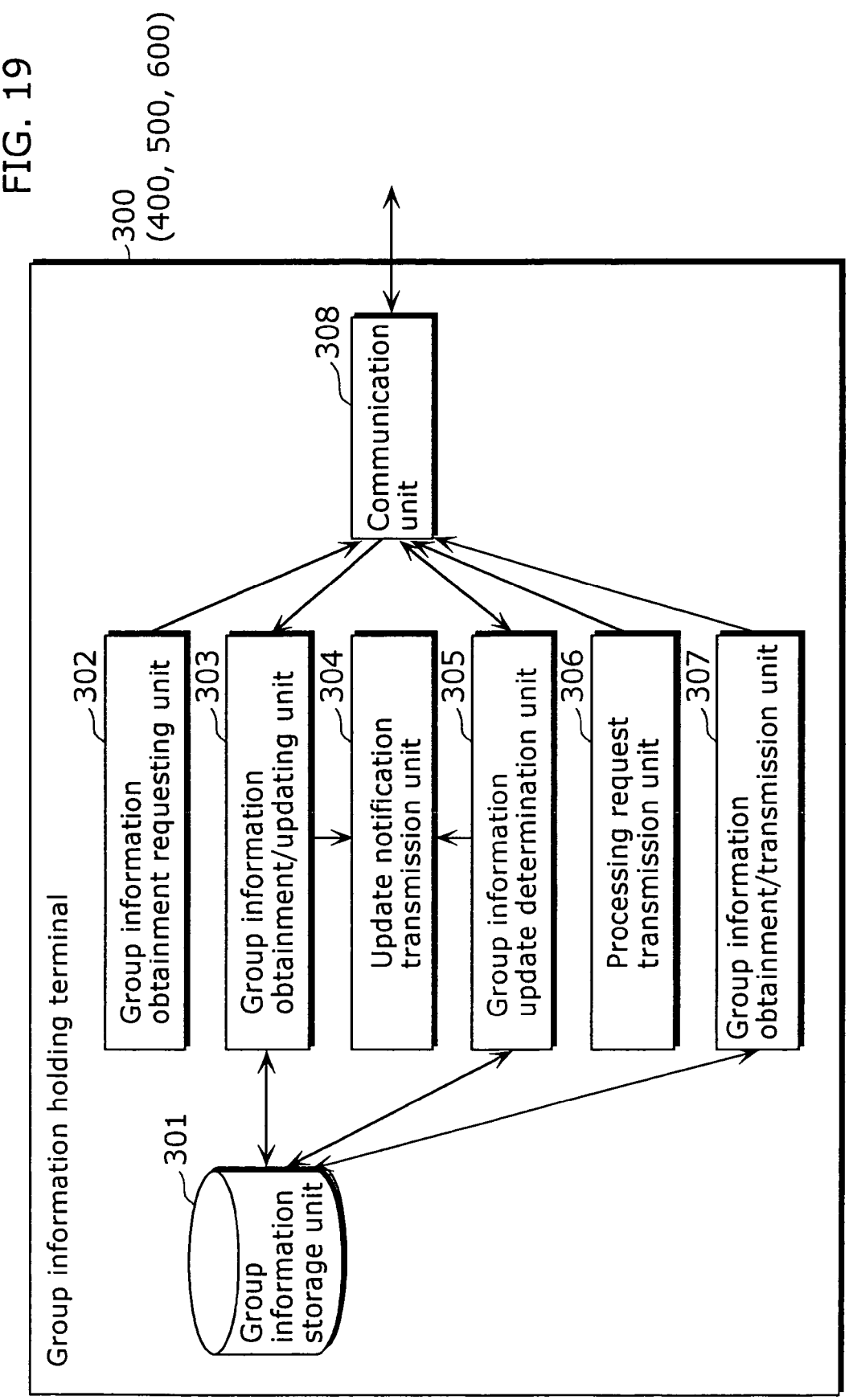
FIG. 19 is a block diagram showing a detailed structure of the group information holding terminal as shown in FIG. 16.

FIG. 19 is a block diagram showing the internal structure of the group information holding terminal 300 as shown in FIG. 16. In FIG. 19, the group information holding terminal 300 includes: a group information storage unit 301 for storing the group information; a group information obtainment requesting unit 302 for generating messages for group information obtainment requests and transmitting them to the group information management server 100 and other group information holding terminals; a group information obtainment/updating unit 303 for obtaining the group information from the group information management server 100 and the other group information holding terminals and updating the group information in their group information storage units 301; an update notification transmission unit 304 for generating and transmitting messages for notifying the update to the other group information holding terminals; a group information update determination unit 305 for determining whether or not to update the group information held in the group information storage unit 301 based on the group information obtained from the group information management server 100 and the other group information holding terminals; a processing request transmission unit 306 for generating and transmitting messages for transmitting information necessary for the update determination to the other group information holding terminals when the processing such as searching and obtaining of contents; a group information obtainment/transmission unit 307 for generating and transmitting messages for transmitting the group information to the other group information holding terminals; and a communication unit 308 for communicating with the group information management server 100 and the other group information holding terminals.

Here, the data structure of the data held by the group information management server 100 and the group information holding terminal 300 will be explained.

(Data Structure of Data Held by Group Information Management Server 100)

First, data held by the group information management server 100 will be explained. The group information management server holds the group information in the group information storage unit 101 and holds the updated terminal list in the updated terminal list storage unit 102. The group information held by the group information management server 100 will be explained with reference to FIG. 20. The definition of the group information is as described above.

Figure 20:
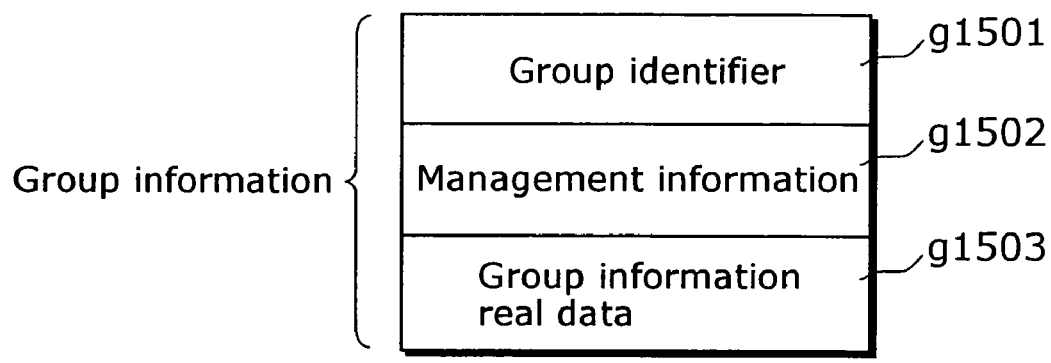
FIG. 20 is a diagram showing specific data included in the group information according to the present embodiment of the present invention.

FIG. 20 is a diagram showing specific data included in the group information. In FIG. 20, g1501 is a group identifier identifying the group information uniquely, g1502 is management information that is information for managing the group information real data, and g1503 is the group information real data which is necessary for group determination.

The management information in the present embodiment will be explained assuming it as generation information indicating the generation of the corresponding group information real data. Generation information is one example of a set in which relative sizes of any arbitrarily extracted two elements are determined. To be more specific, a version whose value increases monotonously every time the group information is changed will be explained as an example of the management information.

Figure 21:
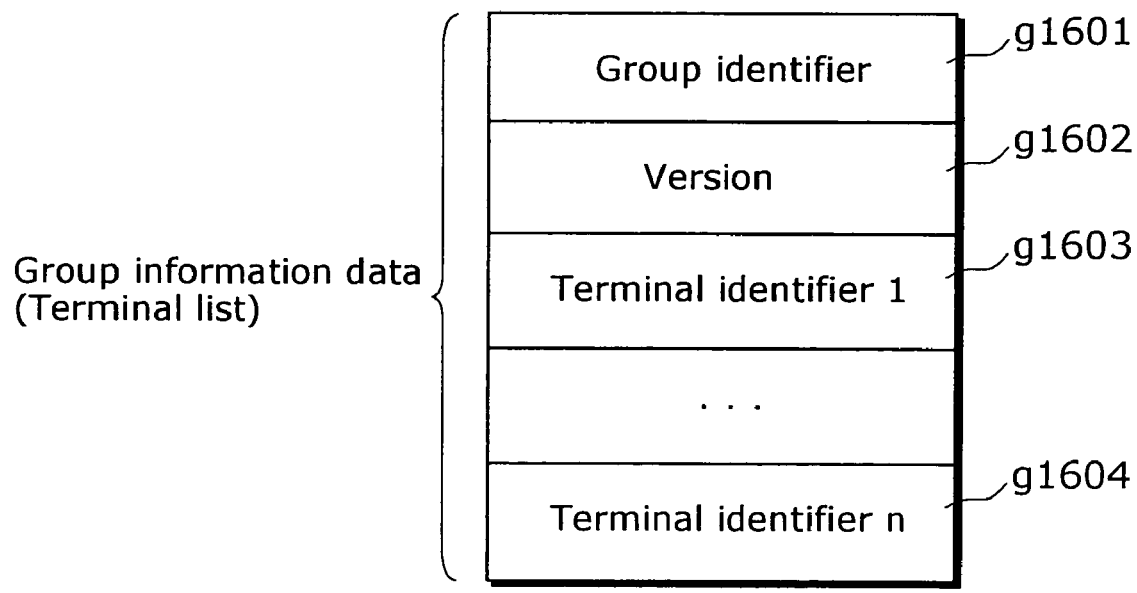
FIG. 21 is a diagram showing specific data included in the group information terminal list according to the present embodiment of the present invention.

The group information in a case where the above group information real data is a terminal list (hereinafter referred to as a group information terminal list) will be explained with reference to FIG. 21. FIG. 21 is a diagram showing the specific data included in the group information terminal list. In FIG. 21, g1601 is a group identifier, g1602 is a version as management information, g1603 to g1604 are a list of terminal identifiers of the group information holding terminals 300 which belong to the group corresponding to the group identifier g1601. Here, a terminal identifier is an identifier identifying the group information holding terminal 300 uniquely.

Figure 22:
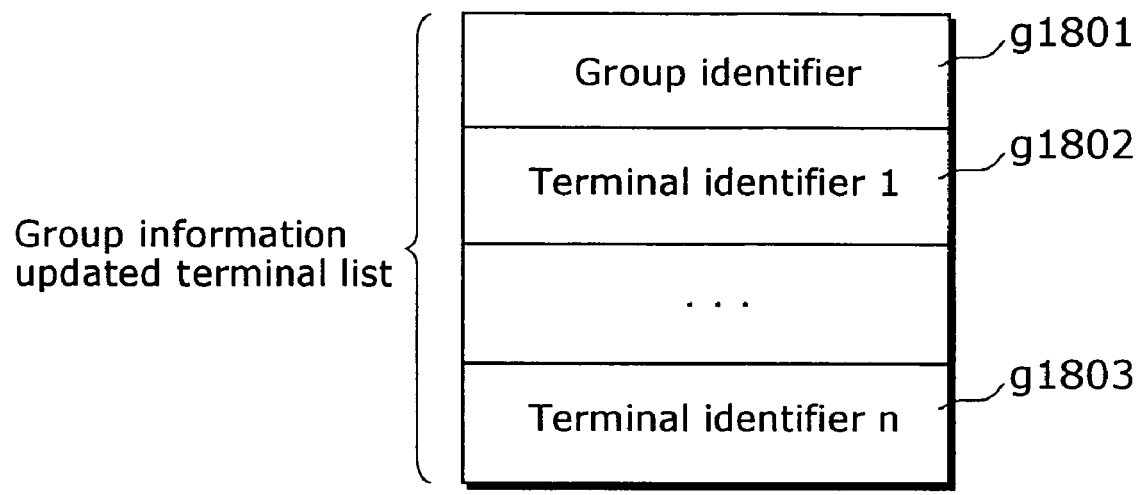
FIG. 22 is a diagram showing specific data included in a group information updated terminal list according to the present embodiment of the present invention.

Next, the group information updated terminal list held by the group information management server 100 will be explained with reference to FIG. 22. FIG. 22 is a diagram showing the specific data included in the group information updated terminal list. In FIG. 22, g1801 is a group identifier, g1802 to g1803 are a list of terminal identifiers of the group information holding terminals 300 which have updated the group information into the latest one, out of the group information holding terminals 300 which belong to the group corresponding to the group identifier g1801.

(Data Structure of Data Held by Group Information Holding Terminal 300)

Next, the data held by the group information holding terminal 300 will be explained. The group information holding terminal 300 holds the group information in the group information storage unit 301. The data structure of the group information held by the group information holding terminal 300 is same as the data structure of the group information held by the group information management server 100, so the explanation thereof is not repeated.

That is the end of the explanation concerning the data structures of the data held by the group information management server 100 and the group information holding terminal 300.

Next, the data structures of the data which are transmitted and received between the group information management server 100, the group information changing apparatus 200 and the group information holding terminal 300.

(Data Structure of Messages Transmitted and Received for Communication)

Figure 23:
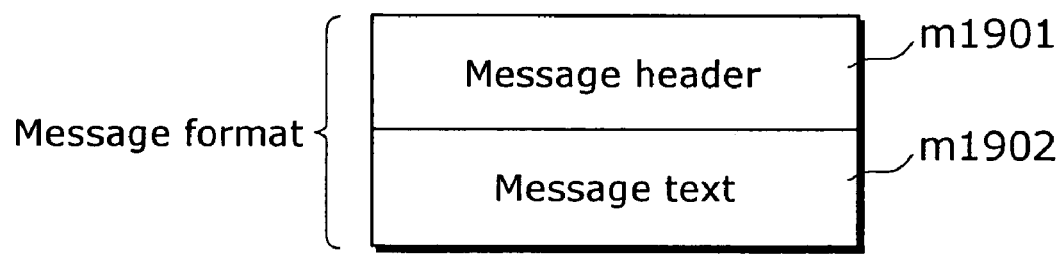
FIG. 23 is a diagram showing specific data included in a message format according to the present embodiment of the present invention.

First, the data structure of the messages which are transmitted and received for communication in the present embodiment will be explained with reference to FIG. 23. FIG. 23 is a diagram showing the specific data included in a message format. In FIG. 23, m1901 is a message header, and m1902 is a message text. Here, the message header includes at least information identifying a destination and information identifying a transmitter. The information identifying the destination is referred to as an address of a message, and the information identifying the transmitter is referred as an address of a return message to the above message. The information identifying the transmitter or the destination is, for example, an IP address. The message text includes information specific to each message. The specific information will be explained for each message.

Four messages which are important in the present embodiment will be explained with reference to FIG. 24 to FIG. 27.

(Group Information Obtainment Request Message)

Figure 24:
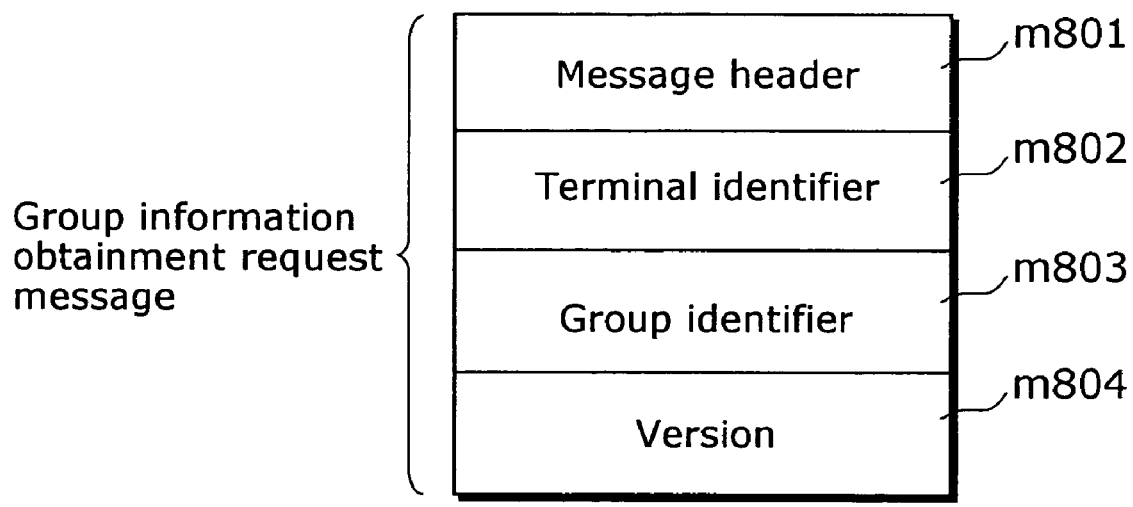
FIG. 24 is a diagram showing specific data included in a group information obtainment request message according to the present embodiment of the present invention.

First, the group information obtainment request message will be explained with reference to FIG. 24. FIG. 24 is a diagram showing the specific data included in the group information obtainment request message. The group information obtainment request message is transmitted from the group information holding terminal 300 to the group information management server 100, or from the group information holding terminal 300 to another group information holding terminal 300.

In FIG. 24, m801 is a message header, m802 is a terminal identifier of the group information holding terminal 300 which has transmitted the group information obtainment request message, m803 is a group identifier of the group information held by the group information holding terminal 300, and m804 is a version of the group information held by the group information holding terminal 300.

(Update Notification Message)

Figure 25:
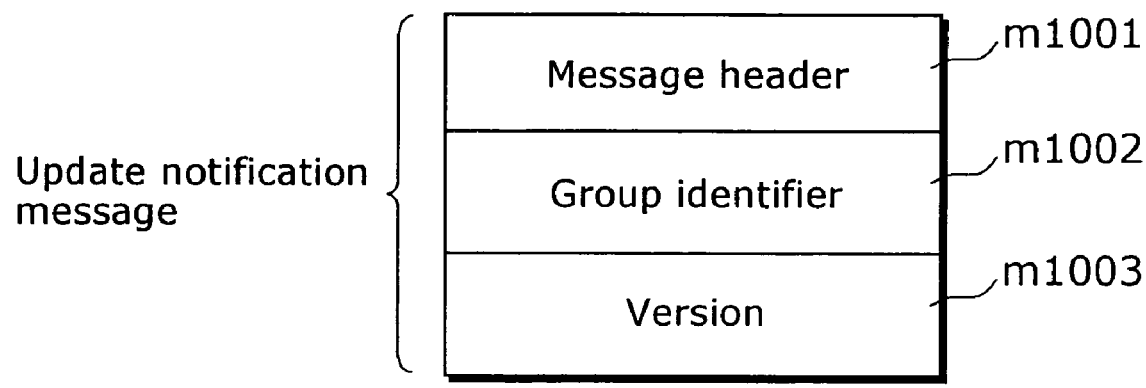
FIG. 25 is a diagram showing specific data included in an update notification message according to the present embodiment of the present invention.

Secondly, the update notification message will be explained with reference to FIG. 25. FIG. 25 is a diagram showing the specific data included in the update notification message. The update notification message is transmitted from the group information holding terminal 300 to another group information holding terminal 300. In FIG. 25, m1001 is a message header, m1002 is a group identifier of the group information held by the group information holding terminal 300 which has transmitted the update notification message, and m1003 is a version of the group information held by the group information holding terminal 300.

(Processing Request Message)

Figure 26:
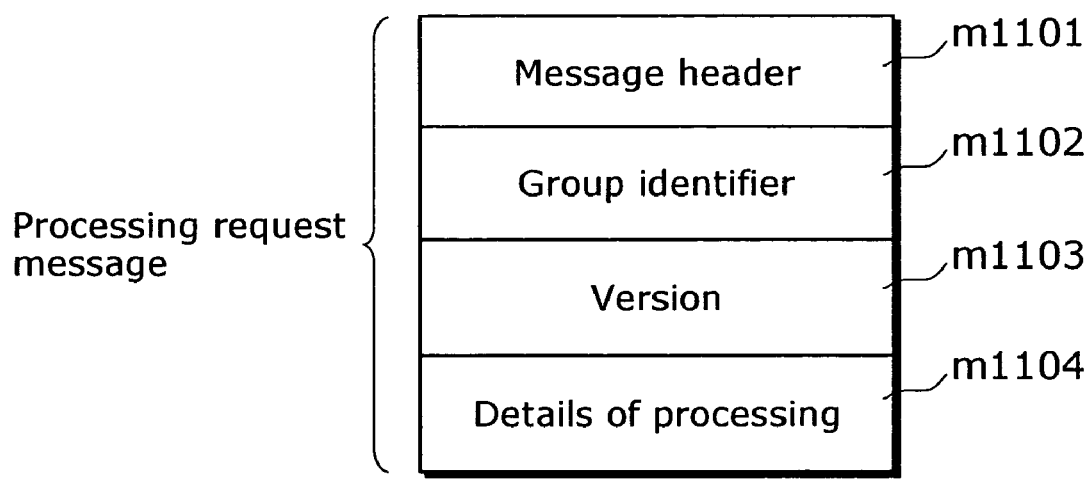
FIG. 26 is a diagram showing specific data included in a processing request message according to the present embodiment of the present invention.

Thirdly, the processing request message will be explained with reference to FIG. 26. FIG. 26 is a diagram showing the specific data included in the processing request message. The processing request message is transmitted from the group information holding terminal 300 to another group information holding terminal 300. In FIG. 26, m1101 is a message header, m1102 is a group identifier of the group information held by the group information holding terminal 300 which has transmitted the processing request message, m1103 is a version of the group information held by the group information holding terminal, and m1104 is information required for the processing of the processing request.

Here, the information required for the processing consists of a processing identifier and a processing target identifier. The processing identifier is an identifier of processing such as searching, moving and copying of a content, and searching, moving and copying of the right of the content. The processing target identifier is, for example, information for identifying a content to be searched uniquely in the content search processing, such as a content identifier and a content name.

(Group Information Transmission Message)

Figure 27:
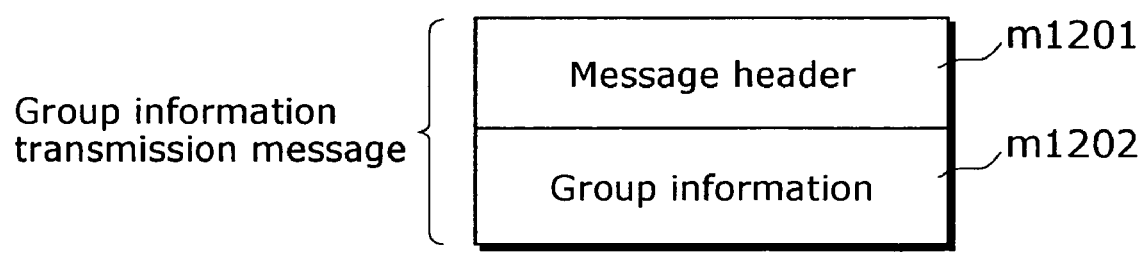
FIG. 27 is a diagram showing specific data included in a group information transmission message according to the present embodiment of the present invention.

Fourthly, the group information transmission message will be explained with reference to FIG. 27. FIG. 27 is a diagram showing the specific data included in the group information transmission message. The group information transmission message is transmitted from the group information management server 100 to the group information holding terminal 300, or from the group information holding terminal 300 to another group information holding terminal 300. In FIG. 27, m1201 is a message header, and m1202 is group information held by the group information management server 100 or the group information holding terminal 300 that is a transmitter thereof.

The data structures of the messages which are transmitted and received between the group information management server 100, the group information changing apparatus 200 and the group information holding terminals 300 have been explained as above.

In the group information management system S, structured as mentioned above, when the subscriber β owns the group information holding terminal 300 and the group information holding terminal 400, the outline of the processing required for moving a music content obtained on the group information holding terminal 300 to the group information holding terminal 400 through the music distribution service of the provider a will be explained with reference to FIG. 28.

Figure 28:
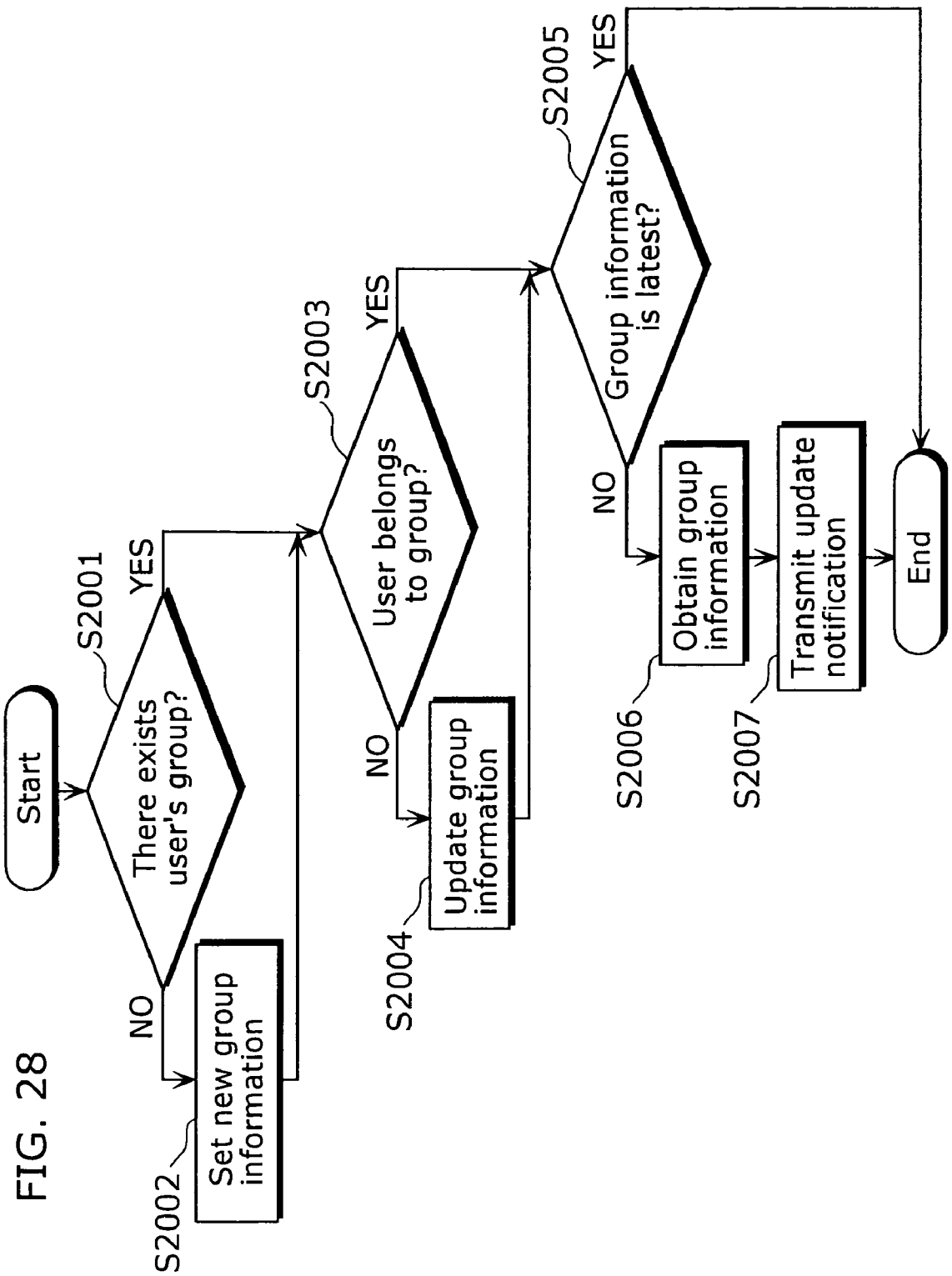
FIG. 28 is a flowchart showing processing executed by the group information holding terminal before moving a content.

The subscriber β determines whether or not there exists a group including his/her own group information holding terminals (FIG. 28: Step S2001).

If there exists no such group, a new group is set (FIG. 28: Step S2002).

It is determined whether or not both the group information holding terminal 300 and the group information holding terminal 400 are included into the above-mentioned group or the newly set group (FIG. 28: Step S2003).

If at least one of the group information holding terminal 300 and the group information holding terminal 400 does not belong to the above-mentioned group or the newly set group, the group information management server 100 adds the group information holding terminal which does not belong to the above-mentioned group or the newly set group and updates the group information (FIG. 28: Step S2004).

It is determined whether or not the group information of the group information holding terminal 300 and the group information of the group information holding terminal 400 is latest or not (FIG. 28: Step S2005). If the group information of the group information holding terminal 300 and the group information of the group information holding terminal 400 is not latest, they obtain the latest group information and update their own group information (FIG. 28: Step S2006). They transmit the update notifications to the other group information holding terminals if necessary (FIG. 28: Step S2007).

Each of the processing in Step S2001, S2003 and S2005 can be executed based on the list of the group information holding terminals which belong to the group by accessing the group information management server 100 using the group information holding terminals 300 and 400 via a Web browser on the Internet.

That is the end of the explanation concerning the outline of the processing required for moving a music content from the group information holding terminal 300 to another group information holding terminal 400.

Next, the processing of newly setting the group information in Step S2002, the processing of updating the group information in Step S2004, and the processing of obtaining the group information of the group information holding terminal in Step S2006 will be explained in detail.

(Details of Processing of Newly Setting and Updating Group Information)

First, the processing of newly setting and uploading the group information will be explained. Since the group information is managed by the group information management server 100 in the present invention, the group information held by the group information management server 100 must be newly set and changed for the processing of newly setting and uploading the group information. It is assumed that the subscriber β, a person in charge of the provider α or the like executes the processing of newly setting and changing the group information. But since the processing of setting and changing the group information is same, the following explanation will be made on the assumption that the subscriber β or the person in charge of the provider α, who is collectively called as a changer γ for convenience sake, executes the processing of newly setting and changing the group information.

First, the case where the changer γ newly sets the group information in the group information storage unit 101 of the group information management server 100 will be explained.

The changer γ accesses the group information changing apparatus 200 via the Internet using his/her own group information holding terminal, and enters the information for setting into the group information setting/change information entry unit 201.

The entered information includes at least a terminal identifier list of the group information holding terminals which belong to the same group. For example, "New group id=0x0001, 0x0003, 0x0004" are entered. The entered data is transmitted to the group information setting/updating unit 103 via the communication unit 202 and the communication unit 106 of the group information management server 100. The group information setting/updating unit 103 assigns a group identifier to the new group and stores it together with the entered terminal identifiers into the group information storage unit 101.

In the present embodiment, explanation will follow assuming that the above-mentioned group information real data is a terminal list. In group information terminal list 1601 in FIG. 29A, "0xF001" as a group identifier is assigned. A version is set for each group information, and an initial value is the starting value which monotonously increases in the group information management server 100. In the terminal list 1601, "2" is set.

The group information is set as mentioned above, and a normal end notification is returned via the communication unit 106 and the communication unit 202 of the group information changing apparatus 200, if necessary.

Next, the processing in which the changer γ updates the group information stored in the group information storage unit 101 of the group information management server 100 will be explained.

The changer γ accesses the group information changing apparatus 200 via the Internet using his/her own group information holding terminal and enters the information to be changed into the group information setting/change information entry unit 201.

Explanation will follow with reference to FIGS. 29A to 29D on the assumption that the above group information real data is a terminal list.

Figure 29A:
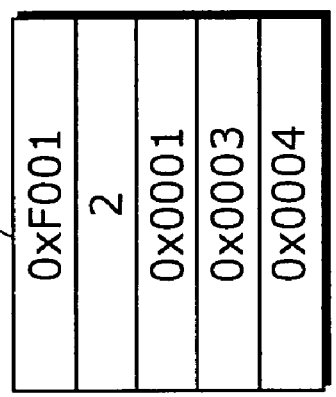
FIGS. 29A to 29D are diagrams showing examples of the group information terminal list according to the present embodiment of the present invention.

FIGS. 29A to 29D are diagrams showing examples of the group information terminal lists. Each of the group information terminal lists including the above-mentioned terminal list consists of a group identifier, a version and terminal identifiers. In the group information terminal list 1601 as shown in FIG. 29A, a group identifier "0xF001", a version "2" and terminal identifiers "0x0001", "0x0003" and "0x0004" are stored.

First, a case where a terminal with its terminal identifier "0x0005" is added to the terminal list 1601 will be explained. The changer γ identifies the terminal identifier "0xF001", and enters the instruction to add the terminal identifier "0x0005" into the group information setting/change information entry unit 201. For example, "gid=0xf001 add tid=0x0005" is entered. The entered data is transmitted to the group information setting/updating unit 103 via the communication unit 202 and the communication unit 106 of the group information setting/updating unit 103.

Figure 29B:
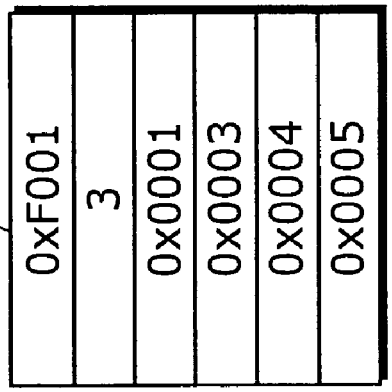

The group information setting/updating unit 103 identifies the corresponding group information terminal list 1601 in the group information storage unit 101 using the group identifier 0xF001 as a key in the received entry data, and adds the terminal identifier 0x0005 to the above terminal list. Since the group information terminal list 1601 is updated, 1 is added to the version and the version 3 is stored in the group information storage unit 101. The group information terminal list obtained after the additional processing to the list of FIG. 29A is a group information terminal list 1602 as shown in FIG. 29B. The processing of changing the group information terminal list is executed as mentioned above, and the normal end notification is returned via the communication unit 106 and the communication unit 202 of the group information changing apparatus 200 if necessary.

Next, a case where the changer γ deletes the terminals with their terminal identifiers 0x0004 and 0x0005 from the group information terminal list 1602 will be explained.

The changer γ identifies the terminal identifier 0xF001, and enters the instruction to delete the terminal identifiers 0x0004 and 0x0005 into the group information setting/change information entry unit 201.

For example, "gid=0xf001 del tid=0x0004, 0x0005" is entered. The entered data is transmitted to the group information setting/updating unit 103 via the communication unit 202 and the communication unit 106 of the group information management server 100.

Figure 29C:
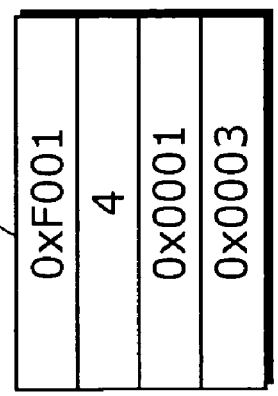
Figure 29D:
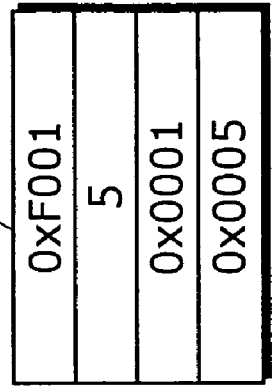

The group information setting/updating unit 103 identifies the corresponding group information terminal list 1602 in the group information storage unit 101 using the group identifier 0xF001 as a key in the received entry data, and deletes the terminal identifiers 0x0004 and 0x0005 from the group information terminal list 1602. Next, since the group information terminal list 1602 is changed, 1 is added to the version and the version 4 is stored in the group information storage unit 101. The group information terminal list obtained after the deletion processing from the list of FIG. 29B is a group information terminal list 1603 as shown in FIG. 29C. The changing processing is executed as mentioned above, and the normal end notification is returned via the communication unit 106 and the communication unit 202 of the group information changing apparatus 200 if necessary.

The above explanation has been made on the assumption that the difference between the group information terminal list before the processing and the group information terminal list after the processing is entered as the change information. But the terminal identifiers in the group information terminal list may be overwritten by entering all the terminal identifiers in the group information terminal list after the processing. Note, however, that the terminal list is overwritten, whereas the version is updated (added by 1).

It should be noted that the changer γ may operate the group information changing apparatus 200 directly. It should also be noted that the status of the terminal list before and after the processing may be shown to the changer γ on screen for the sake of his/her easier updating.

The group information changing apparatus 200 may be placed anywhere, for example, in the servers under the management of the provider α, the group information holding terminals and so on.

Also, the group information may be authenticated prior to the processing of newly setting and changing the group information. To be more specific, it is supposed to use a widely used method, for example, terminal-unique information, a user password or a certificate given from another reliable device.

In addition, if there are a plurality of levels for the authority to change the group information, restrictions shall be put on the above authentication processing depending on the level. Here, existence of a plurality of levels means that level 1 allows addition of a group information holding terminal to a group but does not allow deletion of a group information holding terminal, and level 2 allows addition and deletion of a group information holding terminal into and from a group, for example.

It should be noted that the group information is identified using a group identifier as a key in the above explanation, but it is also possible to identify the group information using a terminal identifier as a key. To be more specific, by searching the group information storage unit 101 using the terminal identifier 0x0001 as a key, the group information terminal list 1601 is identified. A plurality of group information is sometimes detected if a terminal identifier is used as a key, but the changer γ can select any of them, or the same processing can be executed for each of the plurality of group information. Note that the above group information obtainment request message does not need to include a group identifier if a terminal identifier is used as a key.

As to a case where a terminal identifier is used as a key, the processing after identifying the group information is the same as that in a case where a group identifier is used as a key.

That is the end of the explanation concerning the processing of newly setting and updating the group information.

(Details of Processing of Obtaining Group Information)

Next, the processing executed by the group information holding terminal 400 for obtaining the group information will be explained. A case where the group information holding terminal 400 obtains and updates the group information will be explained. The group information holding terminal 400 obtains the group information from either the group information management server 100 or another group information holding terminal (the group information holding terminal 300 in the present embodiment).

First, a case where the group information holding terminal 400 obtains the group information from the group information management server 100 will be explained, and then, a case where the group information holding terminal 400 obtains it from another group information holding terminal 300 will be explained.

First, the case where the group information holding terminal 400 obtains the group information from the group information management server 100 will be explained.

In the group information holding terminal 400, the group information obtainment requesting unit 302 creates a group information obtainment request message, and transmits it to the group information management server 100 via the communication unit 308. Upon receipt of the group information obtainment request message, the group information management server 100 determines whether or not to update the group information.

There are two methods for the above update determination: a method using a version; and a method using an updated terminal list.

First, the processing of update determination using a version will be explained, and then, the processing of update determination using an updated terminal list will be explained.

First, the processing for the update determination of the group information using the version will be explained.

It is assumed that the group information management server 100 holds the group information terminal list 1601 (FIG. 29A). The following explanation will be made assuming that the version "ver" is stored in a general sense, although the version "2" is stored in the group information terminal list 1601.

As shown in FIG. 24, the group information obtainment request message is comprised of a message header, a terminal identifier, a group identifier and a version.

Upon receipt of the group information obtainment request message, the group information management server 100 transmits the group information obtainment request message to the group information update determination unit 105 via the communication unit 106. Upon receipt of the group information obtainment request message, the group information update determination unit 105 carries out the update determination.

Here, the update determination carried out by the group information update determination unit 105 will be explained. The group information update determination unit 105 extracts a terminal identifier m802, a group identifier m803 and a version m804 from the group information obtainment request message. The group information update determination unit 105 identifies the corresponding group information terminal list 1601 in the group information storage unit 101 using the group identifier m803 as a key, and obtains it.

The group information update determination unit 105 determines whether or not the terminal identifier m802 is included in the group information terminal list 1601. The group information update determination unit 105 determines that the terminal identifier m802 belongs to the group corresponding to the group identifier m803 if the terminal identifier m802 is included, and it determines that the terminal identifier m802 does not belong to the group if it is not included.

When it determines that the terminal identifier m802 does not belong to the group, it ends the processing, and transmits a return message including a group information deletion instruction to the group information holding terminal 400. The return message is transmitted to the destination as indicated in the message header m801.

When it determines that the terminal identifier m802 belongs to the group, it executes the following processing.

The group information update determination unit 105 extracts the version "ver" from the group information terminal list 1601, and compares it with the version m804 obtained from the group information obtainment request message.

In a case of ver>m804, the group information update determination unit 105 transmits the return message with its text including the group information terminal list 1601 to the group information holding terminal 400.

Since there is no need to update in other cases than ver>m804, it transmits the return message with its text including a no update needed notification to the group information holding terminal 400.

Since the group information is not transmitted in a case where no update is needed, the load on the network can be reduced.

Note that it is possible to consider it abnormal in a case of ver<m804 because such a case is impossible under normal conditions and to transmit a return message with its text including a notification indicating abnormality to the group information holding terminal 400.

It is also possible to consider the group information holding terminal 400 unauthorized in a case of abnormality and to eliminate it from the group. Elimination from a group means elimination of the corresponding terminal identifier from the group information terminal list 1601. The method for eliminating a group information terminal identifier from the group information terminal list 1601 has already been explained above.

Next, the processing executed by the group information holding terminal 400 which has received the return message will be explained.

First, a case where the return message includes the group information will be explained.

In the group information holding terminal 400, the group information obtainment/updating unit 303 obtains the received return message via the communication unit 308. The group information obtainment/updating unit 303 extracts the group information from the return message and updates the group information in the group information storage unit 301. Note that the group information holding terminal 400 may confirm whether or not the group identifier of the extracted group information matches the group identifier of its own group information, or may determine whether or not the version of its own group information has been updated based on the version of the extracted group information.

Next, a case where the return message includes the group information deletion instruction will be explained.

The processing in which the group information obtainment/updating unit 303 obtains the return message is same as a case where the return message includes the group information. The group information obtainment/updating unit 303 deletes the group information in the group information storage unit 301.

Next, a case where the return message includes the no update needed notification will be explained.

Upon receipt of the return message, the group information obtainment/updating unit 303 does not execute any processing.

That is the end of the explanation concerning the processing executed in a case where the update determination is carried out using a version.

Figure 30A:
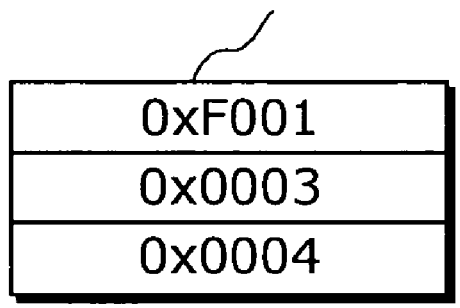
FIGS. 30A to 30C are diagrams showing examples of the group information updated terminal list according to the present embodiment of the present invention.
Figure 30B:
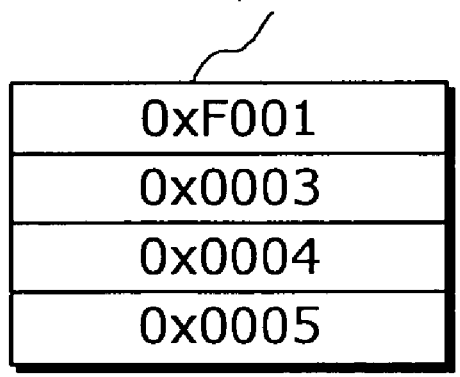
Figure 30C:
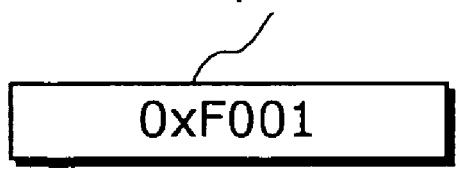

Next, the processing of making the update determination of the group information using the group information updated terminal list will be explained with reference to FIGS. 30A to 30C. FIGS. 30A to 30C are diagrams showing examples of the specific data included in the group information updated terminal list. As shown in FIG. 30A, the group information updated terminal list 1901 stores a group identifier 0xF001 and terminal identifiers of updated terminals 0x0003 and 0x0004. It is assumed that the updated terminal list storage unit 102 in the group information management server 100 holds the group information updated terminal list 1901, and the group information holding terminals with their terminal identifiers 0x0003 and 0x0005 hold the group information terminal lists 1602.

Following is an explanation of processing executed in a case where the group information holding terminal with its terminal identifier 0x0003 and the group information holding terminal with its terminal identifier 0x0005 have transmitted the group information obtainment request messages to the group information management server.

First, a case where the group information holding terminal with its terminal identifier 0x0003 has transmitted the group information obtainment request message will be explained.

The group information update determination unit 105 receives the group information obtainment request message via the communication unit 106. The group information obtainment request message includes the terminal identifier 0x0003, the group identifier 0xF001 and the version 3, and the group information update determination unit 105 extracts the terminal identifier 0x0003 and the group identifier 0xF001. The group information update determination unit 105 identifies and extracts the group information updated terminal list 1901 from the updated terminal list storage unit 102 using the group identifier 0xF001 as a key, and determines whether or not the terminal identifier 0x0003 is included in the terminal identifier list in the group information updated terminal list 1901.

If the terminal identifier 0x0003 is included in the terminal identifier list in the group information updated terminal list 1901, it is determined that the group information holding terminal with its terminal identifier 0x0003 has already updated its own group information, and the return message including the no update needed notification is transmitted to the group information holding terminal.

The processing executed by the group information holding terminal which has received the return message has already been explained above.

Next, a case where the group information holding terminal with its terminal identifier 0x0005 has transmitted the group information obtainment request message will be explained.

The group information update determination unit 105 receives the group information obtainment request message from the group information holding terminal via the communication unit 106. The group information obtainment request message includes the terminal identifier 0x0005, the group identifier 0xF001 and the version 3, and the group information update determination unit 105 extracts the terminal identifier 0x0005 and the group identifier 0xF001. The group information update determination unit 105 identifies and extracts the group information updated terminal list 1901 from the updated terminal list storage unit 102 using the group identifier 0xF001 as a key, and determines whether or not the terminal identifier 0x0005 is included in the terminal identifier list in the group information updated terminal list 1901.

If the terminal identifier 0x0005 is not included in the terminal identifier list in the group information updated terminal list 1901, it is determined that the group information holding terminal with its terminal identifier 0x0005 has not yet updated its own group information, and the return message with its text including the group information is transmitted, and the terminal identifier 0x0005 is added to the terminal identifier list in the group information updated terminal list 1901.

The group information updated terminal list after the terminal identifier is added is a group information updated terminal list 1902 as shown in FIG. 30B.

Next, the update of the group information updated terminal list in a case where the group information is changed will be explained.

A case where the group information setting/updating unit 103 changes the group information with its group identifier 0xF001 will be explained. The group information setting/updating unit 103 identifies and obtains the group information updated terminal list 1902 corresponding to the group identifier 0xF001 from the updated terminal list storage unit 102 using the group identifier 0xF001 of the updated group information as a key, and deletes all the terminal identifiers in the group information updated terminal list 1902. The group information updated terminal list after deleting them is a group information updated terminal list 1903 (FIG. 30C). That is why there exists no group information holding terminal which has updated its own group information into the latest one that reflects the above changes at the time point when the changes were made.

Note that as is obvious from the above explanation, the group information obtainment request message does not need to include a version if the update determination is carried out using the group information updated terminal list.

Note that although the update determination shall be carried out using a version or an updated terminal list here, there is no need to carry out the update determination but to always update the group information because the group information managed by the group information management server 100 is latest.

Note that if it can be confirmed that a group information holding terminal which has transmitted a group information obtainment request message belongs to the corresponding group by another method than the determination using a group identifier in the group information obtainment request message, there is no need to determine whether or not it belongs to the group, and the group information obtainment request message does not need to include a terminal identifier.

Another method is, for example, group authentication by a user's password, and a method of determining that a terminal belongs to the same group if a message is encrypted by common information which is commonly held by the group and the encrypted message can be decoded by the corresponding common information.

That is the end of the explanation concerning the processing executed by the group information holding terminal for obtaining the group information from the group information management server 100 and updating it.

Next, a case where the group information is updated between the group information holding terminals will be explained.

The following explanation will be made on the assumption that the group information holding terminal 300 obtains the group information from another group information holding terminal 400.

Following is the explanation of the processing in which the group information obtainment requesting unit 302 in the group information holding terminal 300 creates a group information obtainment request message, transmits it to the group information holding terminal 400 via the communication unit 308, and obtains the group information.

As shown in FIG. 24, the group information obtainment request message includes the message header m801, the terminal identifier m802, the group identifier m803 and the version m804.

Upon receipt of the group information obtainment request message, the group information holding terminal 400 transmits the group information obtainment request message to the group information update determination unit 305 via the communication unit 308.

The group information update determination unit 305 receives the group information obtainment request message and carries out the update determination. Here, the processing of update determination executed by the group information update determination unit 305 will be explained.

The group information update determination unit 305 extracts the terminal identifier m802, the group identifier m803 and the version m804 from the group information obtainment request message.

The group information holding terminal 400 determines whether or not the group identifier m803 matches the group identifier of the group information held in the group information storage unit 301. If it does not match, the group information holding terminal 400 ends the processing and returns a mismatched group error message. If it matches, the group information holding terminal 400 executes the following processing.

The group information holding terminal 400 determines whether or not the terminal identifier m802 exists in the terminal list of the group information held in the group information storage unit 301.

If it does not exist, the group information holding terminal 400 ends the processing and returns a mismatched terminal identifier error message. If it does exist, the group information holding terminal 400 executes the following processing.

The processing of update determination executed by the group information update determination unit 305 will be explained on the assumption that the version of the group information held by the group information holding terminal 300 is "ver1" and the version of the group information held by the group information holding terminal 400 is "ver2".

The group information update determination unit 305 obtains "ver2" from the group information obtainment request message and "ver1" from the group information storage unit 301, and compares these versions.

In a case of ver1=ver2, the group information update determination unit 305 transmits a return message including no update needed notification to the group information holding terminal 400.

In a case of ver1>ver2, it transmits a return message including the group information held by the group information holding terminal 300 to the group information holding terminal 400 because the group information of the group information holding terminal 300 is newer than the group information of the group information holding terminal 400.

In a case of ver1<ver2, the group information obtainment requesting unit 302 in the group information holding terminal 300 transmits a group information obtainment request message to the group information holding terminal 400 because the group information of the group information holding terminal 300 is older than the group information of the group information holding terminal 400.

Next, the processing executed by the group information holding terminal 400 which has received the return message will be explained.

A case where the group information holding terminal 400 has received the return message including the group information held by the group information holding terminal 300 will be explained.

In the group information holding terminal 400, the group information obtainment/updating unit 303 obtains the received return message via the communication unit 308. The group information obtainment/updating unit 303 extracts the group information from the return message and updates the group information in the group information storage unit 301.

Here, methods by which the group information obtainment/updating unit 303 updates the terminal list will be explained.

The methods for updating the terminal list include the following two methods: the first method of overwriting its own group information with the group information obtained from the group information holding terminal 300; and the second method of generating new group information based on the group information obtained from the group information holding terminal 300 and its own group information.

The second method will be explained more specifically on the assumption that the group information obtained from the group information holding terminal 300 is the group information terminal list 1604 (FIG. 29D) and its own group information is the group information terminal list 1601 (FIG. 29A).

The group information terminal list 1604 includes the terminal identifiers 0x0001 and 0x0005, and the group information terminal list 1601 includes the terminal identifiers 0x0001, 0x0003 and 0x0004. There is a method of merging the terminal identifiers as an example of a method for generating a new group information terminal list based on the group information terminal list 1601 and the group information terminal list 1604. As a result of the merge, the group information terminal list 1602 (FIG. 29B) including the terminal identifiers 0x0001, 0x0003, 0x0004 and 0x0005 is generated. As a version, the higher value of the two values is set. "5" is set in the above example. Note that the version does not need to be changed. The method for merging the terminal identifiers as an example of the method for generating a new group information terminal list based on two group information terminal lists has been explained, but a method for generating a group information terminal list is not limited to this. The second method is effective in its use where the number of terminals which belong to the same group is updated by monotone increase.

No processing is executed in a case where the return message includes the no update needed notification.

Also, in a case where the return message includes the group information obtainment request, the same processing is executed if the positions of the group information holding terminal 300 and the group information holding terminal 400 are replaced.

The processing executed in a case where the group information obtainment request is transmitted between the group information holding terminals have been explained.

That is the end of the explanation concerning the processing in which the group information holding terminal 400 obtains group information from the group information management server 100 or another group information holding terminal 300 and updates the group information.

(Processing Concerning Update Notification Message)

Finally, the processing concerning an update notification message which is transmitted along with update processing of group information will be explained.

The update notification message is a message for urging the group information holding terminal which has received the update notification message to update its own group information so as to update the group information in the same group smoothly.

FIG. 31 is a diagram that shows a block diagram showing the configuration of the group information management server 100, the group information holding terminals 300, 400 and 500 which belong to a group I, and a group information holding terminal 600 which belongs to a group II, which is a group other than group I, and data which are transmitted and received between the respective apparatuses.

It is assumed that the group information management server 100 and respective group information holding terminals are connected so as to communicate data with each other, and group I is a set of terminals held by a subscriber β and group II is a terminal held by a subscriber δ. It is considered in general that the subscriber of the terminals which belong to the same group is the same user, but various types of group formation are possible case by case, such that a group consists of terminals held by a plurality of users, and a plurality of terminals held by one user belong to a plurality of groups. Also, a group may be established for each possible processing, or one terminal may belong to a plurality of groups.

In the following explanation, a group is concerned with permission and no permission of all the processing such as moving and copying between the group information holding terminals, and the following explanation is made assuming that all the group information holding terminals always belong to one group.

Following is the explanation, referring to FIG. 32 to FIG. 38, of the operations of the group information management server 100, the group information holding terminal 300 and the group information holding terminal 400 as structured above, in which the group information holding terminal 300 obtains group information from the group information management server 100 and transmits a group information update notification message and then the group information holding terminal 400 updates the group information.

First, a case where the group information can be obtained only from the group information management server 100 will be explained with reference to FIG. 31 to FIG. 33.

The processing executed by each apparatus, in which the group information holding terminal 300 obtains the group information from the group information management server 100 and the group information holding terminal 400 updates the group information, will be explained.

Figure 32:
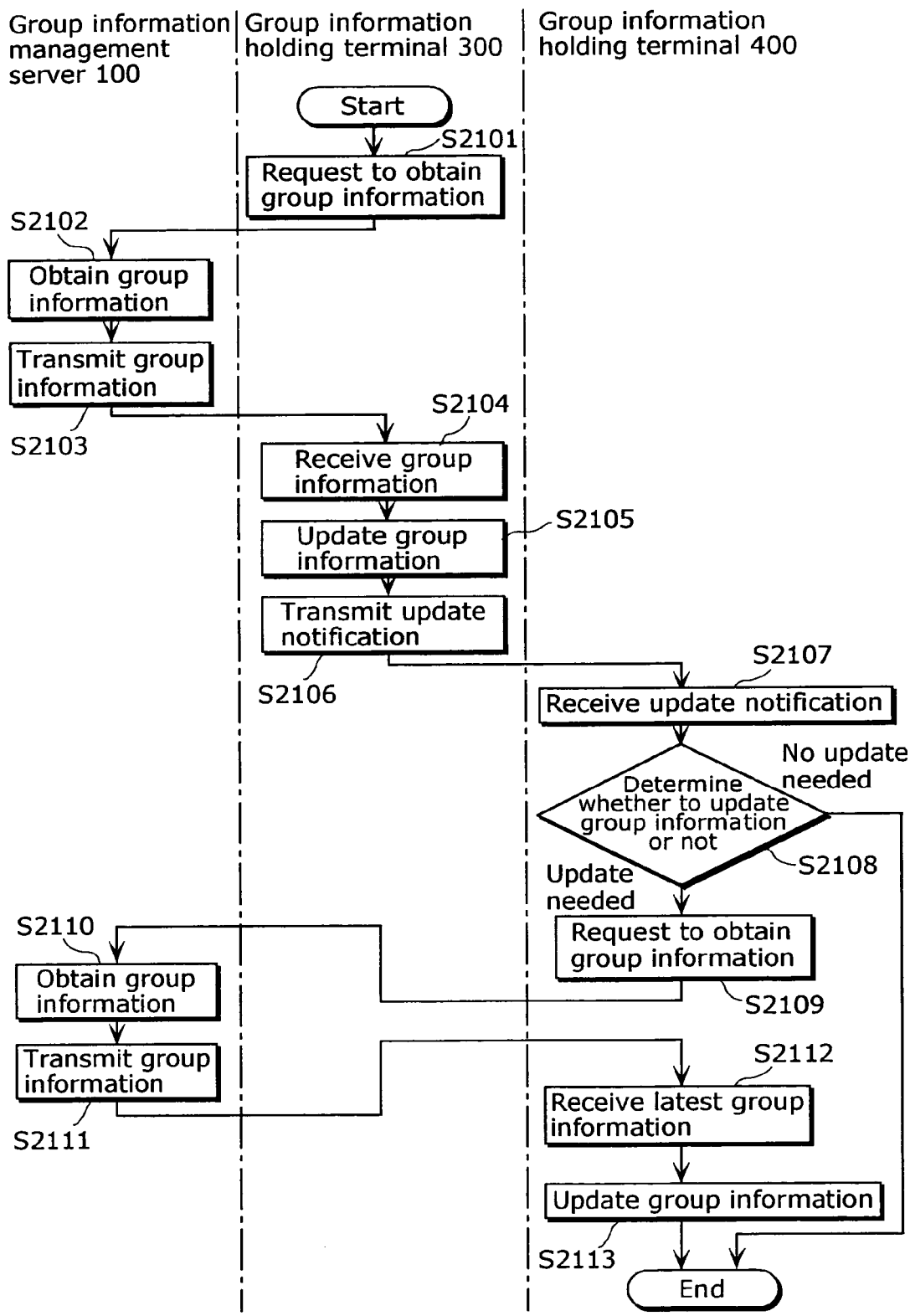
FIG. 32 is a flowchart showing processing in which after a group information holding terminal obtains group information from the group information management server, another group information holding terminal carries out the update determination of its own group information and then obtains and updates the group information.

According to the subscriber β's operation or the like, the group information obtainment requesting unit 302 in the group information holding terminal 300 creates a group information obtainment request message, and transmits it to the group information management server 100 via the communication unit 308 (①in FIG. 31 and Step S2101 in FIG. 32).

Upon receipt of the group information obtainment request message, the group information management server 100 transmits the obtainment request to the group information obtainment/transmission unit 104 through the communication unit 106. The group information obtainment/transmission unit 104 extracts a group identifier from the group information obtainment request message, and identifies and obtains the group information corresponding to the group I from the group information storage unit 101 using the group identifier as a key (Step S2102 in FIG. 32). Note that the update determination may be carried out here.

The group information obtainment/transmission unit 104 transmits a group information transmission message including the obtained group information to the group information holding terminal 300 through the communication unit 106 (Step S2103 in FIG. 32).

The group information holding terminal 300 receives the group information transmission message from the group information management server 100 (②in FIG. 31 and Step S2104 in FIG. 32), and transmits the group information transmission message to the group information obtainment/updating unit 303. The group information obtainment/updating unit 303 extracts the group information from the group information transmission message, and updates the group information in the group information storage unit 301 (Step S2105 in FIG. 32).

Once the update of the group information is completed, the group information obtainment/updating unit 303 controls the update notification transmission unit 304 to transmit the update notification message.

The update notification transmission unit 304 broadcasts the update notification message to other group information holding terminals to urge them to update the group information (③in FIG. 31 and Step S2106 in FIG. 32).

As shown in FIG. 25, the update notification message includes a message header m1001, a group identifier m1002 and a version m1003.

In the above example, the group identifier of the group to which the group information holding terminal 300 belongs is stored in the group identifier m1002, and the version of the group information held by the group information holding terminal 300 is stored in the version m1003.

In the following explanation, it is assumed that the update notification message is broadcasted, but it may be unicasted to a specific group information holding terminal. The update notification is transmitted to the specific group information holding terminal such as a terminal which is similar in a network configuration, or a group information holding terminal corresponding to the terminal identifier in the terminal list which is described in the group information in advance.

The explanation of the processing executed by the group information holding terminal which has received the update notification message will follow. Note that the processing executed by the group information holding terminal which has received the update notification message is same in either case of broadcasting or unicasting.

The processing executed by the group information holding terminal which has received the update notification message will be explained, in both a case of the group information holding terminal 400, which belongs to group I, as does the group information holding terminal 300 and a case of the group information holding terminal 600, which belongs to group II, differently from the group information holding terminal 300.

First, the processing executed after the group information holding terminal 400 which belongs to group I receives the update notification message will be explained.

The group information holding terminal 400 receives the update notification message from the group information holding terminal 300 (Step S2107 in FIG. 32), and transmits the update notification message to the group information update determination unit 305 through the communication unit 308.

The update determination unit 305 extracts the group identifier from the update notification message, and determines whether or not it matches the group identifier of the group information held in the group information storage unit 301. If it matches, the following processing is executed, but if it does not match, the following processing is not executed.

Since the group information holding terminal 300 and the group information holding terminal 400 belong to group I, their group identifiers match each other, the following processing is executed.

Whether or not to update the group information is determined based on the version of the group information included in the update notification message and the version of the group information held by the group information holding terminal 300 (Step S2108 in FIG. 32).

The update determination processing is same as that executed in a case where the group information holding terminal has received the group information obtainment request message, as mentioned above.

Also, if it is ensured by another method that the group information holding terminal 300 and the group information holding terminal 400 belong to the same group, whether or not the group information matches is not confirmed.

In addition, since the group information holding terminal 300 that is a transmitter of the update notification message obtains the group information from the group information management server 100, the group information included in the update notification message is the group information held by the group information management server 100, namely, the latest group information. In this case, as a special value indicating that the update of the version does not need to be determined, 0xFFFF, for example, may be stored. The group information holding terminal 400 which has received the update notification message with its version being a special value executes the update processing without executing the update determination processing. It should be noted that as a mechanism for ensuring that the group information holding terminal 300 that is a transmitter of the update notification message has obtained the group information from the group information management server 100, a certificate of the group information management server 100, for example, may be used.

When the update is determined necessary as a result of the update determination processing, the group information obtainment requesting unit 302 creates the group information obtainment request message, and transmits it to the group information management server 100 via the communication unit 308 (④ in FIG. 31 and Step S2109 in FIG. 32).

Upon receipt of the group information obtainment request message, the group information management server 100 transmits the request message to the group information obtainment/transmission unit through the communication unit 106.

Upon receipt of the group information obtainment request message, the group information obtainment/transmission unit 104 identifies the corresponding group information from the group information storage unit 101 using the group identifier as a key and obtains it (Step S2110 in FIG. 32).

The group information obtainment/transmission unit 104 generates a return message including the obtained group information and transmits the return message to the group information holding terminal 400 through the communication unit 106 (Step S2111 in FIG. 32).

The group information holding terminal 400 receives the return message (Step S2112 in FIG. 32), and updates the group information in the group information storage unit 301 (Step S2113 in FIG. 32).

The detailed processing of the above-mentioned Step S2109 to Step S2113 has been explained in the description of the above processing of obtaining the group information from the group information management server 100 and updating it.

In the above explanation, the group information holding terminal 400 executes the update determination processing, but the group information management server 100 may execute update determination.

The processing executed in a case where the group information management server 100 carries out the update determination in the above-mentioned configuration will be explained with reference to FIG. 33.

Figure 33:
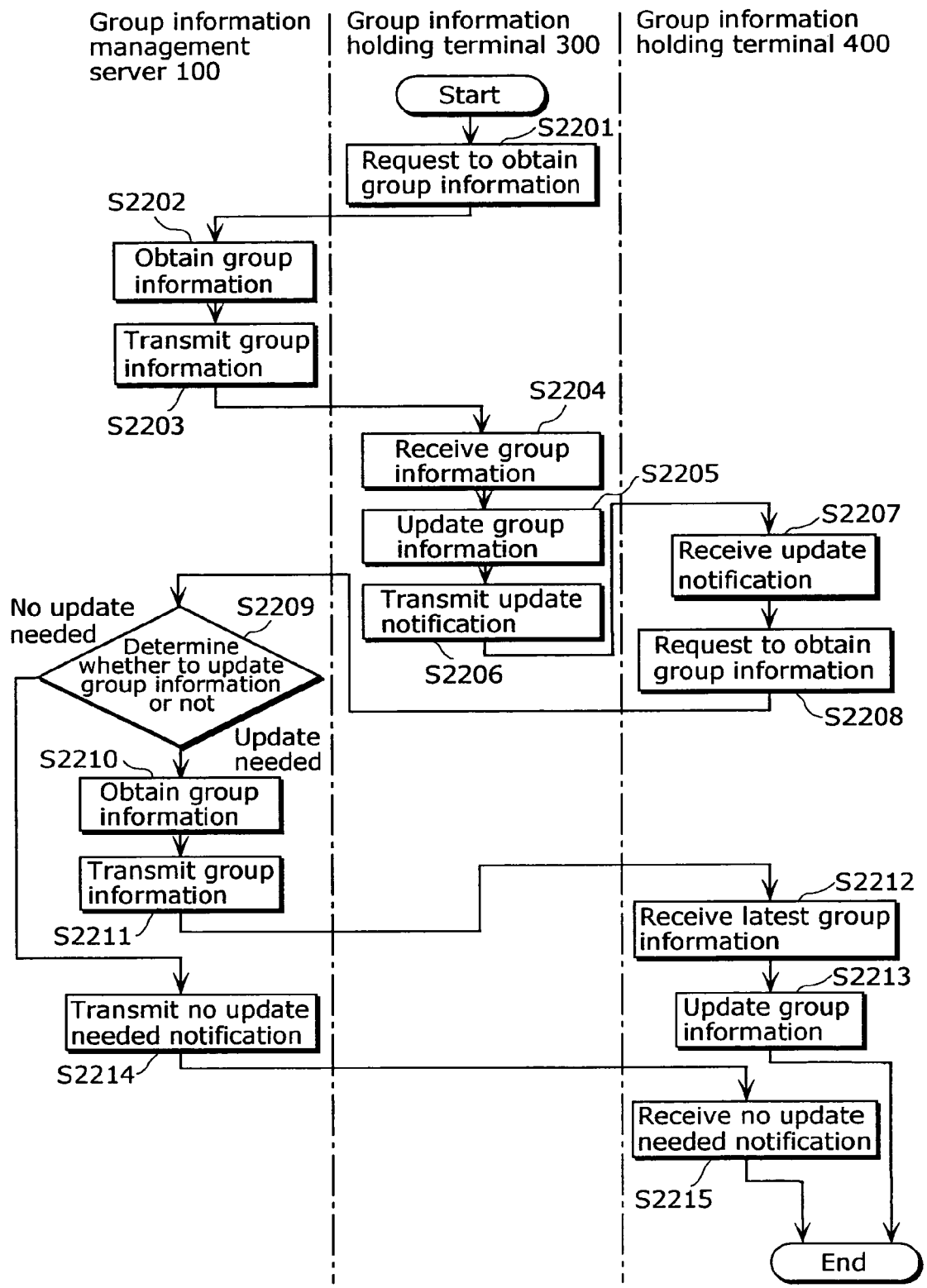
FIG. 33 is a flowchart showing processing in which after a group information holding terminal obtains group information from the group information management server, the group information management server carries out the update determination of the group information, and then another group information holding terminal obtains the group information.

The processing in Step S2201 to Step S2207 in FIG. 33 are same as those in Step S2101 to Step S2107 as mentioned above. Next, the group information holding terminal 400 does not execute the update determination processing, but transmits the group information obtainment request to the group information management server 100 (Step S2208 in FIG. 33). This group information obtainment request has been explained in Step S2109.

Upon receipt of the group information obtainment request from the group information holding terminal 400, the group information management server 100 transmits the group information obtainment request message to the group information update determination unit 105 via the communication unit 106.

The group information update determination unit 105 executes the following processing.

The group information management server 100 identifies the group information corresponding to group I by the method as explained in Step S2102 and obtains the group information. The update determination is carried out based on the identified group information and the group information extracted from the group information obtainment request message (Step S2209 in FIG. 33). The method of update determination has been explained above.

If the group information needs to be updated as a result of the update determination, the group information management server 100 obtains the group information (Step S2210 in FIG. 33), and transmits it to the group information holding terminal 400 (Step S2211 in FIG. 33). These processes are the same as Step 2110 and Step S2111. The group information holding terminal 400 receives the group information update message (Step S2212 in FIG. 33), and updates the group information storage unit 301 (Step S2213 in FIG. 33). These processes are same as Step S2112 and Step S2113 in FIG. 32. If the update is determined unnecessary, the group information management server 100 transmits the no update needed notification message to the group information holding terminal 400 (Step S2214 in FIG. 33).

Upon receipt of the no update needed notification message (Step S2215 in FIG. 33), the group information holding terminal 400 does not execute the processing concerning the update of the group information but ends the processing.

The group information holding terminal 400 obtains the latest group information from the group information management server 100 and updates it, in the manner as mentioned above.

Next, following is the explanation of the processing executed by the group information holding terminal 600, which belongs to group II, which is different than the group of the group information holding terminal 300, after receiving the update notification message.

The group information holding terminal 600 receives the update notification message from the group information holding terminal 300, and transmits the update notification message to the group information update determination unit 305 through the communication unit 308.

The group information update determination unit 305 extracts the group identifier from the update notification message, and determines whether or not that group identifier matches the group identifier of the group information held in the group information storage unit 301. Since the group information holding terminal 300 belongs to group I and the group information holding terminal 600 belongs to group II, it is determined that the group identifiers do not match each other, and thus the following processing is not executed.

The above explanation has been made on the assumption that the group information holding terminal 300 transmits the group information obtainment request message to the group information management server 100, but the processing following the obtainment of the group information is the same even if the group information management server 100 pushes the group information to the group information holding terminal 600 placed under an online environment.

In the above explanation, a case where the group information holding terminal 300 transmits the update notification after obtaining the latest group information from the group information management server 100 has been described.

Next, the group information update processing executed in a case where the group information holding terminals communicate with each other will be explained. The group information holding terminals communicate with each other in a case where a desired content is searched within the same group or a case where such content is obtained within the group.

The former is communication in which the group information holding terminal that is a searcher broadcasts a search request to terminals to be searched, namely, one-to-n communication, whereas the latter is communication in which the group information holding terminal unicasts an obtainment request to a specific terminal after searching, namely, one-to-one communication.

The update processing executed in a case where the group information holding terminal 300 communicates with the other group information holding terminal 400 will be explained with reference to FIG. 34 and FIG. 35.

Figure 34:
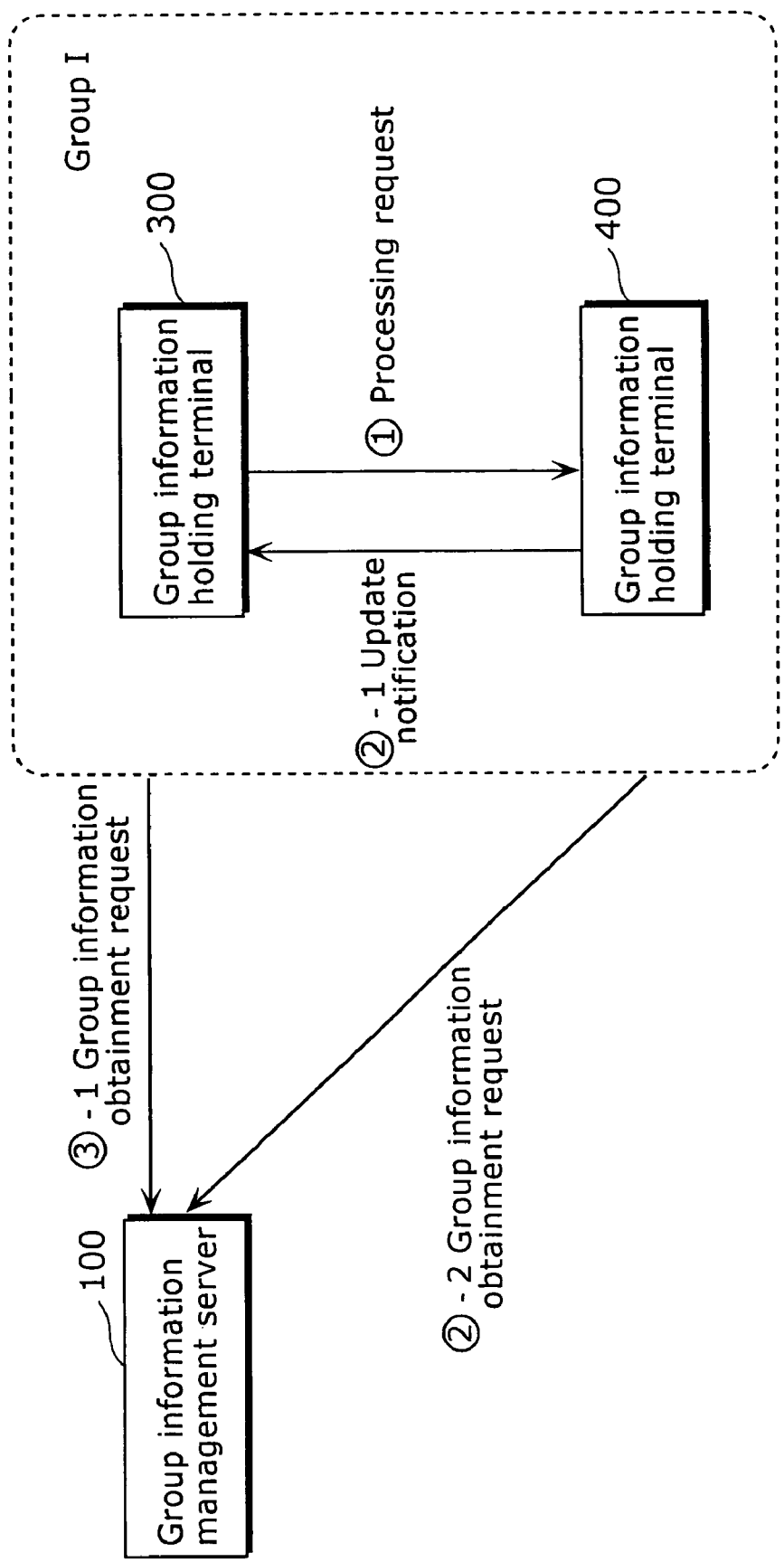
FIG. 34 is a block diagram showing a structure of the group information management server and the group information holding terminals according to the present embodiment of the present invention and a flow of their processing.

FIG. 34 is a diagram that shows a block diagram showing the configuration of the group information management server 100, and the group information holding terminals 300 and 400 which belong to group I according to the embodiment of the present invention, and showing data that is transmitted and received between the respective apparatuses.

The processing of the group information holding terminal 300 which transmits the search request and the obtainment request and the group information holding terminal 400 which receives the search request and the obtainment request will be explained. Note that even if the group information update notification, instead of the search request and the obtainment request, is transmitted, the same processing is executed.

For the sake of simplicity, the search request and the obtainment request will be explained collectively as a processing request. The processing request needs information required for the update determination, and in the present embodiment, management information of group information, more specifically, a version will be explained as an example.

In addition to the version, time information obtained from the group information management server, and others are intended. Since it is assumed that the group information management server 100 holds the latest group information, it is determined that the later group information is obtained from the group information management server 100, the newer the group information is.

As shown in FIG. 26, the processing request message includes a message header m1101, a group identifier m1102, a version m1103 and details of processing m1104.

In the above example, the group identifier of the group to which the group information holding terminal 300 belongs is stored in the group identifier m1102, and the version of the group information held by the group information holding terminal 300 is stored in the version m1103.

The processing request transmission unit 306 in the group information holding terminal 300 creates the processing request message and transmits it (①) in FIG. 34 and Step S2301 in FIG. 35).

The group information holding terminal 400 receives the processing request message (Step S2302 in FIG. 35), and extracts the version.

The group information update determination unit 305 obtains the version of its own group information from the group information storage unit 301, and executes the update determination processing (S2303 in FIG. 35).

If the update is not necessary, the group information update determination unit 305 ends the processing. If the group information of the group information holding terminal 300 is necessary, the update notification transmission unit 304 in the group information holding terminal 400 generates the update notification message, and transmits it to the group information holding terminal 300 through the communication unit 308 (②-1 in FIG. 34 and Step S2304 in FIG. 35). Note that the update notification message may be broadcasted.

The group information holding terminal 300 receives the update notification message (Step S2305 in FIG. 35), and the group information obtainment requesting unit 302 transmits the group information obtainment request message to the group information management server 100 (③-1 in FIG. 34 and Step S2306 in FIG. 35).

Also, if it is determined as a result of the update determination processing that the group information holding terminal 400 needs to update the group information, the group information obtainment requesting unit 302 in the group information holding terminal 400 transmits the group information obtainment request message to the group information management server 100 (②-2 in FIG. 34 and Step S2307 in FIG. 35).

The group information management server 100 receives the group information obtainment request message, obtains the group information held in the group information storage unit 101 (Step S2308 in FIG. 35), transmits a return message including the group information to the group information holding terminal 300 or 400 which has transmitted the group information obtainment request message (S2309 in FIG. 35).

The group information holding terminal 300 or 400 receives the return message (Step S2312 and Step S2310 in FIG. 35), and updates the group information in the group information storage unit 301 (Step S2313 and Step S2311 in FIG. 35).

The processing from the transmission of the group information obtainment request message from the group information holding terminal 300 or 400 until the update of the group information (Step S2306, Step S2308, Step S2309, Step S2312 and Step S2313, or Step S2307 to Step S2311 in FIG. 35) has been explained above.

Here, the case where the version of the group information held by the group information holding terminal 300 is 2, the version of the group information held by the group information holding terminal 400 is 3, and the version of the group information held by the group information management server 100 is 4 will be explained.

According to the method explained as above, it is determined that the group information holding terminal 300 needs to update its own group information, and obtains the latest group information from the group information management server 100 and updates the group information. The version of the group information held by the group information holding terminal 300 is 4, whereas the version of the group information held by the group information holding terminal 400 remains to be 3.

A method for updating the version of the group information held by the group information holding terminal 400 to 4 in such a case will be explained.

The group information holding terminal 300 stores the version of the group information held by the group information holding terminal 400. Upon receipt of the group information from the group information management server 100, the group information holding terminal 300 extracts the version of the group information received from the group information management server 100, carries out the update determination of it based on the version of the group information holding terminal 400 stored in itself, and if the group information holding terminal 300 determines that the group information needs to be updated, it transmits the update notification message to the group information holding terminal 400.

The processing executed by the group information holding terminal 300 which has received the update notification message has been explained above.

As another method, by including information for identifying another group information holding terminal that is a partner of the processing (an item to be included into the message header such as an identifier or an IP address of the group information holding terminal 400 in the above example) into the group information obtainment request message transmitted from the group information holding terminal 300, the group information management server 100 may update the group information of these two terminals at the same time on the assumption that both of them make the pseudo update requests. Also, by including the version of the group information held by the group information holding terminal 400 into the group information obtainment request message, it is possible to carry out the update determination of the group information held by the group information holding terminal 400.

The processing of updating the group information during the communication between the group information holding terminals has been explained.

The group information holding terminal 300 broadcasts or unicasts the processing request message depending on the type of processing, but the group information holding terminal 400 which receives the processing request executes the same processing.

Note that in a case where the group information holding terminal 300 receives the update notifications from a plurality of group information holding terminals, it may avoid unnecessary requests for group information update by making the update determination every time it receives the update notification message. Furthermore, once it receives an update notification message, it may suspend the execution of the processing for a certain period even if it receives another update notification message.

The above explanation has been made on the assumption that the group information holding terminal which has received the update notification message obtains the latest group information from the group information management server 100.

Next, a case where the group information holding terminal which has received the update notification message obtains the group information from another group information holding terminal and updates it will be explained with reference to FIG. 36 to FIG. 38.

Figure 36B:
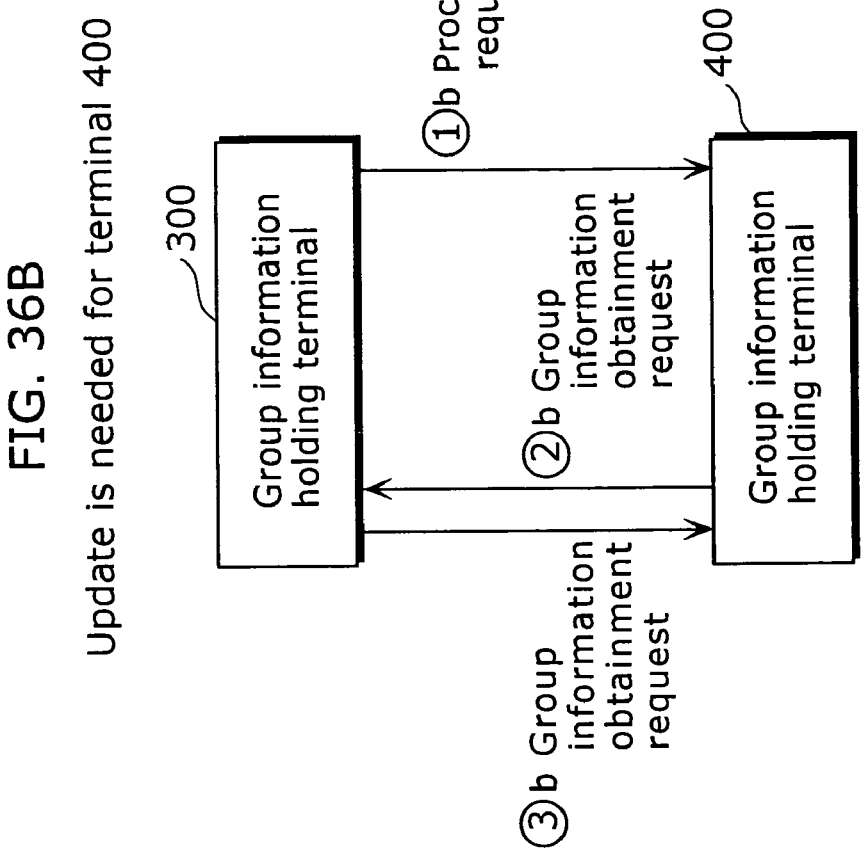
FIGS. 36A and 36B are block diagrams showing structures of the group information holding terminals according to the present embodiment of the present invention and a flow of their processing.
Figure 36A:
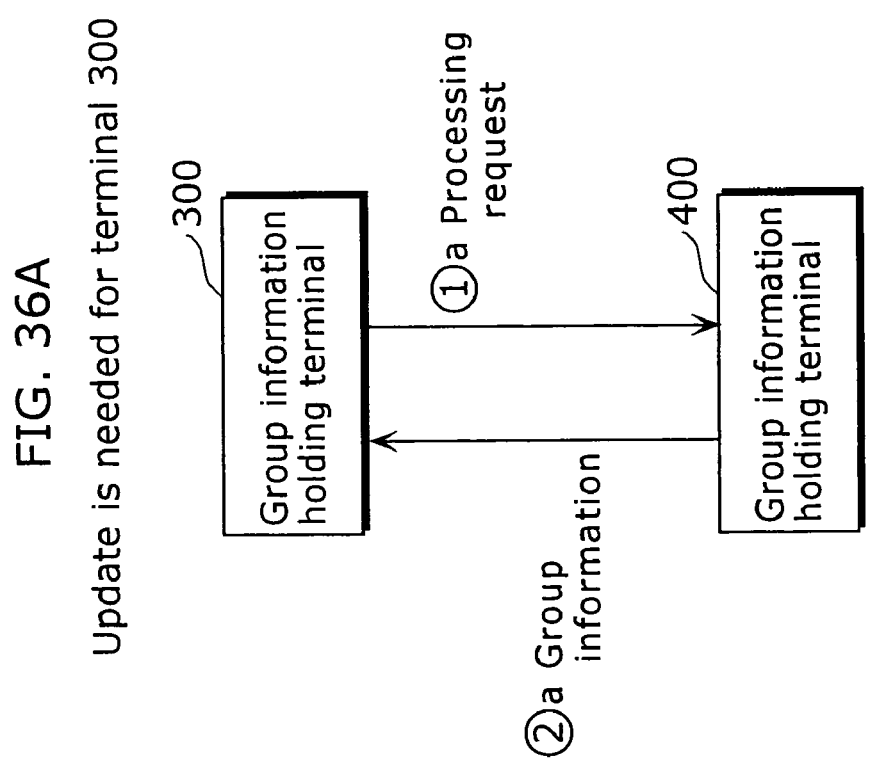

FIGS. 36A and 36B are block diagrams showing the configuration of the group information holding terminals 300 and 400 which belong to group I and the data which are transmitted and received between them according to the embodiment of the present invention.

The explanation will start from the transmission of the processing request message from the group information holding terminal 300.

As shown in FIG. 26, the processing request message includes the message header m1101, the group identifier m1102, the version m1103 and the details of processing m1104.

The group identifier of the group to which the group information holding terminal 300 belongs is stored in the group identifier m1102, and the version of the group information held by the group information holding terminal 300 is stored in the version m1103.

First, a case where the group information holding terminal 400 which receives the processing request message carries out the update determination of the group information in the above-mentioned configuration will be explained with reference to FIG. 36 and FIG. 37.

Figure 37:
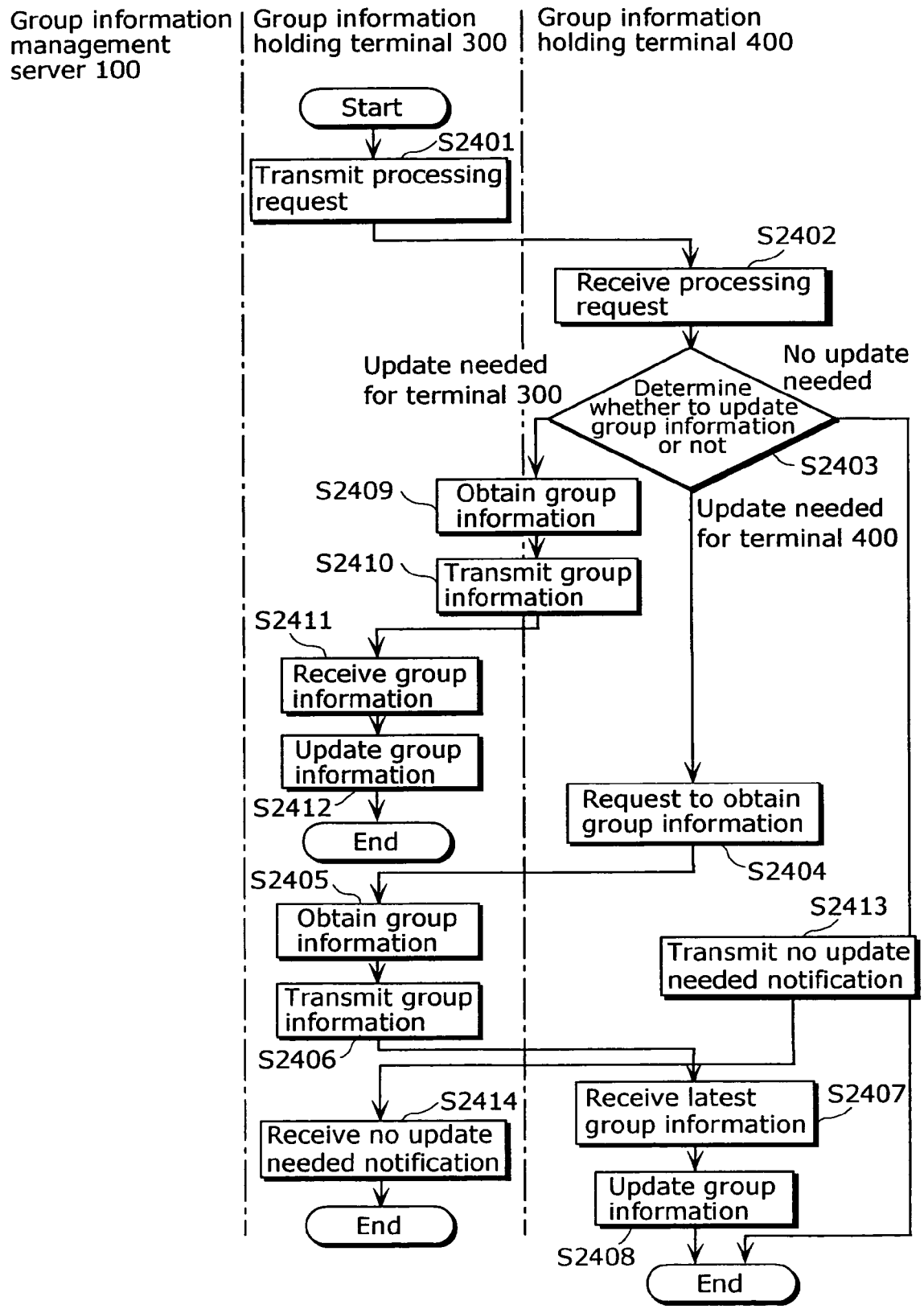
FIG. 37 is a flowchart showing processing in which after the group information holding terminal 300 transmits the processing request message to the group information holding terminal 400, the group information holding terminal 400 carries out the update determination, and then both the group information holding terminals 300 and 400 update the group information.

The processing request transmission unit 306 in the group information holding terminal 300 generates the processing request message and transmits it (①a and ①b in FIG. 36 and Step S2401 in FIG. 37).

The group information holding terminal 400 receives the processing request message (Step S2402 in FIG. 37) and extracts the version.

The group information update determination unit 305 obtains the version of its own group information from the group information storage unit 301, and carries out the update determination of the group information (Step S2403 in FIG. 37).

If the update is not needed, the group information update determination unit 305 ends the processing, and transmits a return message including no update needed notification to the group information holding terminal 300 via the communication unit 308 (Step S2413 in FIG. 37). The group information holding terminal 300 receives the return message from the group information holding terminal 400 (S2414 in FIG. 37). Note that if the update is not needed, there is no problem even if the return message including the no update needed notification is not transmitted.

In a case where the group information holding terminal 300 needs to be updated, the group information obtainment/transmission unit 307 obtains the group information from the group information storage unit 301 (Step S2409 in FIG. 37), generates the group information transmission message, and transmits it to the group information holding terminal 300 via the communication unit 308 (②a in FIG. 36 and Step S2410 in FIG. 37).

As shown in FIG. 27, the group information transmission message consists of the message header m1201 and the group information m1202.

The group information holding terminal 300 receives the group information transmission message from the group information holding terminal 400 (Step S2411 in FIG. 37), and updates the group information in the group information storage unit 301 (Step S2412 in FIG. 37).

A case where the group information holding terminal 400 pushes the group information by means of the group information transmission message has been explained, but it is also possible to transmit the update notification message instead of the group information transmission message to have the group information holding terminal 300 generate and transmit the group information obtainment request message and thus update the group information of the group information holding terminal 300.

Also, in a case where it is determined by the update determination processing that the group information holding terminal 400 needs to update the group information, the group information obtainment requesting unit 302 in the group information holding terminal 400 transmits the group information obtainment request message to the group information management server 100 (②b in FIG. 36 and Step S2404 in FIG. 37).

The group information holding terminal 300 receives the group information obtainment request message, and the group information obtainment/transmission unit 307 obtains the group information held in the group information storage unit 301 (Step S2405 in FIG. 37), generates the group information transmission message and transmits it to the group information holding terminal 400 via the communication unit 308 (③b in FIG. 36 and Step S2406 in FIG. 37).

The group information holding terminal 400 receives the group information transmission message from the group information holding terminal 300 (Step S2407 in FIG. 37), and updates the group information in the group information storage unit 301 (Step S2408 in FIG. 37).

Next, a case where the group information holding terminal 300 which transmits the processing request carries out the update determination in the above configuration will be explained with reference to FIG. 38.

Figure 38:
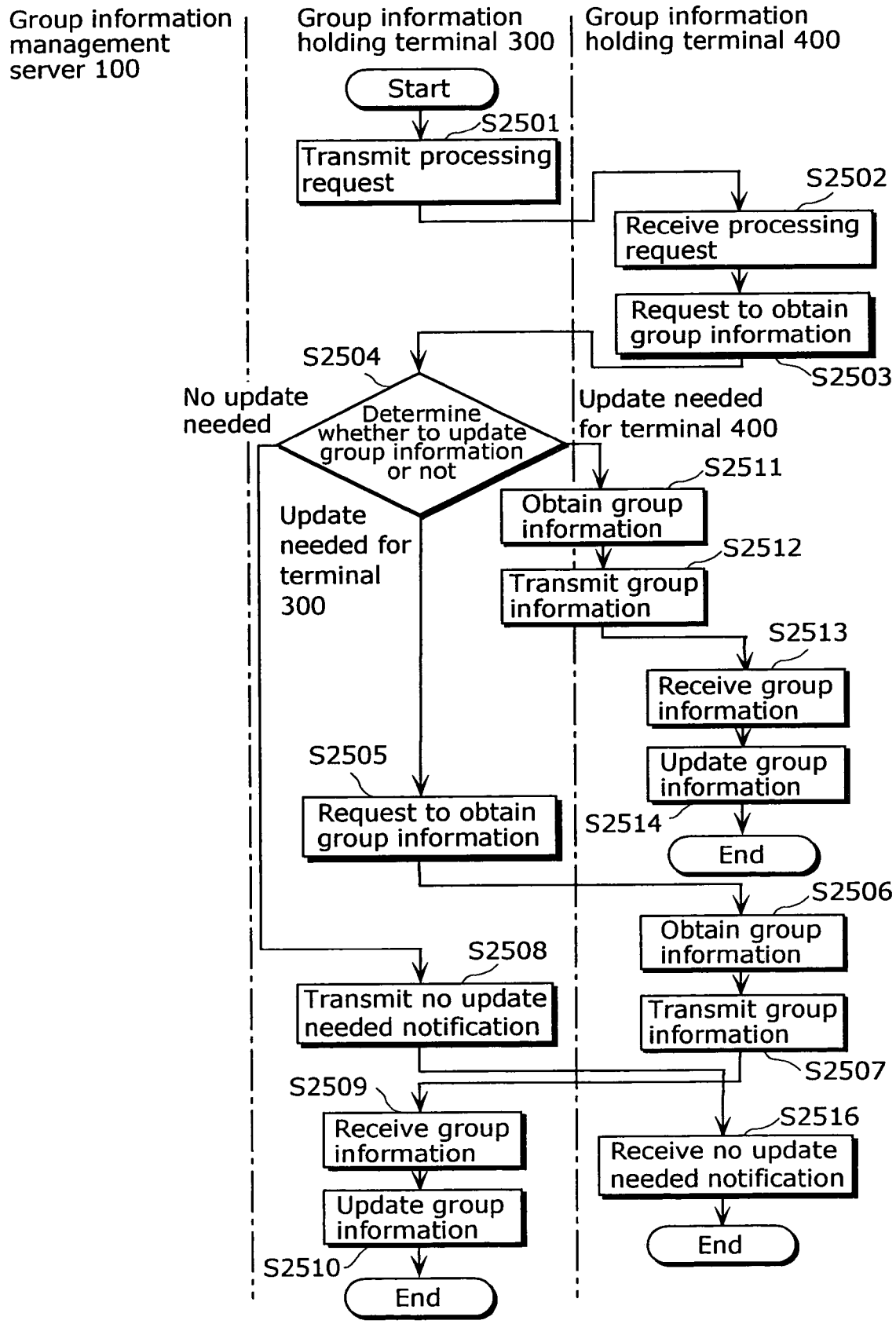
FIG. 38 is a flowchart showing processing in which after the group information holding terminal 300 transmits the processing request message to the group information holding terminal 400, the group information holding terminal 400 returns the group information request message, the group information holding terminal 300 carries out the update determination, and then both the group information holding terminals 300 and 400 update the group information.

The processing request transmission unit 306 in the group information holding terminal 300 transmits the processing request message (Step S2501 in FIG. 38).

The group information holding terminal 400 receives the processing request message (Step S2502 in FIG. 38), and the group information obtainment request unit 302 in itself creates the group information obtainment request message and transmits it to the group information holding terminal 300 via the communication unit 308 (Step S2503 in FIG. 38).

The group information holding terminal 300 receives the group information obtainment request message from the group information holding terminal 400 and carries out the update determination (Step S2504 in FIG. 38).

Note that the processing from the update determination processing until the group information update processing (from Step S2504 to Step S2515 in FIG. 38) is same as that explained in Step S2403 to Step S2414 on the assumption that the group information holding terminal 300 is replaced with the group information holding terminal 400.

A case where the group information holding terminal 300 transmits the processing request message for the processing of searching and obtaining contents has been explained here. Note that after obtaining the group information from the group information management server 100 and updating it, the group information holding terminal 300 may transmit the group information update notification to the group information holding terminal 400 and update the group information via the communication between the group information holding terminals.

The update notification message includes a group identifier and a version required for the processing of group information update during the communication between the group information holding terminals. Therefore, the processing executed in a case of the update notification message is same as the processing executed in a case of the processing request message.

The processing of updating the group information during the communication between the group information holding terminals has been explained.

The group information holding terminal 300 broadcasts or unicasts the processing request message depending on the type of processing, but the processing executed by the group information holding terminal 400 which receives the processing request is same in either case.

The processing executed in a case where the group information is updated between the group information holding terminals has been explained. The update of the group information between the group information holding terminals is allowed, and thus the accesses to the group information management server 100 can be reduced.

The processing concerning the update notification message which is transmitted along with the group information update processing has been explained.

Up to now, the setting of new group information, the processing of updating the group information, the processing of obtaining the group information, and the processing of updating the group information using the update notification message, respectively executed in a case where the group information real data is a terminal list, have been explained.

Following is the explanation concerning the setting of new group information, the processing of updating the group information, the processing of obtaining the group information, and the processing of updating the group information using the update notification message, respectively executed in a case where the group information real data is common information, particularly focusing on the differences from a case where the group information real data is a terminal list.

First, the data structure of the group information held by the group information management server 100 and the group information holding terminal will be explained.

The group information in a case where the group information real data is common information (hereinafter referred to as group information common information) will be explained with reference to FIG. 39A.

Figure 39A:
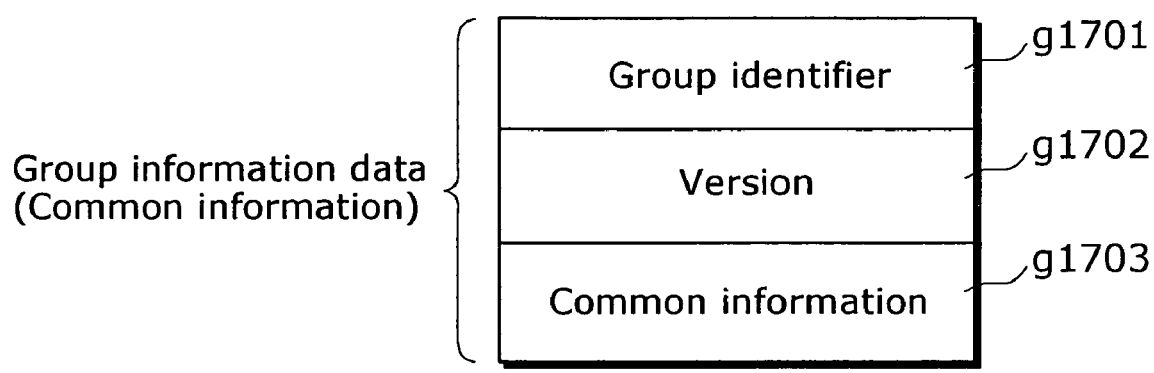
FIGS. 39A and 39B are diagrams showing specific data included in the group information common information and the common information terminal list according to the present embodiment of the present invention.
Figure 39B:
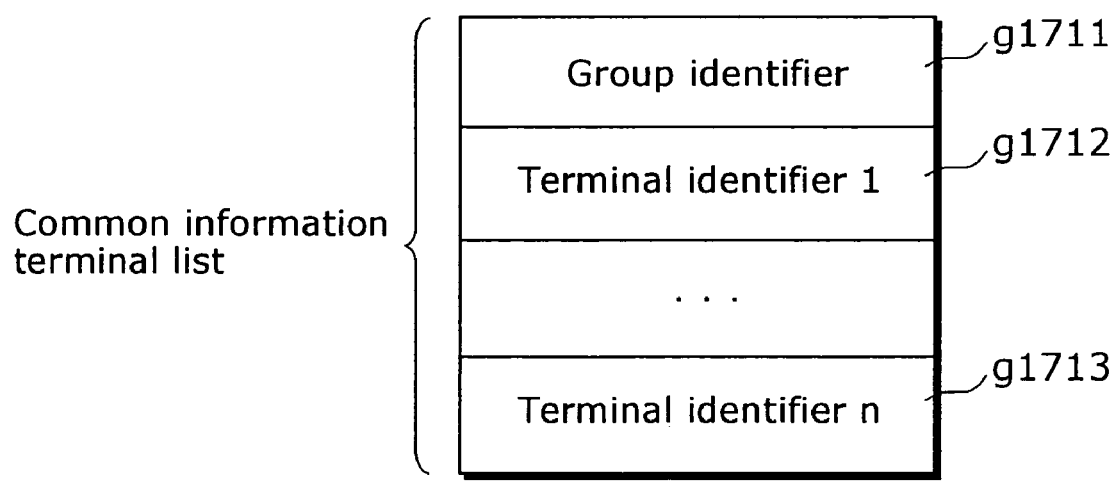

FIGS. 39A and 39B are diagrams showing specific data included in the group information common information and the common information terminal list.

In FIG. 39A, g1701 is a group identifier, g1702 is a version as management information, and g1703 is common information commonly held by the group information holding terminals which belong to the same group.

Next, the data structure of the common information terminal list held by the group information management server 100 will be explained.

The common information terminal list, which is required in a case where the group information real data is common information, indicating the correspondence between the group information holding terminals and the group will be explained with reference to FIG. 39B.

In FIG. 39B, g1711 is a group identifier, g1712 to g1713 are a list of terminal identifiers of the group information holding terminals which belong to the group corresponding to the group identifier.

The processing of setting new group information, the processing of updating the group information and the processing of obtaining the group information which are required during movement of a music content from a group information holding terminal to another group information holding terminal will be explained in detail.

First, the processing executed when a changer γ sets new group information in the group information storage unit 101 of the group information management server 100 will be explained with reference to FIGS. 40A1 to 40B3. FIGS. 40A1 to 40B3 are diagrams showing examples of group information common information and common information terminal lists.

The processing in which the changer y accesses the group information changing apparatus 200 and enters "new group tid=0x0001, 0x0003, 0x0004" into the group information setting/change information entry unit 201, and the group information setting/updating unit 103 receives it has been explained above.

The group information setting/updating unit 103 assigns a group identifier to a new group, and stores it together with the entered terminal identifiers as a common information terminal list into the group information storage unit 101. A list which is assigned a group identifier 0xF001 is the common information terminal list 1701 in FIG. 40B1. Common information is generated at the same time as the generation of the common information terminal list, and the group information common information is stored together with the group identifier. A list set with common information 0xAAAA and a version 2 is the group information common information c701 in FIG. 40A1.

Next, the processing in which the changer γ updates the group information stored in the group information storage unit 101 of the group information management server 100 will be explained.

The processing in which the changer γ enters the change information into the group information setting/change information entry unit 201 and identifies the group information to be stored in the group information storage unit 101 is same as that in a case of the group information terminal list.

The group information including the common information consists of a group identifier, a version and common information, and the group identifier 0xF001, the version "2" and the common information 0xAAAA are stored in the group information common information c701 in FIG. 40A1.

The common information terminal list includes the group identifier and the terminal identifiers, and in the common information terminal list 1701 in FIG. 40B1, the group identifier 0xF001 and the terminal identifiers 0x0001, 0x0003 and 0x0004 are stored.

The following explanation will be made on the assumption that the group information storage unit 101 in the group information management server 100 holds the group information common information c701 and the common information terminal list 1701.

First, a case where a group information holding terminal with its terminal identifier 0x0005 is added to the group corresponding to the common information terminal list 1701 will be explained.

The processing in which the changer γ enters the change information and the group information setting/updating unit 103 starts the processing is same as that executed in a case of the group information terminal list. The common information terminal list 1701 is identified using the group identifier 0xF001 as a key, the terminal identifier 0x0005 is added, and the list 1701 is updated into the common information terminal list 1702 in FIG. 40B2. Next, the group information common information c701 is identified using the group identifier 0xF001 as a key, the version is changed, and the information c701 is updated into the group information common information c702.

Also, in deleting the terminals with their terminal identifiers 0x0004 and 0x0005, the list 1702 and the information c702 are updated into the common information terminal list 1703 in FIG. 40B3 and the group information common information c703 in FIG. 40A3 in the same manner.

Note that the above explanation has been made on the assumption that the group information common information and the common information terminal list are managed as separate tables, but both of them may be managed as a table in which the items of the group information common information and the common information terminal list are merged.

The processing executed when a group information holding terminal obtains the group information in a case where the group information real data is common information will be explained.

A case where the group information holding terminal 400 updates the group information will be explained.

The group information holding terminal obtains the group information from either the group information management server 100 or another group information holding terminal.

First, a case where the group information holding terminal 400 obtains the group information from the group information management server 100 will be explained, and then, the processing executed in a case where the group information holding terminal 400 obtains it from another group information holding terminal 300 will be explained.

First, the processing executed when the group information holding terminal 400 obtains the group information from the group information management server 100 and updates it in a case where the group information is the group information common information will be explained.

The processing in which the group information holding terminal 400 generates and transmits the group information obtainment request message and the group information update determination unit 105 in the group information management server 100 receives the group information obtainment request is same as that executed in the case of the group information terminal list.

The group information update determination unit 105 extracts the terminal identifier m802, the group identifier m803 and the version m804 from the group information obtainment request message.

The group information update determination unit 105 identifies the group information common information c701 and the common information terminal list 1701 of the corresponding group information from the group information storage unit 101 using the group identifier m803 as a key, and obtains it.

The group information determination unit 105 determines whether or not the terminal identifier m802 is included in the common information terminal list 1701. If the terminal identifier m802 is included, it is determined that the terminal belongs to the group corresponding to the group identifier m803, and if the terminal identifier m802 is not included, it is determined that the terminal does not belong to the group. The processing is ended if it is determined that it does not belong to the group, and a return message including the group information deletion instruction is transmitted to the group information holding terminal 400 which has transmitted the group information obtainment request message. If it is determined that the terminal belongs to the group, the following processing is executed.

The group information update determination unit 105 executes the update determination processing based on the version. The update determination processing has been explained in the section regarding the terminal list.

When determining that the update is needed, the group information update determination unit 105 transmits, to the group information holding terminal 400, the return message including the corresponding group information common information c701 extracted from the group information storage unit 101 using the group identifier m803 as a key.

If the update is not needed, it transmits the return message including the no update needed notification to the group information holding terminal 400.

The processing executed by the group information holding terminal 400 which has received the return message will be explained.

A case where the return message includes the group information common information will be explained.

The group information obtainment/updating unit 303 in the group information holding terminal 400 obtains the received return message via the communication unit 308. The group information obtainment/updating unit 303 extracts the group information common information c701 from the return message, and updates the group information common information in the group information storage unit 301.

The following three methods for updating the group information common information are considered.

The first method is a method for overwriting its own group information common information with the obtained group information common information c701; the second method is a method for generating new group information common information according to a certain generation rule based on the group information common information c701 and its own unupdated group information common information and storing it; and the third method is a method for overwriting the version of the group information common information and not overwriting the common information.

Here, the generation rule in the second method will be explained. There is a method, for example, in which as common information of group information real data, new group information common information is generated by obtaining the exclusive OR of two common information, and as a version, a higher one of the versions of the two group information common information is stored. According to this method, in a case where the group information common information of the group information holding terminal 300 and the group information holding terminal 400 are updated, if the group information common information held by the group information holding terminal 300 and the group information holding terminal 400 match each other before the update, their group information common information also match each other after the update. But if the group information common information held by the group information holding terminal 300 and the group information holding terminal 400 are different from each other before the update, their group information common information could be different from each other after the update. Therefore, when a plurality of group information holding terminals update the group information common information, this method is effective in a case where the limitation that "the group information common information before the update should match each other" is set.

In the first and second methods, the group information common information could change if the update processing is executed. In the third method, the group information common information never changes.

Here, one example of a method for determining whether or not a terminal belongs to a group using the group information common information will be explained.

It can be considered to encrypt a communication message using common information as a key for transmission when communicating it between the group information holding terminals.

In this case, upon receipt of the encrypted communication message, the group information holding terminal decrypts the encrypted communication message using the common information as a decryption key and interprets the decrypted communication message. If the terminals which transmit and receive the communication message have the identical common information (belong to the same group), such decryption is possible and the processing for decryption is executed normally.

If the terminals do not have the identical common information (do not belong to the same group), the encrypted communication message cannot be decrypted nor interpreted, and thus the following processing cannot be executed.

If the first and second methods are applied to the case where the common information is used as an encryption key, as mentioned above, the common information could change along with the update of the group information common information, and thus there is a possibility that the communication even in the same group cannot be carried out until the update is reflected to all the terminals in the group. In other words, the case where the group information holding terminals cannot communicate with each other although they can communicate before the update is likely to occur.

The third method, in which the version that is management information is updated but the common information that is group information real data is not updated, is effective as a method for avoiding such a case where communication cannot be carried out. Note that in the third method, it is possible not to include the common information that is group information real data into the group information common information for update.

In the first and second methods, since the common information can be changed on every update, the communication is allowed only between the group information holding terminals which hold the latest group information. So it is true that these methods are effective if they are used so that the communication is allowed only between the group information holding terminals which hold the latest group information.

Note that it is also possible to identify in the management information which method shall be used among the first to third methods as a method for updating the common information so that the group information management server 100 can control these three methods.

The update methods which are put under the control of the group information management server 100 allows effective management of the group information in a variety of uses for the sake of users' convenience, for the sake of security, or the like.

According to the above processing, the group information holding terminal 400 extracts the common information c701 from the return message, and updates the common information in the group information storage unit 301.

Note that the matching confirmation of the group identifier or the version determination may be conducted prior to the update processing.

If the return message includes the group information deletion instruction, the group information obtainment/updating unit 303 deletes the group information in the group information storage unit 301. If the return message includes the no update needed notification, it executes no processing.

Note that the update determination may be conducted using the group information updated terminal list which has been explained in the case of the group information terminal list.

That is the end of the explanation concerning the processing in which the group information holding terminal obtains the common information from the group information management server 100 and updates the common information in the case where the group information is the group information common information.

Next, the processing in which the group information holding terminal 300 transmits the group information obtainment request message to the group information holding terminal 400 and obtains and updates the group information in the case where the group information is the common information will be explained.

The processing in which the group information holding terminal generates and transmits the group information obtainment request message and the group information update determination unit 105 in the group information holding terminal 400 receives the group information obtainment request message is same as that executed in the case of the group information terminal list.

The group information update determination unit 105 in the group information holding terminal 400 extracts the terminal identifier m802, the group identifier m803 and the version m804 from the group information obtainment request message.

The group information update determination unit 105 compares the group identifier of its own group information with the group identifier m803, and executes the following processing if they match each other, and returns a mismatched group error message if they do not match.

The group information update determination unit 105 executes the update determination processing based on the version.

If the group information update determination unit 105 determines that the update is needed, it transmits the return message including the group information common information c701 to the group information holding terminal 300.

If the update is not needed, the group information update determination unit 105 transmits the return message including the no update needed notification to the group information holding terminal 300.

Next, the processing executed by the group information holding terminal 300 which has received the return message will be explained.

The group information obtainment/updating unit 303 in the group information holding terminal 300 obtains the received return message via the communication unit 308. The group information obtainment/updating unit 303 extracts the group information common information c701 from the return message and updates the group information common information in the group information storage unit 301.

As the methods for updating the group information common information, the three methods which have been explained for the case of obtaining the group information common information from the group information management server 100 are considered. The group information common information c701 is extracted from the return message, and the group information common information in the group information storage unit 301 is updated.

Note that the matching confirmation of the group identifiers or the version determination may be conducted prior to the update processing.

Note that it is also possible to have the group information holding terminal hold the common information terminal list as well as the group information common information, determine whether the terminal is included in the group or not based on the terminal identifier obtained from the group information obtainment request message, and transmit the return message including the group information deletion instruction if it is determined that the terminal is not included in the group.

If the return message includes the group information deletion instruction, the group information holding terminal 300 deletes the group information. The processing of receiving the return message including the group information deletion instruction and deleting the group information has been explained above.

If the return message includes the no update needed notification, the group information holding terminal 300 executes no processing.

That is the end of the explanation concerning the processing in which a group information holding terminal obtains the group information common information from another group information holding terminal and updates common information in a case where the group information is the group information common information.

As mentioned above, the processing of urging the update of the group information in a case where a group information holding terminal receives the group information from the group information management server 100 or communicates with another group information holding terminal has been explained separately, in a case where the group information real data is a terminal list and a case where the group information read data is common information, in this order.

Note that, by including the group information into the group information update notification message or the processing request message, it is possible for the group information holding terminal which has received the update notification message or the processing request message to update the group information after determining whether or not the update is needed.

After the above-mentioned processing, the group information holding terminal 400 which has updated the group information can move the content from the group information holding terminal 300 which belongs to the same group.

Note that it is also possible to include a flag, identifying from which the group information for update should be obtained, into the management information of the group information or the message text as an item.

Note that it is possible to provide a control flag in the update notification and define various update notifications depending on the level, such as a notification for forcing the update of the group information without the update determination, and a notification for urging the update of the group information if the update is needed as a result of the update determination.

Note that the present embodiment has been explained on the assumption that update of group information, or moving and searching of a content by a group information holding terminal triggers the transmission of the update notification, but the group information holding terminal may broadcast the update notification at regular intervals to urge other terminals in the same group to update the group information.

Also, by transmitting the processing request message or the update notification message including the group information, it is possible to simplify the processing of requesting and obtaining the group information.

In addition, there is a problem that a malicious user transmits update notification messages to a lot of group information holding terminals so that accesses for requesting obtainment of the group information are concentrated to the group information management server 100 for making it down.

This problem occurs because it is possible to urge a group information holding terminal which belongs to another group to update the group information if the malicious user tampers the group identifier of the update notification message.

In order to solve the above problem, it may be allowed to authenticate the update notification message on the side of the transmitter/receiver thereof by encrypting the update notification message or the like.

As a typical example, it can be considered to generate an encryption key based on the group information real data and encrypt the update notification message. According to this method, only the update notification transmitted from the group information holding terminal which belong to the same group can be interpreted.

Note that a terminal has been explained as one example of the unit that belongs to a group, but such a unit may be a user or a family.

Note that the above explanation has been made assuming that the group information includes management information, but the group information does not always need to include management information. In this case, the update determination of the group information is not carried out.

According to the present invention, at the timing when one terminal in a group updates the group information, the group information of other terminals can be updated, and thus it becomes possible to update the group information more efficiently. Also, since it is structured so that only the terminal which needs to update the group information updates it, the load on the network can be reduced.

The terminal apparatus according to the information management system of the present invention is of value as a computer apparatus such as a DVD player and a personal computer for reproducing digital works which are used under constraints, and the information management server according to the information management system of the present invention is of value as a computer apparatus for receiving reproduction conditions or the like of the digital works via a transmission medium such as the Internet.

The invention claimed is:

1. An information management system comprising:
a terminal apparatus; and
an information management server configured to permit a predetermined number of terminal apparatuses to receive content therefrom and configured to manage a plurality of terminal apparatuses permitted to receive the content, the terminal apparatuses permitted to receive the content being managed as a group of terminal apparatuses associated with the information management server,
wherein the information management server includes:
a management information storage unit configured to store a list indicating terminal information identifying a registered terminal apparatus, the information management server permitting the registered terminal apparatus to receive the content from the information management server;
a judging unit configured to judge whether or not a number of registered terminal apparatuses, concurrently permitted by the information management server to receive the content from the information management server, exceeds the predetermined number of terminal apparatuses, the judging unit performing the judgment when the information management server receives, from the terminal apparatus of the information management system, a request for registration that identifies the registered terminal apparatus identified in the list stored in the management information storage unit; and
a first secure communication unit configured to establish a secure communication channel with the terminal apparatus of the information management system and configured to transmit, to the terminal apparatus of the information management system via the secure communication channel, group information identifying the group of terminal apparatuses associated with the information management server, the first secure communication unit performing the establishing and the transmitting when the judging unit judges that the number of registered terminal apparatuses currently permitted by the information management server to receive the content from the information management server does not exceed the predetermined number of terminal apparatuses,
wherein the terminal apparatus of the information management system includes a tamper-resistant module, and
wherein the tamper-resistant module includes:
a data storage unit configured to securely store the group information transmitted from the first secure communication unit; and
a second secure communication unit configured to, when the terminal apparatus of the information management system leaves the group of terminal apparatuses associated with the information management server, establish a secure communication channel with the first secure communication unit and transmit, to the information management server via the secure communication channel established between the first secure communication unit and the second secure communication unit by the second secure communication unit, a request for deleting the terminal information identifying the registered terminal apparatus, which left the group of terminal apparatuses, from the list stored in the management information storage unit.

2. An information management system comprising:
a plurality of terminal apparatuses for storing data; and
an information management server for managing management information concerning the data, the information management server being connected to the plurality of terminal apparatuses via a network,
wherein the information management server includes:
a management information storage unit operable to store the management information; and
a first secure communication unit operable to establish a secure communication channel with each terminal apparatus and operable to communicate with each terminal apparatus via a respective secure communication channel,
wherein each terminal apparatus includes a respective tamper-resistant module,
wherein each respective tamper-resistant module includes:
a data storage unit operable to securely store the data;
an execution unit operable to securely execute processing affecting the management information concerning the data securely stored in the data storage unit; and
a second secure communication unit operable to establish a secure communication channel with the first secure communication unit and operable to transmit a completion notification via the secure communication channel established by the second secure communication unit, the completion notification indicating that the processing affecting the management information has been executed,
wherein the data is group information used for determining whether or not a terminal apparatus belongs to a group formed by terminal apparatuses,
wherein the management information is a terminal list of not more than a predetermined number of terminal apparatuses which belong to the group,
wherein the processing affecting the management information is deletion of the group information,
wherein the information management server further includes an updating unit operable to delete a terminal apparatus, which has transmitted the completion notification, from the terminal list stored in the management information storage unit, the terminal apparatus being deleted from the terminal list upon the information management server receiving the completion notification via the first secure communication unit of the terminal apparatus being deleted from the terminal list,
wherein the information management server further includes:
a common management server;
a plurality of individual management servers; and
a terminal list management apparatus, wherein each terminal apparatus further includes a respective first communication unit operable to communicate with the common management server, wherein the common management server includes a second communication unit operable to notify a terminal apparatus which has transmitted an advance notification of a destination address of an individual management server to which the completion notification should be transmitted, the advance notification indicating that the group information is about to be deleted, wherein each individual management server includes:
the first secure communication unit;
a first temporary deletion flag list storage unit operable to store a temporary deletion flag list associated with the terminal list, the temporary deletion flag list being a list of one or more first temporary deletion flags indicating whether or not the completion notification has been received; and
a first temporary deletion flag setting unit operable to set a first temporary deletion flag that corresponds to the terminal apparatus, which transmitted the completion notification, the first temporary deletion flag being set by the first temporary deletion flag setting unit upon receipt of the completion notification via the first secure communication unit, wherein the terminal list management apparatus further includes:
the management information storage unit;
the updating unit; and
a flag confirmation unit operable to confirm at an arbitrary timing whether or not a predetermined first temporary deletion flag included in the first temporary deletion flag list has been set, and wherein the updating unit deletes, from the terminal list, the terminal apparatus that corresponds to the first temporary deletion flag, the terminal apparatus being deleted from the terminal list based on the confirmation by the flag confirmation unit that the predetermined first temporary deletion flag has been set.

3. The information management system according to claim 2,
wherein the common management server further includes:
a second temporary deletion flag list storage unit operable to store a second temporary deletion flag list associated with the terminal list, the second temporary deletion flag list being a list of one or more second temporary deletion flags indicating whether or not the advance notification has been received; and
a second temporary deletion flag setting unit operable to set a second temporary deletion flag that corresponds to the terminal apparatus, which transmitted the advance notification, the second temporary deletion flag being set by the second temporary deletion flag setting unit upon receipt of the advance notification via the second secure communication unit of the terminal apparatus which transmitted the advance notification, wherein the flag confirmation unit searches for the second temporary deletion flag that corresponds to a predetermined terminal apparatus included in the second temporary deletion flag list, and then searches, in sequence, for the first temporary deletion flag that corresponds to the predetermined terminal apparatus included in the first temporary deletion flag list, and wherein the updating unit deletes the predetermined terminal apparatus, that corresponds to both the first temporary deletion flag and the second temporary deletion flags, from the terminal list, in a case where the flag confirmation unit confirms that the second temporary deletion flag and the first temporary deletion flag have been set.

4. The information management system according to claim 2, wherein the common management server of the information management server includes the terminal list management apparatus.

5. The information management system according to claim 4,
wherein the terminal list corresponds to the terminal apparatuses which belong to the group, and includes a column of second temporary deletion flags indicating whether or not the advance notification has been received, wherein the common management server further includes a second temporary deletion flag setting unit operable to set a second temporary deletion flag that corresponds to the terminal apparatus, which transmitted the advance notification, the second temporary deletion flag being set by the second temporary deletion flag setting unit upon receipt of the advance notification via the second communication unit, wherein the flag confirmation unit searches for the second temporary deletion flag that corresponds to a predetermined terminal apparatus included in the terminal list, and then searches, in sequence, for the first temporary deletion flag that corresponds to the predetermined terminal apparatus included in the first temporary deletion flag list, and wherein the updating unit deletes the predetermined terminal apparatus, that corresponds to both the first temporary deletion flag and the second temporary deletion flag, from the terminal list, in a case where the flag confirmation unit confirms that the second temporary deletion flag and the first temporary deletion flag have been set.

6. The information management system according to claim 2,
wherein the information management server further includes:
a group information storage unit operable to store the group information;
a registrability determination unit operable to determine whether or not a terminal apparatus, which has transmitted a terminal registration request, can be registered in the terminal list, the determination being made upon receipt of the terminal registration request for registering the terminal apparatus in the terminal list from the terminal apparatus which transmitted the terminal registration request; and
a group information readout unit operable to read out the group information stored in the group information storage unit, in a case where the registrability determination unit determines that the terminal apparatus, which transmitted the terminal registration request, can be registered, wherein each respective tamper-resistant module further includes a group information storage unit operable to store the group information in the data storage unit, upon receipt of the group information read out by the group information readout unit via the second secure communication unit of the respective tamper-resistant module, and wherein the updating unit registers the terminal apparatus, which transmitted the terminal registration request, in the terminal list, in a case where the registrability determination unit determines that the terminal apparatus, which transmitted the terminal registration request, can be registered.

7. The information management system according to claim 6,
wherein the second communication unit of the common management server is operable to notify the terminal apparatus, which transmitted the terminal registration request, of a destination address of an individual management server to which an obtainment request for obtaining the group information should be transmitted, the second communication unit performing the notification upon receipt of the terminal registration request from the terminal apparatus which transmitted the terminal registration request,
wherein each of the individual management servers includes:
the group information storage unit; and
the group information readout unit,
wherein the terminal list management apparatus includes the registrability determination unit,
wherein the registrability determination unit determines whether or not the terminal apparatus, which transmitted the terminal registration request, can be registered in the terminal list, upon receipt of the terminal registration request via the first communication unit,
wherein the second communication unit notifies the destination address of the obtainment request in a case where the registrability determination unit determines that the terminal apparatus, which transmitted the terminal registration request can be registered, and
wherein the first secure communication unit transmits the group information read out by the group information readout unit to the terminal apparatus, which transmitted the obtainment request, upon receipt of the obtainment request.

8. The information management system according to claim 7,
wherein the flag confirmation unit is operable to confirm a predetermined first temporary deletion flag included in the first temporary deletion flag list at a timing of receipt of the terminal registration request, and
wherein the updating unit deletes the terminal apparatus, that corresponds to the first temporary deletion flag, from the terminal list prior to the determination by the registrability determination unit, the updating unit performing the deletion based on the confirmation by the flag confirmation unit that the predetermined first temporary deletion flag has been set.

9. The information management system according to claim 8,
wherein the common management server further includes:
a second temporary deletion flag list storage unit operable to store a second temporary deletion flag list associated with the terminal list, the second temporary deletion flag list being a list of one or more second temporary deletion flags indicating whether or not the advance notification has been received; and
a second temporary deletion flag setting unit operable to set a second temporary deletion flag that corresponds to the terminal apparatus, which transmitted the advance notification, the second temporary deletion flag being set by the second temporary deletion flag setting unit upon receipt of the advance notification via the second communication unit,
wherein the flag confirmation unit searches for the second temporary deletion flag that corresponds to a predetermined terminal apparatus included in the second temporary deletion flag list, and then searches, in sequence, for the first temporary deletion flag that corresponds to the predetermined terminal apparatus included in the first temporary deletion flag list, and
wherein the updating unit deletes the predetermined terminal apparatus, that corresponds to both the first temporary deletion flag and the second temporary deletion flag, from the terminal list, the updating unit performing the deletion prior to the determination by the registrability determination unit, and in a case where the flag confirmation unit confirms that the second temporary deletion flag and the first temporary deletion flag have been set.

10. The information management system according to claim 6,
wherein the second communication unit of the common management server is operable to notify the terminal apparatus, which transmitted the terminal registration request, of a destination address of an individual management server to which an obtainment request for obtaining the group information should be transmitted, the second communication unit performing the notification upon receipt of the terminal registration request from the terminal apparatus which transmitted the terminal registration request,
wherein the common management server includes the terminal list management apparatus,
wherein each of the individual management servers includes:
the group information storage unit; and
the group information readout unit,
wherein the terminal list management apparatus includes the registrability determination unit,
wherein the registrability determination unit determines whether or not the terminal apparatus, which transmitted the terminal registration request, can be registered in the terminal list, upon receipt of the terminal registration request via the first communication unit,
wherein the second communication unit notifies the destination address of the obtainment request in a case where the registrability determination unit determines that the terminal apparatus, which transmitted the terminal registration request, can be registered, and
wherein the first secure communication unit transmits the group information read out by the group information readout unit to the terminal apparatus, which transmitted the obtainment request, upon receipt of the obtainment request.

11. The information management system according to claim 10,
wherein the flag confirmation unit is operable to confirm a predetermined first temporary deletion flag included in the first temporary deletion flag list at a timing of receipt of the terminal registration request, and
wherein the updating unit deletes the terminal apparatus, that corresponds to the first temporary deletion flag, from the terminal list prior to the determination by the registrability determination unit, the updating unit performing the deletion based on the confirmation by the flag confirmation unit that the first temporary deletion flag has been set.

12. The information management system according to claim 11,
wherein the terminal list corresponds to the terminal apparatuses which belong to the group, and includes a column of second temporary deletion flags indicating whether or not the advance notification has been received, wherein the common management server further includes a second temporary deletion flag setting unit operable to set a second temporary deletion flag that corresponds to the terminal apparatus which transmitted the advance notification, the second temporary deletion flag being set by the second temporary deletion flag setting unit upon receipt of the advance notification via the second communication unit, wherein the flag confirmation unit searches for the second temporary deletion flag that corresponds to a predetermined terminal apparatus included in the second temporary deletion flag list, and then searches, in sequence, for the first temporary deletion flag that corresponds to the predetermined terminal apparatus included in the first temporary deletion flag list, and wherein the updating unit deletes the predetermined terminal apparatus, that corresponds to both the first temporary deletion flag and the second temporary deletion flag, from the terminal list prior to the determination by the registrability determination unit, in a case where the flag confirmation unit confirms that the second temporary deletion flag and the first temporary deletion flag have been set.

13. An information management system comprising:
a plurality of terminal apparatuses for storing data; and
an information management server for managing management information concerning the data, the information management server being connected to the plurality of terminal apparatuses via a network,
wherein the information management server includes:
  a management information storage unit operable to store the management information; and
  a first secure communication unit operable to establish a secure communication channel with each terminal apparatus and operable to communicate with each terminal apparatus via a respective secure communication channel,
wherein each terminal apparatus includes a respective tamper-resistant module,
wherein each respective tamper-resistant module includes:
  a data storage unit operable to securely store the data;
  an execution unit operable to securely execute processing affecting the management information concerning the data securely stored in the data storage unit; and
  a second secure communication unit operable to establish a secure communication channel with the first secure communication unit and operable to transmit a completion notification via the secure communication channel established by the second secure communication unit, the completion notification indicating that the processing affecting the management information has been executed,
wherein the data is group information used for determining whether or not a terminal apparatus belongs to a group formed by terminal apparatuses,
wherein the management information is a terminal list of not more than a predetermined number of terminal apparatuses which belong to the group,
wherein the processing affecting the management information is moving the group information between the terminal apparatuses, wherein the information management server further includes an updating unit operable to delete a terminal apparatus, which has transmitted the completion notification, from the terminal list stored in the management information storage unit, the terminal apparatus being deleted from the terminal list upon the information management server receiving the completion notification via the first secure communication unit of the terminal apparatus being deleted from the terminal list, wherein the information management server further includes:
  a common management server;
  a plurality of individual management servers; and
  a terminal list management apparatus,
wherein each terminal apparatus further includes a respective first communication unit operable to communicate with the common management server,
wherein the common management server includes a second communication unit operable to notify a terminal apparatus which has transmitted an advance notification of a destination address of an individual management server to which the completion notification should be transmitted, the advance notification indicating that the group information is about to be deleted,
wherein each individual management server includes:
  the first secure communication unit;
  a first temporary deletion flag list storage unit operable to store a temporary deletion flag list associated with the terminal list, the temporary deletion flag list being a list of one or more first temporary deletion flags indicating whether or not the completion notification has been received; and
  a first temporary deletion flag setting unit operable to set a first temporary deletion flag that corresponds to the terminal apparatus, which transmitted the completion notification, the first temporary deletion flag being set by the first temporary deletion flag setting unit upon receipt of the completion notification via the first secure communication unit,
wherein the terminal list management apparatus further includes:
  the management information storage unit;
  the updating unit; and
  a flag confirmation unit operable to confirm at an arbitrary timing whether or not a predetermined first temporary deletion flag included in the first temporary deletion flag list has been set, and
wherein the updating unit deletes, from the terminal list, the terminal apparatus that corresponds to the first temporary deletion flag, the terminal apparatus being deleted from the terminal list based on the confirmation by the flag confirmation unit that the predetermined first temporary deletion flag has been set.

14. An information management system comprising:
a plurality of terminal apparatuses for storing data; and
an information management server for managing management information concerning the data, the information management server being connected to the plurality of terminal apparatuses via a network,
wherein the information management server includes:
  a management information storage unit operable to store the management information; and
  a first secure communication unit operable to establish a secure communication channel with each terminal apparatus and operable to communicate with each terminal apparatus via a respective secure communication channel, wherein each terminal apparatus includes a respective tamper-resistant module,
wherein each respective tamper-resistant module includes:
a data storage unit operable to securely store the data;
an execution unit operable to securely execute processing affecting the management information concerning the data securely stored in the data storage unit; and
a second secure communication unit operable to establish a secure communication channel with the first secure communication unit and operable to transmit a completion notification via the secure communication channel established by the second secure communication unit, the completion notification indicating that the processing affecting the management information has been executed,
wherein the data is group information used for determining whether or not a terminal apparatus belongs to a group formed by terminal apparatuses,
wherein the management information is a terminal list of not more than a predetermined number of terminal apparatuses which belong to the group,
wherein the data is a license of a digital work,
wherein the management information is a historical log of the license,
wherein the processing affecting the management information is a use of the license,
wherein the information management server further includes an updating unit operable to delete a terminal apparatus, which has transmitted the completion notification, from the terminal list stored in the management information storage unit, the terminal apparatus being deleted from the terminal list upon the information management server receiving the completion notification via the first secure communication unit of the terminal apparatus being deleted from the terminal list,
wherein the information management server further includes:
a common management server;
a plurality of individual management servers; and
a terminal list management apparatus
wherein each terminal apparatus further includes a respective first communication unit operable to communicate with the common management server,
wherein the common management server includes a second communication unit operable to notify a terminal apparatus which has transmitted an advance notification of a destination address of an individual management server to which the completion notification should be transmitted, the advance notification indicating that the group information is about to be deleted,
wherein each individual management server includes:
the first secure communication unit;
a first temporary deletion flag list storage unit operable to store a temporary deletion flag list associated with the terminal list, the temporary deletion flag list being a list of one or more first temporary deletion flags indicating whether or not the completion notification has been received; and
a first temporary deletion flag setting unit operable to set a first temporary deletion flag that corresponds to the terminal apparatus, which transmitted the completion notification, the first temporary deletion flag being set by the first temporary deletion flag setting unit upon receipt of the completion notification via the first secure communication unit, wherein the terminal list management apparatus further includes:
the management information storage unit;
the updating unit; and
a flag confirmation unit operable to confirm at an arbitrary timing whether or not a predetermined first temporary deletion flag included in the first temporary deletion flag list has been set, and
wherein the updating unit deletes, from the terminal list, the terminal apparatus that corresponds to the first temporary deletion flag, the terminal apparatus being deleted from the terminal list based on the confirmation by the flag confirmation unit that the predetermined first temporary deletion flag has been set.

15. An information management system comprising:
a plurality of terminal apparatuses for storing data; and
an information management server for managing management information concerning the data, the information management server being connected to the plurality of terminal apparatuses via a network,
wherein the information management server includes:
a management information storage unit operable to store the management information; and
a first secure communication unit operable to establish a secure communication channel with each terminal apparatus and operable to communicate with each terminal apparatus via a respective secure communication channel,
wherein each terminal apparatus includes a respective tamper-resistant module,
wherein each respective tamper-resistant module includes:
a data storage unit operable to securely store the data;
an execution unit operable to securely execute processing affecting the management information concerning the data securely stored in the data storage unit; and
a second secure communication unit operable to establish a secure communication channel with the first secure communication unit and operable to transmit a completion notification via the secure communication channel established by the second secure communication unit, the completion notification indicating that the processing affecting the management information has been executed,
wherein the data is group information used for determining whether or not a terminal apparatus belongs to a group formed by terminal apparatuses,
wherein the management information is a terminal list of not more than a predetermined number of terminal apparatuses which belong to the group,
wherein the data is a license of a digital work,
wherein the management information is the number of licenses that each terminal apparatus can hold,
wherein the processing affecting the management information is deletion of the license,
wherein the information management server further includes an updating unit operable to delete a terminal apparatus, which has transmitted the completion notification, from the terminal list stored in the management information storage unit, the terminal apparatus being deleted from the terminal list upon the information management server receiving the completion notification via the first secure communication unit of the terminal apparatus being deleted from the terminal list, wherein the information management server further includes:
a common management server;
a plurality of individual management servers; and
a terminal list management apparatus,
wherein each terminal apparatus further includes a respective first communication unit operable to communicate with the common management server,
wherein the common management server includes a second communication unit operable to notify a terminal apparatus which has transmitted an advance notification of a destination address of an individual management server to which the completion notification should be transmitted, the advance notification indicating that the group information is about to be deleted,
wherein each individual management server includes:
the first secure communication unit;
a first temporary deletion flag list storage unit operable to store a temporary deletion flag list associated with the terminal list, the temporary deletion flag list being a list of one or more first temporary deletion flags indicating whether or not the completion notification has been received; and
a first temporary deletion flag setting unit operable to set a first temporary deletion flag that corresponds to the terminal apparatus, which transmitted the completion notification, the first temporary deletion flag being set by the first temporary deletion flag setting unit upon receipt of the completion notification via the first secure communication unit,
wherein the terminal list management apparatus further includes:
the management information storage unit;
the updating unit; and
a flag confirmation unit operable to confirm at an arbitrary timing whether or not a predetermined first temporary deletion flag included in the first temporary deletion flag list has been set, and
wherein the updating unit deletes, from the terminal list, the terminal apparatus that corresponds to the first temporary deletion flag, the terminal apparatus being deleted from the terminal list based on the confirmation by the flag confirmation unit that the predetermined first temporary deletion flag has been set.

16. An information management system comprising:
a plurality of terminal apparatuses for storing data; and
an information management server for managing management information concerning the data, the information management server being connected to the plurality of terminal apparatuses via a network,
wherein the information management server includes:
a management information storage unit operable to store the management information; and
a first secure communication unit operable to establish a secure communication channel with each terminal apparatus and operable to communicate with each terminal apparatus via a respective secure communication channel,
wherein each terminal apparatus includes a respective tamper-resistant module,
wherein each respective tamper-resistant module includes:
a data storage unit operable to securely store the data;
an execution unit operable to securely execute processing affecting the management information concerning the data securely stored in the data storage unit; and
a second secure communication unit operable to establish a secure communication channel with the first secure communication unit and operable to transmit a completion notification via the secure communication channel established by the second secure communication unit, the completion notification indicating that the processing affecting the management information has been executed,
wherein the data is group information used for determining whether or not a terminal apparatus belongs to a group formed by terminal apparatuses,
wherein the management information is a terminal list of not more than a predetermined number of terminal apparatuses which belong to the group,
wherein the data is a digital work,
wherein the management information is a limited number of distributions of the digital work,
wherein the processing affecting the management information is moving of the license,
wherein the information management server further includes an updating unit operable to delete a terminal apparatus, which has transmitted the completion notification, from the terminal list stored in the management information storage unit, the terminal apparatus being deleted from the terminal list upon the information management server receiving the completion notification via the first secure communication unit of the terminal apparatus being deleted from the terminal list,
wherein the information management server further includes:
a common management server;
a plurality of individual management servers; and
a terminal list management apparatus,
wherein each terminal apparatus further includes a respective first communication unit operable to communicate with the common management server,
wherein the common management server includes a second communication unit operable to notify a terminal apparatus which has transmitted an advance notification of a destination address of an individual management server to which the completion notification should be transmitted, the advance notification indicating that the group information is about to be deleted,
wherein each individual management server includes:
the first secure communication unit;
a first temporary deletion flag list storage unit operable to store a temporary deletion flag list associated with the terminal list, the temporary deletion flag list being a list of one or more first temporary deletion flags indicating whether or not the completion notification has been received; and
a first temporary deletion flag setting unit operable to set a first temporary deletion flag that corresponds to the terminal apparatus, which transmitted the completion notification, the first temporary deletion flag being set by the first temporary deletion flag setting unit upon receipt of the completion notification via the first secure communication unit,
wherein the terminal list management apparatus further includes:
the management information storage unit;
the updating unit; and
a flag confirmation unit operable to confirm at an arbitrary timing whether or not a predetermined first temporary deletion flag included in the first temporary deletion flag list has been set, and wherein the updating unit deletes, from the terminal list, the terminal apparatus that corresponds to the first temporary deletion flag, the terminal apparatus being deleted from the terminal list based on the confirmation by the flag confirmation unit that the predetermined first temporary deletion flag has been set.

17. An information management method of using an information management system, the information management system including a terminal apparatus and an information management server, the information management server permitting a predetermined number of terminal apparatuses to receive content therefrom and managing a plurality of terminal apparatuses permitted to receive the content, the terminal apparatuses permitted to receive the content being managed as a group of terminal apparatuses associated with the information management server, the information management method comprising:

storing a list in the information management server, the list indicating terminal information identifying a registered terminal apparatus, the information management server permitting the registered terminal apparatus to receive the content from the information management server;

judging, via the information management server, whether or not a number of registered terminal apparatuses, concurrently permitted by the information management server to receive the content from the information management server, exceeds the predetermined number of terminal apparatuses, said judging being performed when the information management server receives, from the terminal apparatus of the information management system, a request for registration that identifies the registered terminal apparatus identified in the list stored in the information management server;

establishing, via the information management server, a secure communication channel with the terminal apparatus of the information management system;

transmitting, to the terminal apparatus of the information management system via the secure communication channel, group information identifying the group of terminal apparatuses associated with the information management server, the transmitting being performed by the information management server when said judging judges that the number of registered terminal apparatuses currently permitted by the information management server to receive the content from the information management server does not exceed the predetermined number of terminal apparatuses;

securely storing, in the terminal apparatus of the information management system, the group information transmitted from the information management server;

establishing, via the terminal apparatus of the information management system, a secure communication channel with the information management server when the terminal apparatus of the information management system leaves the group of terminal apparatuses associated with the information management server; and transmitting, from the terminal apparatus of the information management system to the information management server, via the secure communication channel established by said establishing via the terminal apparatus, a request for deleting the terminal information identifying the registered terminal apparatus, which left the group of terminal apparatuses, from the list stored in the information management server.

18. A terminal apparatus for storing data, the terminal apparatus being connected via a network to an information management server, the information management server permitting a predetermined number of terminal apparatuses to receive content therefrom and managing a plurality of terminal apparatuses permitted to receive the content, the terminal apparatuses permitted to receive the content being managed as a group of terminal apparatuses associated with the information management server, the information management server storing a list indicating terminal information identifying a registered terminal apparatus, the information management server permitting the registered terminal apparatus to receive the content from the information management server, the information management server judging whether or not a number of registered terminal apparatuses, concurrently permitted by the information management server to receive the content from the information management server, exceeds the predetermined number of terminal apparatuses, the judging being performed when the information management server receives, from the terminal apparatus, a request for registration that identifies the registered terminal apparatus identified in the list stored in the information management server, the information management server establishing a secure communication channel with the terminal apparatus and transmitting, to the terminal apparatus via the secure communication channel, group information identifying the group of terminal apparatuses associated with the information management server, the establishing and transmitting being performed when the information management server judges that the number of registered terminal apparatuses, currently permitted by the information management server to receive the content from the information management server, does not exceed the predetermined number of terminal apparatuses, the terminal apparatus comprising a tamper-resistant module, wherein the tamper-resistant module includes:
a data storage unit configured to securely store the group information transmitted from the information management server; and
a second secure communication unit configured to, when the terminal apparatus leaves the group of terminal apparatuses associated with the information management server, establish a secure communication channel with the information management server and transmit, to the information management server via the secure communication channel established by the second secure communication unit, a request for deleting the terminal information identifying the registered terminal apparatus, which left the group of terminal apparatuses, from the list stored in the information management server.

19. An information management server for permitting a predetermined number of terminal apparatuses to receive content therefrom and for managing a plurality of terminal apparatuses permitted to receive the content, the terminal apparatuses permitted to receive the content being managed as a group of terminal apparatuses associated with the information management server, the information management server comprising:

a management information storage unit configured to store a list indicating terminal information identifying a registered terminal apparatus, the information management server permitting the registered terminal apparatus to receive the content from the information management server;

a judging unit configured to judge whether or not a number of registered terminal apparatuses, concurrently permitted by the information management server to receive the content from the information management server, exceeds the predetermined number of terminal apparatuses, the judging unit performing the judgment when the information management server receives, from one terminal apparatus, a request for registration that identifies the registered terminal apparatus identified in the list stored in the management information storage unit; and a first secure communication unit configured to establish a secure communication channel with the one terminal apparatus and configured to transmit, to the one terminal apparatus via the secure communication channel, group information identifying the group of terminal apparatuses associated with the information management server, the first secure communication unit performing the establishing and transmitting when the judging unit judges that the number of registered terminal apparatuses currently permitted by the information management server to receive the content from the information management server does not exceed the predetermined number of terminal apparatuses, wherein the one terminal apparatus includes a tamper-resistant module, and wherein the tamper-resistant module includes:

a data storage unit configured to securely store the group information transmitted from the information management server; and a second secure communication unit configured to, when the terminal apparatus of the information management system leaves the group of terminal apparatuses associated with the information management server, establish a secure communication channel with the first secure communication unit and transmit, to the information management server via the secure communication channel established between the first secure communication unit and the second secure communication unit by the second secure communication unit, a request for deleting the terminal information identifying the registered terminal apparatus, which left the group of terminal apparatuses, from the list stored in the management information storage unit.

* * * * *